(12) United States Patent
Orlov et al.

(10) Patent No.: US 10,371,786 B1
(45) Date of Patent: Aug. 6, 2019

(54) ELECTROMAGNETIC OBJECT TRACKING SYSTEM

(71) Applicant: AMAZON TECHNOLOGIES, INC., Seattle, WA (US)

(72) Inventors: Nikolai Orlov, Seattle, WA (US); Nathan Pius O'Neill, Snohomish, WA (US); Somasundaram Niranjayan, Issaquah, WA (US); James Stephanick, Seattle, WA (US); Camerin Cole Hahn, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 78 days.

(21) Appl. No.: 15/614,324

(22) Filed: Jun. 5, 2017

(51) Int. Cl.
  *H04B 7/00* (2006.01)
  *G01S 5/02* (2010.01)
  *G06Q 10/08* (2012.01)

(52) U.S. Cl.
  CPC .......... *G01S 5/0294* (2013.01); *G06Q 10/087* (2013.01)

(58) Field of Classification Search
  CPC .... A01K 11/004; H04W 4/008; H04W 8/005; H04W 56/0015; H04W 72/02; H04W 56/001; H04W 72/0446; H04B 1/713; H04B 7/18502; H04L 5/0055; H04J 3/1694
  USPC ................ 711/122; 347/42; 340/10.1, 426.2, 340/10.34; 342/357.02
  See application file for complete search history.

(56) References Cited

U.S. PATENT DOCUMENTS

| 7,225,980 | B2 | 6/2007 | Ku et al. |
| 7,949,568 | B2 | 5/2011 | Fano et al. |
| 8,009,864 | B2 | 8/2011 | Linaker et al. |
| 8,189,855 | B2 | 5/2012 | Opalach et al. |
| 8,630,924 | B2 | 1/2014 | Groenevelt et al. |
| 9,235,928 | B2 | 1/2016 | Medioni et al. |
| 9,473,747 | B2 | 10/2016 | Kobres et al. |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <<URL: http://citeseerx.ist.psu.edu/viewdoc/summary?doi=10.1.1.127.3.>>.

(Continued)

*Primary Examiner* — Phuoc H Doan
(74) *Attorney, Agent, or Firm* — Lindauer Law, PLLC

(57) ABSTRACT

One or more surfaces within a facility are equipped with devices having several segments, each segment with an antenna. Segments may be grouped together into a cluster. Each segment within a cluster is associated with a particular timeslot. A transmitter at the device transmits on a specific frequency. During the particular timeslot for that segment, a signal at the specific frequency is transmitted and radiated from the antenna for that segment. An object electromagnetically couples to one or more antennas of the device, acting as a signal path for the signal. A receiver in a second segment detects the signal, and information about the timeslot for the signal and relative signal strength is generated. By using this information, a location and path of the object may be determined. Receivers in shelves may also be used to facilitate disambiguation of one user from another when interacting with items on those shelves.

20 Claims, 19 Drawing Sheets

(56) References Cited

U.S. PATENT DOCUMENTS

| | | | | |
|---|---|---|---|---|
| 2007/0159301 | A1* | 7/2007 | Hirt | H04W 52/0216 |
| | | | | 340/10.1 |
| 2007/0285308 | A1* | 12/2007 | Bauregger | G01S 19/10 |
| | | | | 342/357.27 |
| 2011/0011936 | A1 | 1/2011 | Morandi et al. | |
| 2012/0284132 | A1 | 11/2012 | Kim et al. | |
| 2013/0284806 | A1 | 10/2013 | Margalit | |
| 2015/0086107 | A1 | 3/2015 | Dedeoglu et al. | |

OTHER PUBLICATIONS

Dietz, et al., "DiamondTouch: A Multi-User Touch Technology", Mitsubishi Electric Research Laboratories. TR2003-125. Oct. 2003. Retrieved from the Internet: <<URL: http://www.merl.com/publications/docs/TR2003-125.pdf.>>.

Fischer, Dirk, "Capacitive Touch Sensors. Application Fields, technology overview and implementation example", Fujitsu Microelectronics Europe GmbH. V4, Jan. 12, 2010. Retrieved from the Internet: <<URL: http://www.fujitsu.com/downloads/MICRO/fme/articles/fujitsu-whitepaper-capacitive-touch-sensors.pdf>>.

Hasegawa, et al., "Human Body Equivalent Phantom for Analyzing of Surface and Space Propagation in MHz-Band Signal Transmission", Department of Electronics, Kyoto Institute of Technology. Retrieved from the Internet: <<URL: http://ieeexplore.ieee.org/document/7481823/>>.

Kalnikaite, et al., "How to Nudge in Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <<URL:http://www.researchgate.net/publication/221568350_How_to_nudge_in_Situ_designing_lambent_devices_to_deliver_salient_information_in_supermarkets>>.

O'Connor, Todd, "mTouch™ Projected Capacitive Touch Screen Sensing Theory of Operation", Microchip Technology Inc. TB3064. 2010. Retrieved from the Internet: <<URL: https://www.microchip.com/stellent/groups/techpub_sg/documents/devicedoc/en550192.pdf>>.

Pop, Cristian, "Introduction to the BodyCom Technology", AN1391, DS01391A, Microchip Technology, Inc., May 2, 2011.

Valtonen, Miika, "Technologies for Smart Environments: Capacitive User Tracking and Proactive Fuzzy Control", Tampere University of Technology. Publication 1044. 2012. Retrieved from the Internet: <<URL: http://dspace.cc.tut.fi/dpub/bitstream/handle/123456789/21002/valtonen.pdf?sequence=3&isAllowed=y>>.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

* cited by examiner

ELECTROMAGNETIC OBJECT TRACKING SYSTEM

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity or movement of users, inventory, or other objects within the facility.

Other types of facilities may also benefit from tracking of users or other objects. For example, hospitals may wish to track patients, airports may wish to track passengers, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
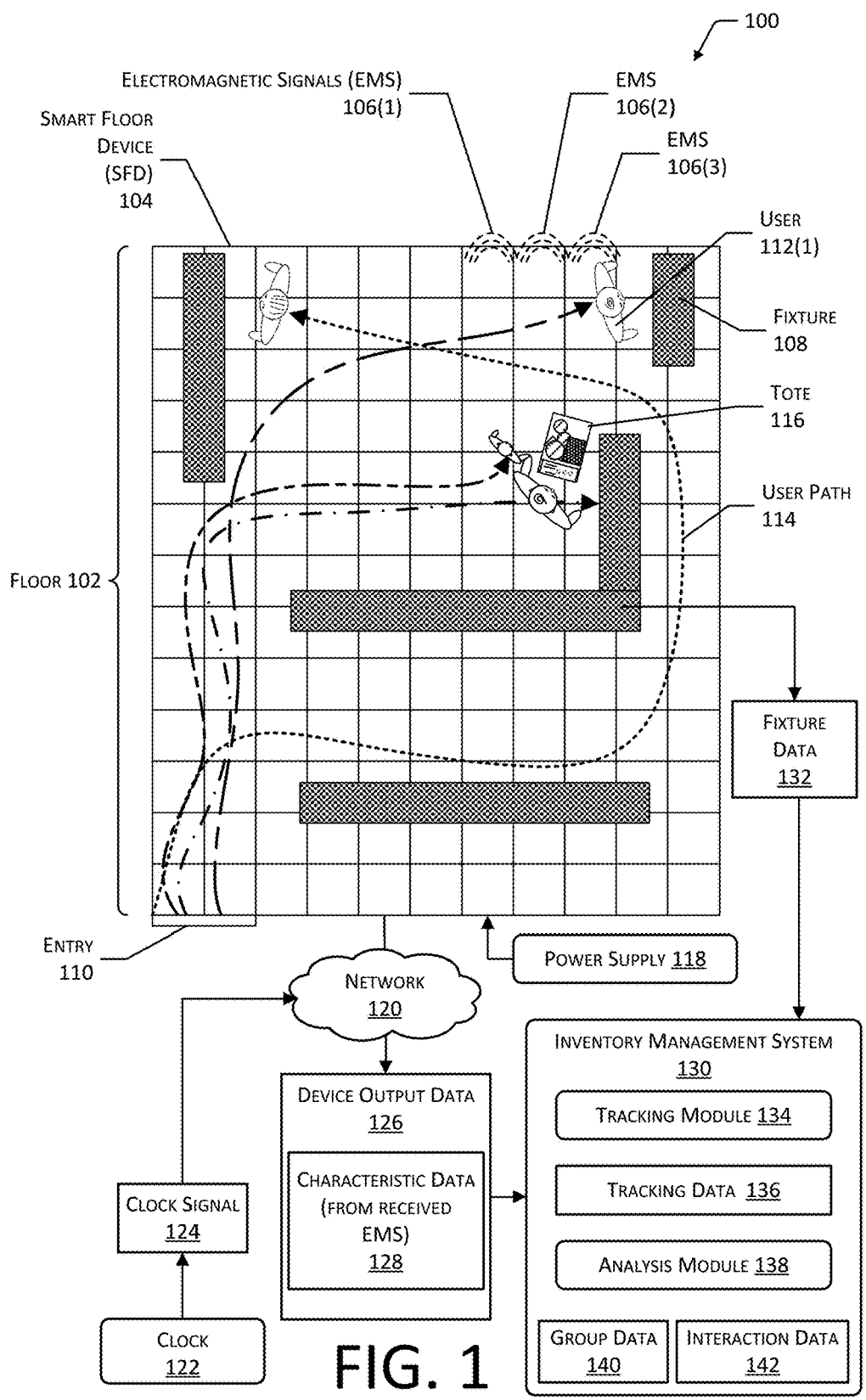
FIG. 1 illustrates a system using signals emitted by smart floor devices to generate tracking data about movement of an object, such as users or totes, within a facility, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Described in this disclosure are systems and techniques for generating data in a materials handling facility (facility). The facility may include, or have access to, an inventory management system. The inventory management system may be configured to maintain information about items, users, condition of the facility, and so forth. For example, the inventory management system may maintain data indicative of a number of items at a particular fixture, what items a particular user is ordered to pick, how many items have been picked or placed at the fixture, requests for assistance, environmental status of the facility, and so forth.

Operation of the facility may be facilitated by using one or more sensors to acquire information about interactions in the facility. The inventory management system may process the sensor data from the one or more sensors to determine tracking data, interaction data, and so forth. The tracking data provides information about the location of a user within the facility, their path through the facility, and so forth. The interaction data is indicative of an action such as picking or placing an item at a particular location on the fixture, touching an item at a particular location on the fixture, presence of the user at the fixture without touching the item, and so forth. For example, the inventory management system may use the sensor data to generate tracking data and interaction data that determines a type of item a user picked from a particular fixture.

A fixture may include one or more item stowage areas such as shelves, hangers, and so forth, that hold or otherwise support a type of item. The fixture may be arranged into sections, such as lanes on a shelf. For example, a shelf may have three lanes, with each lane holding a different type of item. Items may be added to (placed) or removed (picked) from the fixture, moved from one fixture to another, and so forth.

The floor or other surfaces of the facility may comprise a plurality of smart floor devices. For ease of illustration and not necessarily as a limitation, the systems and techniques are described herein with respect to a floor, but may also be used on other surfaces such as walls, tables, counters, and so forth.

The smart floor devices may include one or more transmitters that generate low frequency radio signals and one or more receivers that detect the low frequency radio signals. For example, the carrier of these signals may be less than or equal to 30 MHz. The smart floor devices may also include sensors such as touch or pressure sensors that provide object data indicative of an object such as a foot or wheel that is in contact with the smart floor device. Each smart floor device may include a plurality of segments. In some implementations, a segment may be configurable to transmit or receive signals from a particular antenna. For example, the smart floor device may comprise 16 segments. At a given time, an antenna at a particular segment may be used to transmit or receive a signal.

The floor of the facility may be divided into clusters. A cluster comprises a plurality of segments of the smart floor devices. The size, boundaries, location, and so forth of the cluster may be adjustable. For example, a cluster may comprise a square, rectangle, circle, irregular shape, and so forth. A cluster may include all of the segments of a smart floor device, or just some segments.

During operation of the floor, each segment within the cluster is associated with a particular timeslot. For example, the cluster may exhibit a relative arrangement of a grid having 20 rows and 20 columns, with a total of 400 segments within the cluster. The size of the cluster may be such that the total physical width and length of the cluster is large enough that a single step of a user is contained therein. For example, assuming a stride length of four feet, the cluster may comprise a square that is five feet on a side. A scan pattern describes a sequence in which the respective segments are used to transmit, receive, and so forth. This sequence may then be repeated. For example, the scan pattern may comprise, with respect to an origin at a top-leftmost position, a sequence of progressing through the segments left to right to complete a row of segments, then moving to the next row down, progressing through the segments in that next row left to right, and so forth. Thus, the top-leftmost segment may be segment 1 and the bottom rightmost segment may be segment 400 in the cluster of 400 segments. Each segment in the sequence may be associated with a particular timeslot.

As described above, the size, boundaries, location, and so forth of the cluster may be dynamically adjusted. For example, at a first time the cluster may be 20×20 segments, while at a second time the cluster may be 50×50 segments. In some implementations a scan rate at which the sequence of the scan pattern is operated may be changed as well. For example, the scan rate may be changed from 50 scans per second to 30 scans per second.

The transmissions radiated from a particular segment are scheduled to occur during a particular timeslot. The segment signal is transmitted on the frequency associated with operation of the smart floor devices. Each segment signal within a given smart floor device is transmitted during a different timeslot, or interval of time. Each segment includes at least one antenna that radiates the segment signal assigned to that segment during the timeslot. In some implementations, an initial signal may be transmitted using all of the antennas in the smart floor device prior to the transmission of the segment signals. The initial signal may operate as a preamble, providing a reference against which timing may be synchronized to determine what timeslot a particular segment signal is associated with. In some implementations, the initial signal may also be used to minimize a receiver sampling noise. For example, the initial signal may break a squelch.

A clock signal is used to synchronize the operation of the smart floor devices and the segments within. For example, a clock signal or timing signal may be distributed via a network. Each smart floor device may synchronize an internal clock to this clock signal. Subsequently, the scan pattern of the clusters may thus be synchronized. For example, at the same time during operation, the first segment in all of the clusters may be transmitting during the same time slot.

An object may electromagnetically couple to a proximate antenna in the smart floor device. For example, when a user is standing with their left foot on a first segment in a first smart floor device, their left foot electromagnetically couples to the antenna in that segment. As a result of this coupling, a first set of the signals transmitted by the first segment are transferred along the body of the user by way of this electromagnetic coupling. Continuing the example, the signals are propagated along the body of the user standing on that segment to the other extremities such as the right foot and both hands.

As the user walks, their right foot comes to rest on a second smart floor device. The body of the user now acts as a bridge, providing a signal path along which signals may travel between the first and second smart floor devices. A receiver in the second smart floor device detects the first set of signals that originated by the first smart floor device under the left foot. Meanwhile, the reverse happens with the first smart floor device detecting a second set of signals that originate from the second smart floor device and are passed from the right foot through the user's body to the left foot. The physical size of the cluster provides for suitable disambiguation, such as when the user moves from one cluster to another.

The smart floor devices may generate device output data that includes received characteristic data. The received characteristic data provides information about the signals received and may include the received signal strength of those signals. The device output data from the first and second smart floor devices may be used to determine that the user is in contact with both devices. For example, a server may receive the device output data and determine that these two smart floor devices and their respective segments are reporting received characteristic data indicative of the other smart floor device. Given this correspondence, the two locations of the received characteristic data may be associated with the feet of a single user, and a location of the user may be determined. The server may also analyze the received characteristic data obtained from several segments and estimate a shape of a user's foot.

By determining a successive series of locations of the user over time, tracking data may be generated. The tracking data comprises information indicative of the user's path through the facility.

The signals provided by the transmitters may be used to determine the relative position of the user's hand(s) with respect to a fixture, to determine an item interacting with a location, and so forth. For example, a smart floor device may transmit the signals that are then conducted through the user and detected using antennas arranged along a shelf that are connected to one or more receivers. By using the relative signal strength at the different antennas and the known position of the antennas, a position of the user's hand may be determined with respect to the shelf. When the user touches an item stored on the shelf, the signals transfer from the user to the item and from there transfer to the shelf. For example, the amplitude of the electromagnetic signal received at an antenna that is located beneath the item that is being touched may increase significantly relative to the level obtained when there is no contact. As a result of this increase, the user may be deemed to have had contact with the item stored at that location on the shelf.

Information about which user is interacting with the fixture, touching an item, and so forth, may be determined by analyzing the particular signals that are received. For example, the receiver of the shelf may generate characteristic data for the signal received at the shelf. This characteristic data may be compared with the device output data described above to determine which user is in contact with the particular smart floor devices and segments. This contact produces a characteristic pattern of signals that corresponds to the received characteristic data for the signal received at the shelf. In some implementations, the characteristic data may be obtained using signals received from a subset of the antennas at the shelf. For example, the antennas corresponding to peak received signal strength values that are used to determine the relative position may be used to produce the characteristic data. The spatial diversity between different antennas on the shelf may be used to separate out different hands, and the different characteristics may be used to distinguish one user from another.

By using the techniques described herein, operation of the facility may be improved. Details about movement of the users in the facility, the interactions between users and items in the facility, and so forth, may be quickly and accurately determined. For example, as items are picked, placed, and so forth, information such as inventory levels based on changes in the count of items at the fixtures may be readily and more accurately determined. As a result, the inventory management system may be able to quickly track what item a user has interacted with, maintain up-to-date inventory information, and so forth. Tracking of users may be facilitated, allowing for enhanced services to the users of the facility, such as making the facility respond to the presence of a user. For example, as an authorized user approaches a fixture that is locked and holding items, the fixture may unlock to provide access.

The smart floor devices provide various technical advantages including, but not limited to, reductions in bandwidth compared to other sensor methodologies, improved tracking of individual users in congested environments, detection of potential hazards, detection of user incapacity, and so forth. The smart floor devices are mechanically robust and provide high resolution tracking data for users as well as providing the ability to identify who is interacting with a particular fixture, item, and so forth. By using a single frequency across the segments in the floor, the associated circuitry and signal processing of received signals is simplified. The system described herein allows for reduced capital expenditures, as well as reduced operating expenditures relative to other sensor methodologies. For example, compared to vision tracking systems, installation of smart floor devices is less expensive and, during operation, requires fewer computational resources, is less prone to failure or environmental interference, and so forth. The smart floor devices and the information obtained thereby may be used in conjunction with other systems, such as vision tracking systems, tag tracking systems, and so forth.

The system described herein may be used in other types of facilities, both commercial and non-commercial. For example, the smart floor devices may be installed within a home or care facility and provide information such as user tracking, if the user is standing, lying on the floor, and so forth. The system may be used to improve user safety by determining the whereabouts of the user, determining if the user has fallen, and so forth. The system may also provide enhanced functionality, such as operating in conjunction with building operation. For example, by tracking the user in the facility, lighting, environmental controls, and so forth, may be controlled based on the location of the user.

Illustrative System

FIG. 1 illustrates a system 100 using a variety of sensors to generate tracking data and other information within a facility, according to some implementations. The facility includes a floor 102. The floor 102 may comprise a plurality of smart floor devices (SFDs) 104. A group of the SFDs 104 is a cluster. The floor 102 may include a plurality of clusters.

Each of the SFDs 104 may include various components such as antennas, transmitters, receivers, hardware processors, sensors, and so forth. The SFD 104 may itself be subdivided into segments. For example, each segment may comprise a different antenna. The SFD 104 may be configured to transmit and receive electromagnetic signals (EMS) 106. Groups of segments may be designated as clusters. Each segment within the cluster may be associated with a particular timeslot. During operation, the segment of the SFD 104 may transmit at a particular frequency during that particular timeslot. As a result, within the cluster, a particular segment is designated by when the segment transmits at the particular frequency. The clusters may be sized such that the physical boundaries exceed an expected stride length of users. For example, if the expected stride length is four feet, the clusters may be sized as squares that are five feet on a side. Segments are discussed in more detail below with regard to FIGS. 2 and 3.

The EMS 106 may be transmitted at a low power. For example, the EMS 106 may have a power level of less than 500 microwatts. These EMS 106 may be propagated by the body of a user. For example, the EMS 106 may be propagated along the skin or clothing of the user, travelling from one SFD 104 to another, or from one SFD 104 to another device such as the fixtures 108. Each SFD 104 may transmit several signals. The transmissions may be continuous or may be made at particular times, using one or more of the antennas of the SFD 104. The different types of signals that may be transmitted are discussed in more detail below with regard to FIG. 2. The SFD 104 is discussed in more detail below with regard to FIG. 4.

Within the facility may be one or more fixtures 108. The fixture 108 may include shelves, hangers, and so forth, that hold or otherwise support a type of item. The fixture 108 may be arranged into sections, such as lanes on a shelf. For example, a shelf may have three lanes, with each lane holding a different type of item. Items may be added to (placed) or removed (picked) from the fixture 108, moved from one fixture 108 to another, and so forth. In some implementations, the SFDs 104 may be installed, and the fixtures 108 and other objects may then be installed on the SFDs 104. In other implementations, the fixtures 108 may be installed and then the SFDs 104 may be installed around the fixtures 108. Some portions of the floor 102 may omit SFDs 104. For example, SFDs 104 may be omitted from around the perimeter of a room, immediately adjacent to a wall, underneath a fixture 108, and so forth.

An entry 110 provides access for a user 112 to the facility. For example, the entry 110 may comprise a foyer, door, gated entry area, and so forth. In some implementations, an identity of the user 112 may be asserted at the entry. For example, the user 112 may provide identification credentials such as swiping a card, carrying a device that transmits or displays authentication credentials, and so forth. The user 112 may move throughout the facility, with movement depicted in this illustration as a user path 114 across the floor 102. The user 112 may use various tools while in the facility, such as a tote 116, pallet jack, and so forth. The tote 116 may include a basket, cart, bin, bag, and so forth. During operation of the facility, users 112 thus move around, picking, placing, or otherwise interacting with items at the fixtures 108.

The SFDs 104 may obtain electrical power from a power supply 118. For example, the power supply 118 may provide 24 volts direct current (VDC) to one or more of the SFDs 104. The power supply 118 may be configured to obtain power from building mains and then provide conditioned power for use. The SFDs 104 are connected to a network 120. The network 120 allows for communication between SFDs 104 and other devices, such as described below.

A clock 122 may provide a clock signal 124 or other clock data that is transmitted to the SFDs 104 using the network 120. An interface of the SFD 104 is used to receive the clock signal 124. For example, the interface may be a communication interface such as a data network. In some implementations, the clock signal 124 may be distributed via another mechanism, such as by the power supply 118 by way of a power distribution network. For example, the clock signal 124 may be overlaid as an alternating current signal along one or more of the electrical conductors used to supply direct current power to the SFDs 104. In this example, the interface may comprise circuitry coupled to or part of the power supply 118 that detects the clock signal 124 and produces an output indicative of or based on the clock signal 124. In some implementations, the clock signal 124 may be omitted, with each SFD 104 synchronizing timing to an adjacent SFD 104.

Various techniques may be used to synchronize a clock of the SFT 104 using the clock signal 124. For example, the rising edge or the falling edge of the clock signal 124 may be used to start a clock or counter on the SFD 104. This clock on the SFD 104, so synchronized, may then be used to determine the time intervals that are designated as particular timeslots. In another example, an offset may be applied during synchronization to account for propagation delays, processing delays, and so forth. For example, the beginning of a timeslot may be designated as the time associated with a leading edge of the clock signal 124 plus an offset of 300 microseconds.

One or more processors of the SFDs 104 may generate device output data 126. The device output data 126 may include characteristic data 128. The characteristic data 128 is indicative of a plurality of EMS 106 data indicative of the received signal strength or amplitude of the signals, the frequency of the signal received, a phase delay relative to the clock signal, data indicative of the segment used to receive the data, other phase information, and so forth. In some implementations, the characteristic data 128 may include information such as a timestamp associated with the EMS 106. The characteristic data 128 is indicative of a particular SFD 104 and one or more segments of the SFD 104. The device output data 126 may include information about the SFD 104 itself and the segments thereon that received the signals that are represented by the characteristic data 128. For example, the device output data 126 may comprise characteristic data 128 for the EMS 106 received at each segment.

During operation, a first foot of the user 112 is in contact with a first SFD 104(1). The particular EMS 106(1) transmitted by the first SFD 104(1) is electromagnetically coupled to the body of the user 112 and transferred along a signal path that includes the body of the user 112 from the first foot to the second foot of the user 112. Meanwhile, a first receiver in the first SFD 104(1) is listening for EMS 106. As the second foot comes into contact with a second SFD 104(2), a bidirectional exchange of EMS 106 may take place. The first SFD 104(1) transmits a first set of EMS 106(1) (with segment signals sent during respective timeslots), which is received by a receiver of the second SFD 104(2). Meanwhile, the second SFD 104(2) transmits a second set of EMS 106(2) (with one or more segment signals sent during respective timeslots), which is received by a receiver of the first SFD 104(1).

As the user 112 walks across the floor 102, the user acts as a bridge between successive SFDs 104, resulting in a trail of pairs of SFDs 104 (or the segments therein) that have been trod upon. Device output data 126 may be generated that is indicative of the identity of the receiving SFD 104 and the characteristic data 128 indicative of the EMS 106 that were received. The device output data 126 may be transferred from the SFD 104 in the floor 102 to an inventory management system 130 via the network 120. Other information, such as the fixture data 132, may also be provided to the inventory management system 130.

The inventory management system 130 may include a tracking module 134. The tracking module 134 may use one or more of the device output data 126 or the fixture data 132 to generate tracking data 136. The tracking data 136 may include one or more of information indicative of the user path 114 within the facility, current location, location at a particular time, and so forth. In some implementations, the tracking module 134 may be executed as a tracking system, such as provided by one or more computing devices. In some implementations, the tracking module 134 may use the characteristic data 128 to further distinguish between users 112 or other objects. For example, the user 112, tote 116, or other object may include a transmitter that emits a discrete EMS 106 or a receiver that receives the EMS 106 and provides characteristic data 128. In some implementations, the distribution of received EMS 106 signal amplitude with respect to feet (such as greater signal strength at the toe than at the heel) may be used to determine an approximate shape of the foot that is indicative of a particular user 112 or other object to be tracked. This data may be used instead of, or in conjunction with, the characteristic data 128 to generate the tracking data 136.

An analysis module 138 may use the tracking data 136 to generate group data 140. The group data 140 may comprise information that associates a plurality of users 112 as belonging to a common group or having a common affiliation. For example, members of a family within the facility may be deemed to be a group, members of the same picking crew may be members of a group, and so forth. In some implementations, the device output data 126 may be processed to determine the group data 140. For example, several users 112 may be holding hands or otherwise in physical contact with one another. As a result of this contact, the EMS 106 from a first SFD 104(1) may be transferred through those users 112 to the receivers of the SFDs 104 beneath each of the other members of the group. By determining the presence of a plurality of users 112, such as by multiple footprints detected by the sensors within the SFDs 104 that share a common EMS 106 that encode the same characteristic data 128, group data 140 may be determined.

In some implementations, the analysis module 138 may utilize information about a phase delay in the received EMS 106 to determine a number of people who are in contact with one another. For example, the delay in propagation associated with one body may result in an approximately 10 degree change in phase in the received EMS 106. Continuing the example, a second body, such as one user holding hands with another, may result in an approximately 20 degree change in phase in the received EMS 106. In some implementations, group data 140 may be determined that is indicative of how many users are in contact with one another.

The analysis module 138 may also generate interaction data 142. The interaction data 142 is indicative of an action such as picking or placing an item at a particular fixture 108, approaching but not touching an item stowed at the fixture 108, presence of the user 112 at the fixture 108, and so forth. For example, the analysis module 138 may use tracking data 136 to determine that a particular user 112 was in front of a particular fixture 108 at a time when that fixture 108 experienced a change in quantity of items stowed therein. Based on this correspondence, a particular user 112 may be associated with that change in quantity, and interaction data 142 indicative of this may be generated.

The analysis module 138 may also use the fixture data 132 or other data obtained from one or more sensors or other devices located at or near the fixture 108 to generate the interaction data 142. In one implementation, the fixture 108 may include one or more receivers that are able to receive the EMS 106. As the user 112 comes into contact with the item stowed at the fixture 108, their body and the item itself provide a pathway for the EMS 106 to be transferred to an antenna located at the fixture 108. As a result, use of the SFD 104 and the EMS 106 provides the additional benefit of unambiguously identifying an item that the particular user 112 interacted with. The analysis module 138 is configured to generate the interaction data 142 based on inputs including, but not limited to, the device output data 126, the fixture 108, and so forth.

While FIG. 1 depicts the floor 102 as being completely covered with SFDs 104, in some implementations, only a portion of the floor 102 may include SFDs 104. For example, SFDs 104 may be placed within an aisle and not underneath the fixtures 108. In another example, the SFDs 104 may be deployed in front of the fixtures 108. The SFDs 104 may also be utilized on other surfaces of the facility. For example, SFDs 104 may be installed at the walls, fixtures 108, totes 116, and so forth.

The inventory management system 130 may access data from other sensors within the facility. For example, image data may be obtained from a plurality of cameras located within the facility. Various image processing techniques may be used, such as object recognition, blob tracking, and so forth, to generate information from this image data. In some implementations, the image data may be processed by human operators. For example, a human operator may be presented with images as well as tracking data 136 to resolve an ambiguity or loss of tracking.

Figure 2:
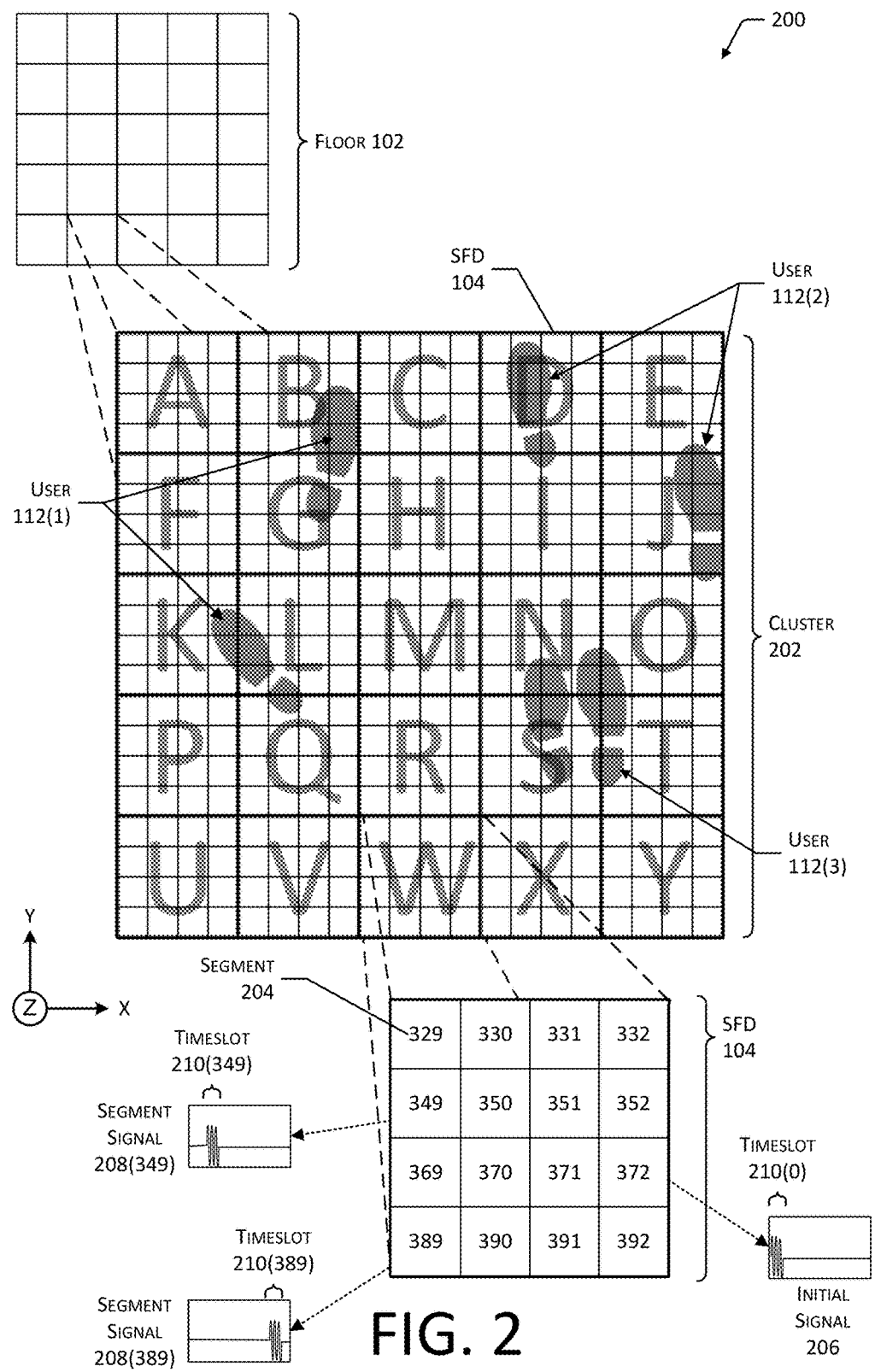
FIG. 2 illustrates an arrangement of smart floors devices and the respective segments within a cluster, according to some implementations.

FIG. 2 illustrates an arrangement 200 of SFDs 104 and their respective segments including clusters, according to some implementations.

A portion of the floor 102 is depicted which is made up of several clusters 202. A cluster 202 is a grouping of segments 204 of the SFDs 104. For example, the cluster 202 depicted here comprises 25 SFDs 104(A), 104(B), . . . , 104(Y). Each SFD 104 in turn may include one or more segments 204. Continuing the example depicted here, each SFD 104 includes 16 segments 204. In other implementations, the SFD 104 may include different numbers of segments 204. As described in FIG. 3, the cluster 202 may comprise different numbers of segments 204.

In some implementations, individual segments 204 may be part of a SFD 104, or may be discrete devices that are joined together to form a SFD 104 or cluster 202. For example, the segments 204 may be connected to one another, a backplane, wiring harness, and so forth, to form a SFD 104.

The physical size of a cluster 202 may be determined in some implementations based on a maximum expected stride length for a user 112. For example, a user 112 may be expected to have a stride length that is less than 4 feet while walking. If the SFDs 104 are 1 foot on each side, then the cluster 202 depicted here is 5 feet by 5 feet. Likewise, each segment 204 is 3 inches by 3 inches. In other implementations, other sizes of segments 204, SFDs 104, and clusters 202 may be used. Also, other shapes of segments 204, SFDs 104, and clusters 202 may be used. For example, the segments 204 may be triangular shaped, SFDs 104 may be rectangular, and so forth.

The SFD 104 transmits one or more EMS 106. For example, an initial signal 206 and one or more segment signals 208 may be transmitted. Together, these signals comprise the EMS 106 emitted by the SFD 104. The segment signal 208 may be unmodulated, or may contain null data. The EMS 106 transmitted by the SFD 104 may be at a first frequency. The segment signal 208 may be transmitted at the first frequency and includes a signal that is transmitted at a particular time within a timeslot 210. The timeslot 210, in turn, is associated with the particular segment 204 within the cluster 202. For example, a segment signal 208 received during a particular timeslot 210 may be deemed associated with the segment 204 assigned to that timeslot. In some implementations, the occurrence of the segment signal 208 at a particular time with a timeslot 210 is thus representative of the particular timeslot 210, and the corresponding segment 204 associated with that timeslot 210. In some implementations, the timeslot 210 may be 3 millisecond (ms) or less in duration. For example, the timeslots 210 may be 20 microseconds. The characteristic data 128 may include timestamp data associated with receipt of one or more of the initial signal 206 or the segment signal 208. In some implementations, the timestamp data may be used to determine the timeslot 210.

The segment signals 208 may be configured such that the first timeslot 210(1) is associated with segment 204(1), a second timeslot 210(2) is associated with a segment 204(2), and so forth. In one implementation, each timeslot 210 may be less than or equal to 20 microseconds in duration. In some implementations, the duration of timeslots 210 may differ.

For example, timeslot 210(1) may be 20 microseconds in duration while timeslot 210(2) is 50 microseconds in duration. Timing of the timeslots 210 may be synchronized to the clock signal 124. For example, the clock signal 124 may be used to synchronize the clocks in respective SFDs 104 which in turn activate their respective segments 204 during the timeslots 210 assigned to those segments.

The EMS 106 as emitted may exhibit sinusoidal waveforms. In other implementations, other waveforms such as square, triangle, sawtooth, and so forth, may be used. Use of sinusoidal waveforms may allow for reduced channel spacing and minimize adjacent channel interference. The EMS 106 may be transmitted at a carrier frequency of between 20 kilohertz and 30 megahertz. For example, the EMS 106 used by the segments 204 in the floor may be about 4 megahertz. In other implementations, other frequencies may be used. In some implementations, the waveforms of the initial signal 206 may differ from the waveforms of the segment signal 208.

In some implementations, as depicted here, each cluster 202 may utilize the same spatial arrangement of segments 204, segment number scheme, and corresponding timeslot 210 associated with that segment 204. For example, the clusters 202 in the floor 102 may all utilize the same arrangement of segments 204, such as beginning at the top left of the cluster 204 with segment 1 and increasing from left to right and into subsequent rows, such as in FIG. 3.

In this illustration, three users 112 are depicted. The right foot of user 112(1) is above the segments 204 in SFDs 104(B) and 104(G). The left foot of user 112(1) is above the segments 204 in SFDs 104(K), 104(L), and 104(Q). Also shown are the feet of users 112(2) and 112(3) at other locations within the cluster 202. A representation of the characteristic data 128 associated with the first user 112(1) is depicted below with regard to FIG. 8.

The SFDs 104 may be configurable, such that they may be installed and then configured to transmit at a particular frequency after physical installation of the SFD 104. For example, the SFDs 104 in the floor 102 may be electronically switched to generate EMS 106 at a specified frequency.

The SFDs 104 may be installed inside or outside of a building. For example, the floor 102 of an uncovered area, yard, exterior shed, and so forth may be equipped with the SFDs 104.

While the hierarchy of floor 102, cluster 202, SFD 104 and segments 204 is discussed and used herein, it is understood that other hierarchies or arrangements may utilize the techniques described herein. For example, instead of segments 204 being part of an SFD 104, the floor 102 may comprise a plurality of single-segment SFDs 104. The segment signals 208 may then be transmitted, in the appropriate timeslot 210, to indicate a particular timeslot 210. In another example, instead of arranging SFDs 104 into clusters 202, each SFD 104 may have a unique combination of one or more of frequency, timeslot, or other characteristics of EMS 106 that are used to identify a particular SFD 104 on the floor 102.

Figure 3:
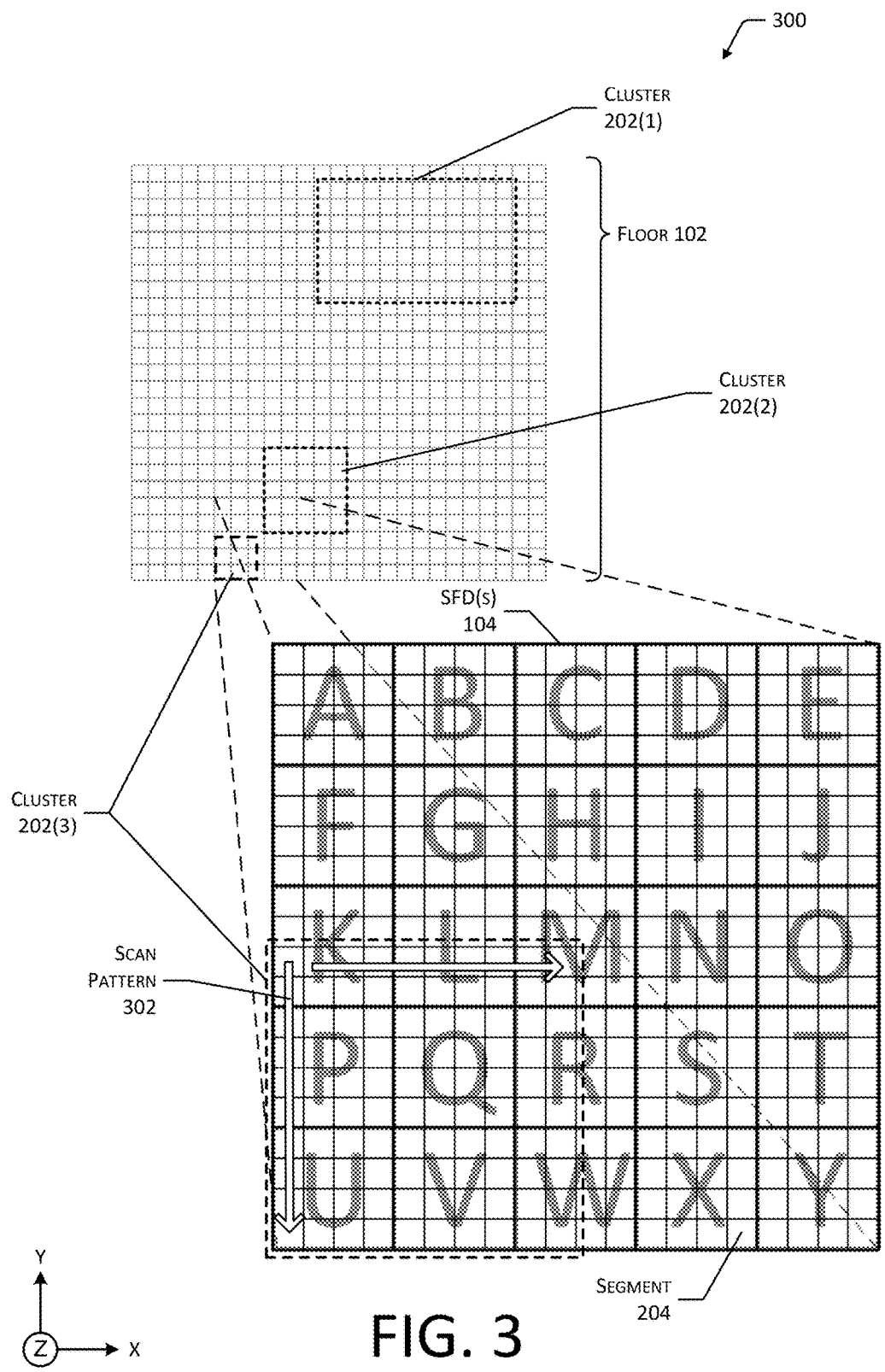
FIG. 3 illustrates various cluster configurations, according to some implementations.

FIG. 3 illustrates various cluster configurations 300, according to some implementations. As described above, a cluster 202 may be designated that encompasses a plurality of SFDs 104. In this illustration, three clusters 202(1), 202(2), and 202(3) are shown. The first cluster 202(1) exhibits a rectangular shape, while the second cluster 202(2) is square, and the third cluster 202(3) is a smaller square. The size of the cluster 202 may be changed. For example, the third cluster 202(3) comprises a 10×10 arrangement of segments 204, totaling 100 segments in the third cluster 202(3). In comparison, the cluster 202 of FIG. 2 comprises 400 segments in a square 20×20 arrangement. Other shapes of cluster 202 may be utilized. For example, a cluster 202 may comprise segments 204 arranged in hexagonal shapes, circular shapes, triangular shapes, and so forth.

An enlargement of SFDs 104 are depicted, and their respective segments 204. Within the enlargement, arrows are depicted that are indicative of a scan pattern 302 for the third cluster 202(3). The scan pattern 302 indicates the order or sequence in which different segments 204 are utilized to send or receive signals. In this illustration, the scan pattern 302 originates at the top leftmost segment 204 of the cluster 202 and progresses through the segments 204 from left to right across a row, then through the rows top to bottom. In other implementations, other scan patterns 302 may be used. For example, alternate rows or columns may be skipped to produce an interlaced scan pattern 302. In another example, a predetermined pattern may be used that involves a non-sequential progression through the segments 204.

The scan pattern 302 may be configured such that proximate segments 204 in adjacent clusters are not transmitting contemporaneously. For example, the clusters 202 may comprise square arrays of segments 204, and adjacent clusters 202 may use an identical scan pattern 302. As a result, at any given time, the physical separation between the segment 204(X) of a first cluster 202(1) that is transmitting during a timeslot 210(X) and a segment 204(X) of a second cluster 202(2) that is transmitting during the timeslot 210(X).

The scan rate, or number of times per unit time that the scan pattern 302 is used, may be adjustable. For example, a cluster 202 may be scanned at a rate of 40 scans per second. Continuing the example, the cluster 202 may be reconfigured and scanned at a rate of 10 scans per second. By changing the scan rate device output data 126 may be obtained with different temporal or spatial resolutions. For example, while tracking an object that is moving at a speed exceeding a threshold value, the scan rate may be increased. Such an increase in scan rate may decrease spatial resolution of the output. When the speed of the object drops below the threshold value the scan rate may be decreased, allowing for more precise tracking data 136 to be obtained. For example, the scan rate, cluster 202 size, cluster 202 shape, and so forth, may be dynamically changed from time to time.

During operation, the cluster 202 may be dynamically reconfigured. For example, the floor 102 may, at a first time, comprise 20×20 clusters 202, and at a second time comprise 50×50 clusters 202. In some implementations, a subcluster may be designated that is within another cluster. For example, within the third cluster 202(3), a subcluster comprising only the segments 204 within SFD 104(Q) may be designated.

Different clusters 202 may be configured to operate in different fashions. For example, the timeslots 210 associated with a first cluster 202 may have a different duration than the timeslots 210 of a second cluster 202. Continuing the example, the first cluster timeslots 210 may have a first duration and the second cluster timeslots 210 may have a second duration that is shorter than the first.

Clusters 202 may be mutually exclusive of one another during operation. For example, cluster 202(17) may have no segments 204 in common with cluster 202(18). Said another way, the boundaries of the two clusters 202(17) and 202(18) do not overlap.

Figure 4:
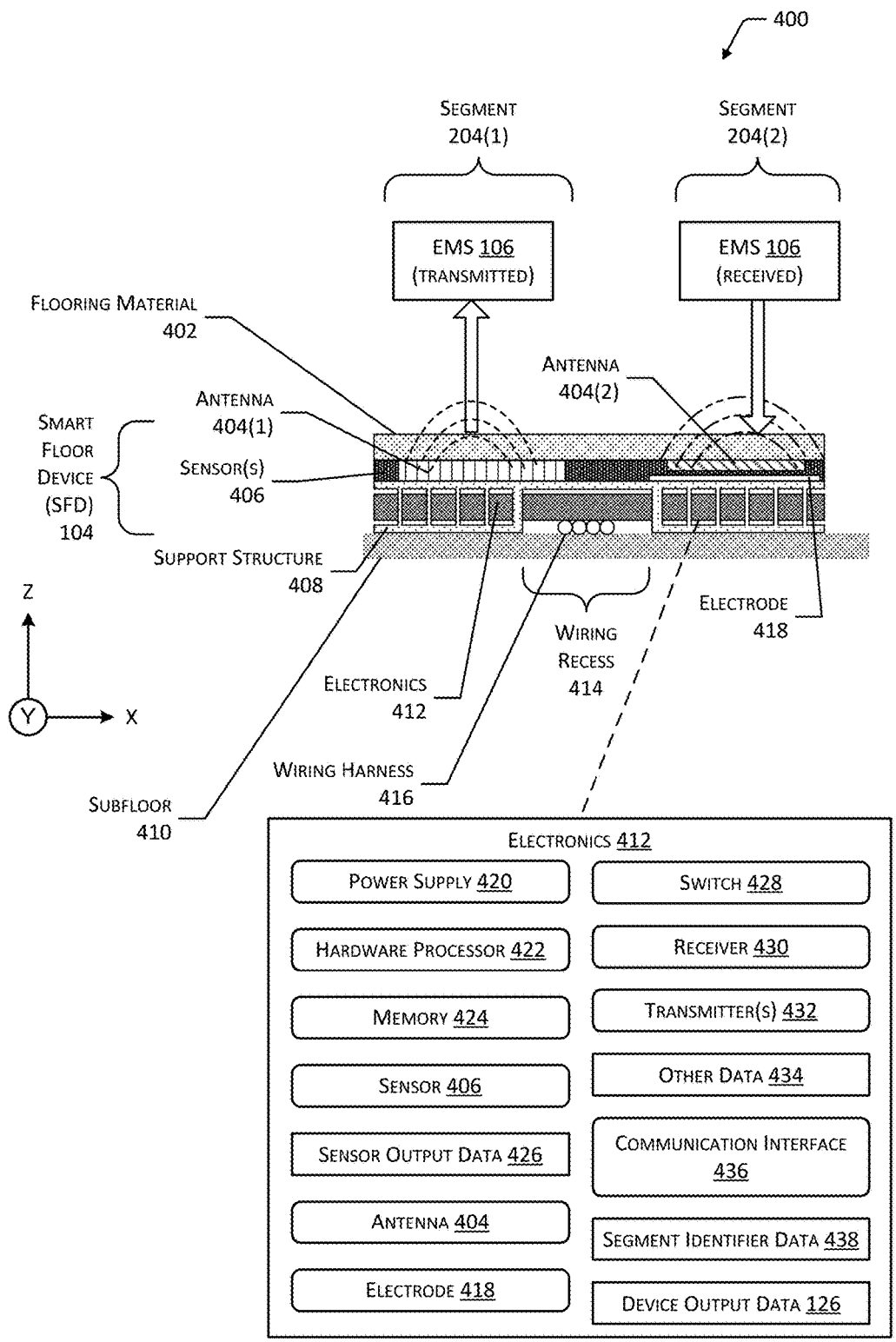
FIG. 4 illustrates the arrangement of components included in a smart floor device, according to some implementations.

FIG. 4 illustrates the arrangement 400 of components included in a SFD 104, according to some implementations. A side view of a portion of the SFD 104 depicts a top layer comprising a protective material, such as flooring material 402. The flooring material 402 is electrically non-conductive under ordinary conditions. For example, the flooring material 402 may include plastic, ceramic, wood, textile, or other material. Beneath a layer of flooring material 402 may be one or more antennas 404 and one or more sensors 406. The antennas 404 may comprise structures designed to accept or emit EMS 106. In some implementations, the antennas 404 may also serve as the flooring material 402. For example, the antennas 404 may comprise aluminum or steel sheets upon which the users 112 walk. The active portion of the antenna 404 comprises that portion of the antenna 404 that is used to radiate or receive an EMS 106.

The SFD 104 may include a plurality of antennas 404. For example, the antennas 404 may be arranged to form an array. In some implementations, the active portion of the antennas 404 may have a surface area that occupies at least 1 square inch. Each segment 204 includes at least one segment antenna 404. The segment antenna 404 of the segment 204 may be the same size as the segment 204 or may be smaller. For example, the segment 204 may be 3 inches by 3 inches square, but the segment antenna 404 in that segment 204 may only be 2 inches by 2 inches square. In another example, the segment 204 may be 3 inches by 3 inches square and the segment antenna 404 in that segment 204 may be 3 inches by 3 inches square. Each segment antenna 404 may have a maximum size of sixteen square inches, in some implementations. The size of the segment antennas 404 may be determined at least in part based on the expected size of the objects in contact with the floor 102, such as the size of the foot of the user 112. In one implementation, antennas 404 may be shared, with a single antenna 404 being used to both transmit and receive simultaneously or at different times. In another implementation, separate antennas 404 may be used to transmit and receive.

The SFD 104 may also include a plurality of sensors 406 that may be arranged to form one or more arrays. For example, the sensors 406 may include weight sensors that measure the weight applied to a particular segment 204. The sensors 406 provide sensor output data. The arrangement of an array of one type of sensor may differ from another type of sensor. In some implementations, the sensors 406 may include a magnetometer that provides information about local magnetic fields, an accelerometer that provides information about vibration, and so forth. The SFD 104 may incorporate one or more of the sensors described below with regard to FIG. 16, or other sensors.

As illustrated here, the antennas 404 may be located within a common plane. In other implementations, the antennas 404 may be arranged within a layer that is above the sensors 406, below the sensors 406, and so forth. A load bearing support structure 408 may be beneath the sensors 406 and the antennas 404 and provides mechanical and physical separation between the underlying subfloor 410 upon which the SFD 104 rests and the flooring material 402. The support structure 408 may comprise a series of pillars, posts, ribs, or other vertical elements. The support structure 408 may comprise a composite material, plastic, ceramic, metal, or other material. In some implementations, the support structure 408 may be omitted, and electronics 412 or structures associated with the electronics 412 may be used to support a load on the flooring material 402. For example, the electronics 412 may comprise a glass fiber circuit board that provides mechanical support while also providing a surface for mounting the electronics 412. The subfloor 410 may comprise concrete, plywood, or existing flooring materials over which the SFD 104 is installed. In some implementations, the SFD 104 may be affixed to the subfloor 410, or may be unaffixed or "floating". For example, the SFD 104 may be adhered to the subfloor 410 using a pressure sensitive adhesive.

The SFD 104 includes the electronics 412. The electronics 412 may include the elements described elsewhere in more detail. In the implementation depicted here, electronics 412 are arranged within the support structure 408. In some implementations, one or more of the antennas 404 or the sensors 406 may be located within the support structure 408. The support structure 408 may operate as a heat sink to dissipate heat generated by operation of the electronics 412.

The SFD 104 may incorporate a wiring recess 414 on an underside of the SFD 104. For example, the support structure 408 and the electronics 412 may be formed or arranged to provide a pathway for a wiring harness 416 to pass beneath at least a portion of the SFD 104. The wiring recess 414 may extend from one edge of the SFD 104 to another, may extend in different directions, and so forth. For example, the wiring recess 414 may be arranged in a "+" or cross shape, allowing for wiring harnesses 416 to pass along the X or Y axes as depicted here.

The wiring harness 416 may provide a coupling to one or more of the power supply 118, the network 120, and so forth. For example, the wiring harness 416 may include conductors that allow for the SFD 104 to receive electrical power from an electrical distribution network, allow for connection to a Controller Area Network (CAN) bus network that services a group of SFDs 104, and so forth. The wiring harness 416 may include electrical conductors, electromagnetic waveguides, fiber optics, and so forth. In some implementations, a plurality of wiring harnesses 416 may be used. For example, a first wiring harness 416(1) may provide electrical power while a second wiring harness 416(2) provides network connectivity. In some implementations, the wiring harness 416 may be used to provide information that is then processed to determine a relative arrangement of SFDs 104.

With respect to the antennas 404, in some implementations an electrode may be proximate to, but separated by a dielectric from, one or more of the antennas 404. The electrode 418 may be utilized to improve received signal voltage at the antenna by increasing the effective impedance for the receive antenna. The electrode 418 may increase the effective impedance by reducing the receive circuit parasitic capacitance to ground. The electrode 418 may be driven with a signal from a receive buffer output which has a unity gain, wide bandwidth, low output impedance, and a negligible phase shift in the working bandwidth. In this configuration, the receive antenna 404 to ground parasitic capacitance may be almost eliminated. For the receive antenna 404, by utilizing the electrode 418 the corresponding receive signal level, such as measured Volts peak-to-peak (VPP), may be improved by more than 50 times as compared to implementations without the electrode 418. This improved sensitivity improves overall system performance.

The electronics 412 of the SFD 104 may include a power supply 420. The power supply 420 may include an electric power interface that allows for coupling to the power supply 118. For example, the electrical power interface may comprise connectors, voltage converters, frequency converters, and so forth. The power supply 420 may include circuitry that is configured to provide monitoring or other information with regard to the consumption of electrical power by the other electrical power components of the SFD 104. For example, the power supply 420 may include power conditioning circuitry, DC to DC converters, current limiting devices, current measurement devices, voltage measurement devices, and so forth. In some implementations, the SFD 104 may be configured to connect to redundant power buses. For example, a first electrical distribution network such as an "A" bus and a second electrical distribution network such as a "B" bus may be provided, each of which can provide sufficient electrical power for operation. In some implementations, the SFD 104 may incorporate redundant power supplies 420.

The SFD 104 may include one or more hardware processors 422. Hardware processors 422 may include microprocessors, microcontrollers, systems on a chip (SoC), field programmable gate arrays (FPGAs), and so forth. The SFD 104 may also include one or more memories 424. The memory 424 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 424 provides storage of computer-readable instructions, data structures, program modules, and other data for the operation of the SFD 104.

The SFD 104 may include electronics 412. The electronics 412 may be configured to acquire information from sensors 406 of the SFD 104. In one implementation, the sensors 406 may comprise electrodes or other electrically conductive elements that are used as part of a capacitive sensor array. In one implementation, the electrodes may be arranged in an array. Each electrode may be rectangular with a first side and a second side, with the length of the first side and the second side being between 10 millimeters and 50 millimeters. In other implementations, other shapes and sizes of electrodes may be used.

The electronics 412 may include capacitance measurement circuitry that generates capacitance data. The capacitance measurement circuitry may use various techniques to determine capacitance. For example, the capacitance measurement circuitry may include a source that provides a predetermined voltage, a timer, and circuitry to measure voltage of the conductive element relative to the ground. By determining an amount of time that it takes to charge the conductive element to a particular voltage, the capacitance may be calculated. The capacitance measurement circuitry may use one or more of analog or digital circuits to determine capacitance. During operation, the capacitive sensor uses a conductive element located beneath the flooring material 402 to produce capacitance data indicating capacitance values at particular times. Based on the capacitance data, information such as a presence of an object, shape of an object, and so forth, may be generated to produce sensor output data 426. The sensor electronics 412 may be configured to scan the sensors 406 and generate sensor output data 426 at least 30 times per second. The sensor output data 426 may include information about proximity of an object with respect to a particular electrode. The sensor output data 426 may be further processed to generate the other data.

In other implementations, the sensors 406 may comprise optical touch sensors comprising one or more illuminators and one or more photodetector elements, resistive touch sensors comprising electrically resistive material, acoustic touch sensors comprising one or more transducers, and so forth. The sensors 406 may include other sensors, such as a weight sensors, moisture detectors, microphones, and so forth.

The SFD 104 may include a receiver 430. The receiver 430 is configured to detect the EMS 106. The receiver 430 may be implemented as discrete circuitry, as a software defined radio (SDR), and so forth. The receiver 430 is coupled to one or more of the antennas 404. In some implementations, a single receiver 430 may be coupled to a single antenna 404. In other implementations, a single receiver 430 may be coupled to a plurality of antennas 404 by way of a switch 428, matching network, and so forth. The switch 428 or switching circuitry may allow the selective connection of a particular antenna 404 to the receiver 430. This selective connection may include the disconnection of one antenna 404 and connection of another antenna 404 at a particular time. The receiver 430 may be configured to detect the EMS 106 at a particular frequency and generate information indicative of a received signal strength. For example, the switch 428 may operate to connect the particular antenna 404 for the segment 204 associated with a particular timeslot 210.

In some implementations the receiver 430 may utilize one or more of amplitude modulation rectification, synchronous detection, and so forth to detect the signal. For example, the received signals may be buffered, filtered with a narrow band filter, amplified, and detected using a synchronous detector. The detection may provide information about the amplitude, phase, and so forth. In some implementations the use of a synchronous detector may provide amplitude information, attenuate noise, and provide phase delay information. The output from the detector may be digitized to produce digital data. The digital data may then be analyzed for timing, to determine amplitude, and so forth using a digital signal processor (DSP). Post-processing may be used to detect proximity of an object to the segment 204 based on amplitude variation within the segment, such as changes in self-coupling, or through propagation of signals through the body of the user 112 or other object.

In some implementations, elements of the sensors 406 may be combined or used in conjunction with the antennas 404. For example, electrically conductive elements may be used for both capacitive sensing by the sensor 406 and as antennas 404. This dual use may occur at the same time or may be multiplexed over time. For example, switching circuitry may, at a first time, selectively connect the sensor electronics 412 to the electrically conductive element for use as a capacitive sensor pad. The switching circuitry may then selectively connect, at a second time, the receiver 430 to the same electrically conductive element for use as an antenna 404.

The EMS 106 is acquired by the antenna 404 and then provided to the receiver 430. For example, the receiver 430 may comprise a superheterodyne receiver, with an incoming radio signal being converted to an intermediate frequency by a mixer. At the intermediate frequency stage, the downconverted signal is amplified and filtered before being fed to a demodulator. One or more antennas 404 may be dedicated for use by the receiver 430, while one or more other antennas 404 may be dedicated for use by the transmitter(s) 432. The use of separate antennas to transmit and receive may improve isolation between the receiver 430 and the transmitter 432. The receiver 430 or the hardware processor 422 processes the EMS 106 to determine the characteristic data 128, such as a received frequency and the signal strength received at that frequency. In another implementation, the receiver 430 may comprise a SDR.

In some implementations, the EMS 106 may encode data. The receiver 430 or the hardware processor 422 may decode, decrypt, or otherwise demodulate and process the demodulated signal to determine the characteristic data 128. For example, the receiver 430 may provide as output the digital representation of a signal that incorporates binary phase shift keying (BPSK) or other techniques. The hardware processor 422 may process this digital representation to recover a serial data stream that includes framing, error control data, payload, and other information. The payload may then be processed to produce output. The error control data may include error detection data such as parity check data, parity bits, hash values, and so forth. For example, a hash function may be applied to the characteristic data 128 to generate hash output. A comparison of the hash output may be made to determine if an error is present.

The SFD 104 includes one or more transmitters 432. For example, the transmitter 432 may comprise a voltage controlled oscillator that generates an output signal that is fed directly to a power amplifier. The transmitter 432 couples to an antenna 404, which then radiates the EMS 106. The transmitter 432 may be implemented as discrete circuitry, SDR, or a combination thereof.

The transmitter 432 may accept multiple signals to generate the EMS 106 that is emitted from an antenna 404 connected to the output of the transmitter 432. In some implementations, each segment 204 may utilize a single transmitter 432 that produces an EMS 106 that includes at least the segment signal 208. In other implementations, a single transmitter 432 may be used to generate all of the EMS 106 from a given SFD 104. For example, the transmitter 432 may generate the initial signal 206 and all the respective segment signals 208 for that SFD 104 that are directed to the appropriate antennas 404 during the particular timeslots 210 by way of a switch 428 or other circuitry.

The transmitter 432 may be configured to produce an output signal that is amplitude modulated, frequency modulated, phase modulated, and so forth. The transmitters 432 for the SFDs 104 in a given floor 102 may operate on a single frequency, or may be frequency agile and operate on a plurality of different frequencies. In some implementations, the receiver 430 and the transmitter 432 may be combined or share one or more components. For example, the receiver 430 and the transmitter 432 may share a common oscillator or frequency synthesizer.

In some implementations, a single antenna 404 may be used to both transmit and receive. For example, the receiver 430 may include notch filters to attenuate the frequencies of the transmitted EMS 106. A single antenna 404 may also be used to transmit different signals. For example, a single antenna 404 may be used to transmit the initial signal 206 and a segment signal 208. In some implementations, a diplexer may be used that accepts input from two or more transmitters 432 and provides output of the EMS 106 to an antenna 404 or group of antennas 404. In other implementations, the diplexer or other filtering may be omitted, and one or more transmitters 432 may be coupled to a single antenna 404 or group of antennas 404.

The hardware processor 422 may acquire data from one or more of the sensors 406, the receiver 430, the transmitter 432, and so forth, to generate other data 434. The other data 434 comprises information about an object that is resting on or proximate to the flooring material 402. The information may be indicative of a shape of the object. In some implementations, the other data 434 may comprise information that is representative of the contours of an object. For example, the other data 434 may comprise a bitmap representative of the output from a plurality of sensors 406 and indicative of their relative arrangement. In another example, the other data 434 may comprise a vector value that is indicative of polygons used to represent an outline of an object. In some implementations, the other data 434 may be indicative of an area of the object. For example, the other data 434 may indicate that the total area of an object is 48 square centimeters. The other data 434 may include other information such as information about amplitude of a received EMS 106 with respect to different portions of the object. For example, other data 434 may be generated that indicates the shape of the object with information about amplitude, frequency, or other details about the EMS 106 at particular points or areas within that shape.

In some implementations, one or more of the receivers 430 or the transmitters 432 may be used to generate the sensor output data 426. For example, sensors 406 may communicate with the power supply 420 to determine the amount of electrical current that is being drawn at a particular time by the transmitter 432. As the electrical coupling between an object above the SFD 104 and one or more of the antennas 404 changes, one or more operating characteristics of the devices in the SFD 104 may change. For example, the impedance of the antenna 404 may experience change. Changes in the impedance may result in a change in the power output of the transmitter 432 during operation. For example, the transmitter 432 may exhibit an impedance mismatch with the antenna 404 in the presence of an object, such as a foot. This impedance mismatch may result in reduced power consumption by the radio frequency amplifier of the transmitter 432. Information about changes in the operational characteristics, such as a change in current draw by the transmitter 432, may be processed to determine the presence or absence of an object with respect to the antenna 404. The operating characteristics may include, but are not limited to: received signal strength at the receiver 430, power consumption of the transmitter 432, radio frequency power output of the transmitter 432, impedance presented at an antenna 404, standing wave ratio (SWR), and so forth. For example, the impedance of the antenna 404 may be measured at a radio frequency input to the receiver 430, a radio frequency output of the transmitter 432, and so forth. In another example, the SWR presented by one or more of the antenna 404 may be similarly measured. In other implementations, other operating characteristics may be used. For example, a change in the noise detected by the receiver 430 may be used to determine presence or absence of an object. In yet another implementation, the transmitter 432 of the SFD 104 may generate a signal that is then received by the receiver 430 of the same SFD 104. A change in the received signal at a particular antenna 404 may be used to determine the presence of an object. In still another implementation, the EMS 106 received from the other SFD 104 may be measured, and the received signal strength at particular segments 204 may be used to generate information indicative of the presence of an object.

By combining information from a plurality of antennas 404, other data 434 may be generated. In other implementations, other characteristics of the receiver 430 or the transmitter 432 may be assessed to generate the other data 434 or other information indicative of proximity of an object to the antenna 404. For example, the change in impedance may be measured, a change in background noise level may be measured, and so forth. In some implementations, radio ranging may be utilized in which the transmitter 432 emits a pulse and the receiver 430 listens for a return or echo of that pulse. Data indicative of proximity from several antennas 404 may then be processed to generate the other data 434. In another implementation, distance between the object and the antenna 404 may be determined using the amplitude of the received EMS 106. For example, a lookup table may be used that associates a particular received signal strength with a particular distance from the antenna 404.

The communication interface 436 connects the SFD 104 to the network 120. For example, the communication interface 436 may be able to connect to one or more of a Controller Area Network (CAN bus), Inter-Integrated Circuit (I2C), Serial Peripheral Interface bus (SPI), 1-Wire bus, Universal Serial Bus (USB) as promulgated by the USB Implementers Forum, RS-232, Ethernet, Wi-Fi, Bluetooth, and so forth. The communication may be facilitated by data connectors, such as optical connectors, electrical connectors, and so forth. The data connectors provide a pathway for signals to be exchanged between the communication interface 436 and the network 120.

The SFD 104 may include non-transitory computer readable media that is used to store instructions, data, and so forth. Segment identifier data 438 comprises information indicative of a particular segment 204. In some implementations, the segment identifier data 438 may be indicative of a particular segment 204 of a particular SFD 104. The segment identifier data 438 may be unique within the cluster 202, the particular network 120, the facility, unique across the production of all SFDs 104 manufactured, and so forth. In some implementations, a media access control (MAC) address, network address, bus address, and so forth, that is associated with the communication interface 436 may be used as segment identifier data 438.

During operation, the hardware processor 422 may generate device output data 126. As described above, the device output data 126 may include the characteristic data 128. In some implementations, the device output data 126 may indicate the characteristic data 128 that was received by the SFD 104, the particular antennas 404 or segments 204 associated with that reception, information about the frequencies of EMS 106 that are being received, phase information, and so forth. The device output data 126 may also include the segment identifier data 438, timestamp data, and so forth. For example, the timestamp data included in the device output data 126 may indicate when the characteristic data 128 was received by the receiver 430.

The SFD 104 may include multiple hardware processors 422 with different capabilities. For example, individual elements of the sensors 406 may utilize dedicated state machines to perform simple processing functions. These dedicated state machines may then send output data to a microcontroller that provides additional processing to generate sensor output data 426. In one implementation, the dedicated state machine may comprise a complex programmable logic device (CPLD). Continuing the example, a dedicated state machine may provide a 4 bit value indicative of the capacitance measured by a capacitive sensor 406 at a particular location on the SFD 104. The microcontroller may have information that describes a relative arrangement of the sensors 406, and may use this information in conjunction with the dedicated state machine output to generate a bitmap that may be included in the other data 434.

Various techniques may be used to increase the overall uptime of an individual SFD 104, and functionality of the floor 102 as a whole. In one implementation, the SFD 104 may include additional components to provide for failover redundancy. For example, the SFD 104 may include at least two hardware processors 422, each of which is able to generate other data 434, generate device output data 126, and so forth. In another example, the SFD 104 may include two power supplies 420, each connected to a different bus or power supply 118.

To provide additional redundancy, adjacent SFDs 104 may be connected to different networks 120. For example, an SFD 104 may be connected to a first network 120(1) while the SFD 104 immediately to the right may be connected to a second network 120(2).

The SFD 104 may be configured to perform diagnostics of onboard components, adjacent SFDs 104, and so forth. For example, the SFD 104 may be configured to test the receiver 430 and the transmitter 432 by transmitting a signal from the first antenna 404(1) and listening with the receiver 430 with a second antenna 404(2) that is adjacent to the first antenna 404(1). In some implementations, the SFD 104 may be configured to send diagnostic data using the network 120. For example, diagnostic data may be sent to the inventory management system 130 indicating that a particular SFD 104 has a fault and requires repair or replacement. The SFD 104 may be designed in a modular fashion to allow for repair or replacement without affecting adjacent SFDs 104.

In some implementations, operation of the SFD 104 or the segments 204 therein may be responsive to presence or absence of an object. For example, segments 204 that are proximate to or underneath the object forming a shape may be deemed active segments. Antennas 404 associated with these active segments may be used transmit or receive the EMS 106. Inactive segments comprise segments 204 that are not underneath or proximate to the shape. The determination of whether a segment 204 is active or not may be based at least in part on output from the sensors 406, antennas 404, or other sensors. For example, a segment 204 may be deemed to be an active segment when the associated sensor element exhibits a capacitance value that exceeds a threshold level.

During operation, the determination of which segments 204 are active may be used to determine which antennas 404 are used to one or more of transmit or receive the EMS 106. For example, the antennas 404 beneath inactive segments may be disconnected from receivers 430, or the receivers 430 associated with those antennas 404 may be placed in a low power mode or turned off. As an object is detected by the sensor 406 as driven using the sensor electronics 412, a particular segment 204 may be designated as an active segment. The antenna 404 and associated radio frequency elements such as the receiver 430 and the transmitter 432 associated with that antenna 404 may be transitioned to an operational mode. Continuing the example, the receiver 430 may begin listening for an EMS 106.

The SFD 104, or portions thereof such as segments 204, may transition from a receive mode to a transmit mode or vice versa. This transition may be responsive to the detection of an object by the sensor 406. For example, the presence of an object followed by the absence of the object may result in the SFD 104 transitioning from the transmit mode to the receive mode.

By selectively transmitting the EMS 106 using antennas 404 that are within a threshold distance of the shape as determined by the sensors 406, performance of the system may be improved. For example, power consumption may be reduced by transmitting using only those antennas 404 that are proximate to the object producing the shape. In other implementations, the transmitters 432 may be activated on a particular schedule, such as transmitting for 50 milliseconds (ms) duration with a gap waiting time of 100 ms before the next transmission. This reduction in duty cycle decreases power consumption.

In some implementations, segments 204 may be in transmit mode while the receiver 430 is still active. For example, the transmitters 432 may transmit while the receiver 430 is listening.

The sensors 406 in the SFD 104 may be used to determine the presence of hazardous conditions at the SFD 104. For example, the sensors 406 may be able to detect a liquid that is present on the flooring material 402 that may comprise a slipping hazard. Continuing the example, a puddle of water on the flooring material 402 may be detected. Information indicative of the puddle may be provided to the inventory management system 130 for mitigation, such as clean up. In another example, the sensors 406 may be able to detect a user 112 lying on the flooring material 402. Upon such detection, an attendant of the facility may be alerted to provide assistance to the user 112. With this example, the floor 102 provides information to the operators of the facility that may be used to improve the safety of the facility for the users 112.

The SFD 104 may be implemented in a variety of form factors including, but not limited to, rigid floor tiles, semi rigid floor tiles, flexible tiles, flexible sections, and so forth. In one implementation, the SFD 104 may comprise a rigid floor tile, such as when the support structure 408 prevents flexure during typical handling and use. In another implementation, one or more SFDs 104 may be affixed to a flexible backing such as an elastomeric material or a textile. In this implementation, one or more SFDs 104 may be rolled up, as with a carpet, for easier storage and transport prior to installation. With this implementation, one or more of the components may be designed to flex. For example, the antennas 404 may comprise conductive materials on a flexible substrate, the electronics 412 may comprise low-profile components interconnected by a flexible printed circuit board, and so forth.

Figure 5:
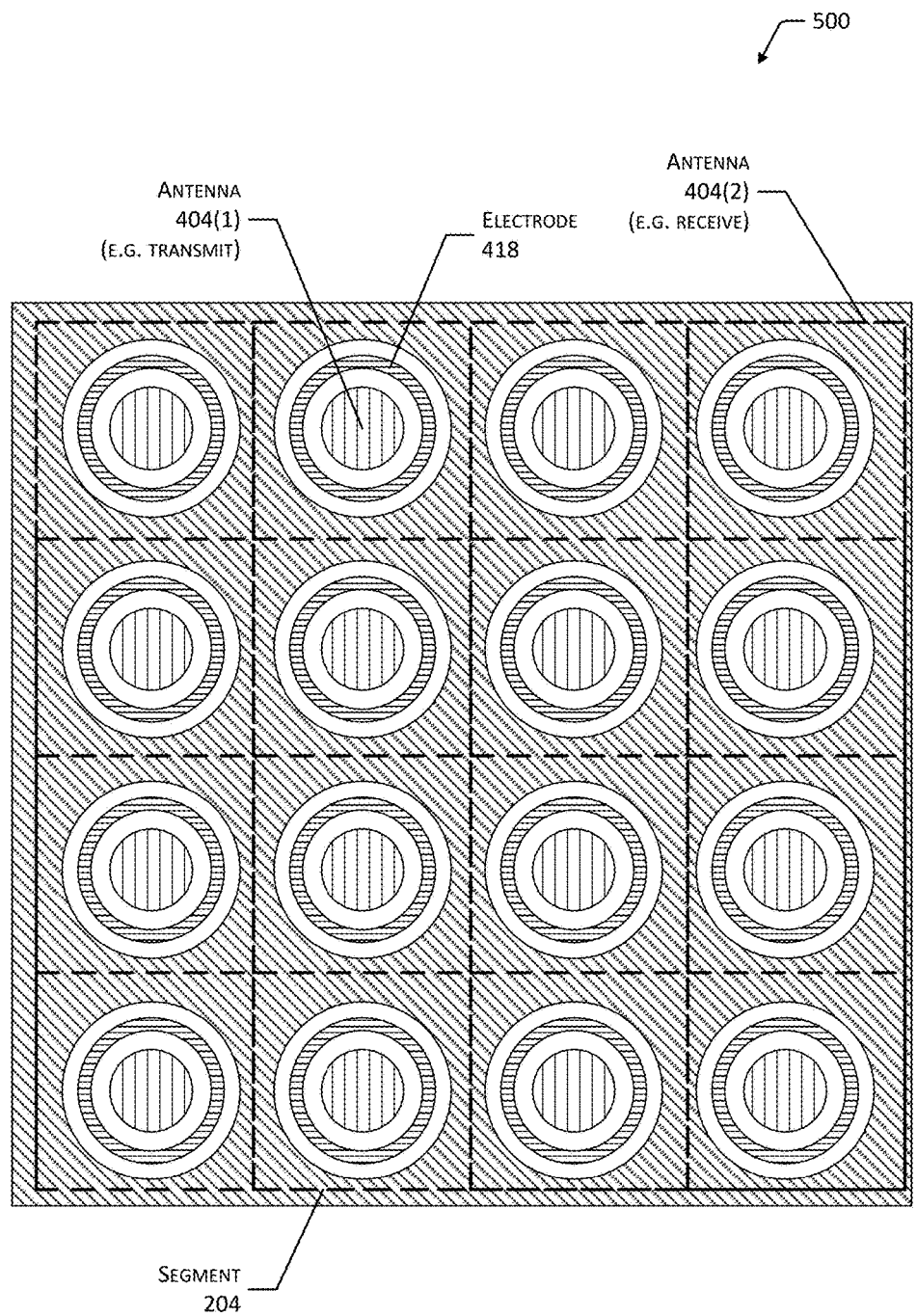
FIG. 5 illustrates antenna layout within the smart floor device, according to some implementations.

FIG. 5 illustrates antenna layout 500 within the smart floor device 104, according to some implementations. Depicted here, the antenna 404(2) that is used to receive EMS 106 comprises a conductive layer. Each segment 204 includes an antenna 404(1) that is separated by a gap or dielectric from the electrode 418. While the layout depicts the antennas 404(1) and electrodes 418 as circular, in other implementations other shapes or configurations may be utilized. In other implementations, discrete antennas 404(2) may be provided for each segment 204. For example, each segment 204 may contain a discrete antenna 404(2) used for receiving EMS 106.

Figure 6:
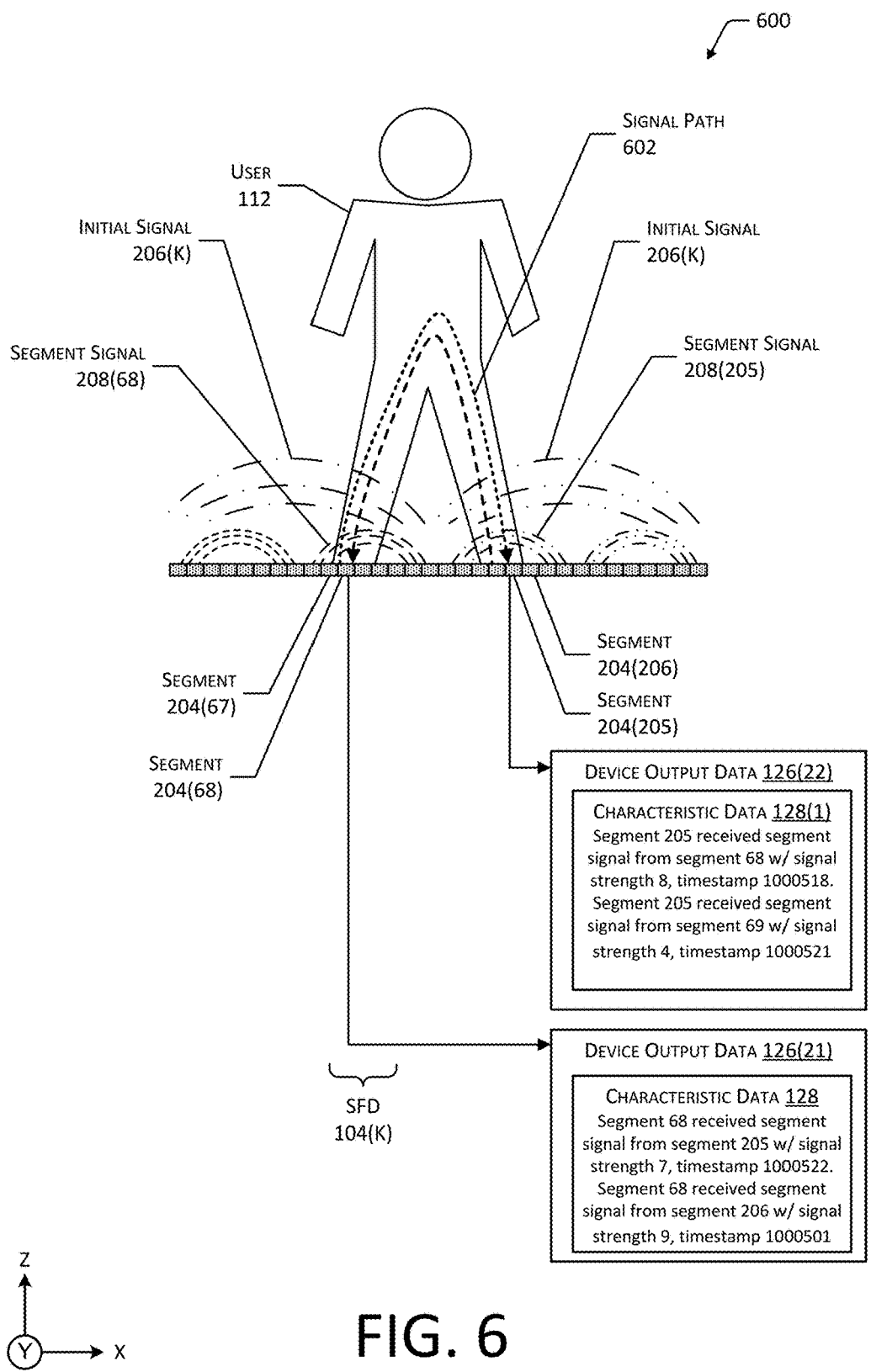
FIG. 6 illustrates the signals transmitted by the smart floor devices and the corresponding device output data, according to some implementations.

FIG. 6 illustrates at 600 the mixing of EMS 106 transmitted simultaneously by the SFDs 104, according to some implementations. The body of the user 112, or another object proximate to the antenna 404, may electromagnetically couple to the antenna 404. This electromagnetic coupling may include, but is not limited to, capacitive coupling, electrostatic coupling, inductive coupling, and so forth. In other implementations, other types of coupling may take place. Once coupled, a signal path 602 is provided that incorporates the body of the user 112, their clothing, other users 112 they are in contact with, and so forth.

As described above and illustrated here, each SFD 104 and the respective segments 204 thereof may transmit signals at a particular frequency and during particular timeslots 210. In some implementations each segment 204 may emit from its respective one or more antennas 404 both the initial signal 206 and the respective segment signal 208. In this example, the user 112 is standing with a left foot on segments 204(67) and 204(68), and thus the body of the user 112 acts as the signal path 602 of the EMS 106 to a right foot on segments 204(205) and 204(206), and vice versa. Each of the SFDs 104 produces device output data 126 that is indicative of the segment identifier data 438 of the receiving segment 204.

The SFD 104 produces device output data 126(21) that is indicative of the signals received by the SFD 104 at the different timeslots 210. Within the characteristic data 128, the frequency of the signal and the combination of the various timeslots 210 presented and their received signal strength provide information as to the placement of the foot with respect to a SFD 104. As the foot of the user 112 rests across different segments 204, and possibly different SFDs 104, it electromagnetically couples to the antennas 404 therein.

The device output data 126 thus provides information about the location of a foot. Given the exchange of EMS 106 from one SFD 104 to another, a pair of SFDs 104 (or locations therein) may be determined. Because of the reciprocity of the exchanges of EMS 106 and the resulting characteristic data 128, the two feet may be associated with a single user 112. In some implementations, a location of the user 112 may be determined to be between the feet locations. For example, the tracking module 134 may generate tracking data 136 that indicates the location of the user 112(1) is at a midpoint between their left and right footprints.

The tracking module 134 may utilize certain assumptions or rules in the determination of a location of the user 112. For example, the user 112 may be assumed to have two feet, the feet may be assumed to have a minimum length of 4 inches but less than 20 inches, and so forth. The tracking module 134 may also utilize data about the physical layout of the facility. For example, the physical arrangement of the SFDs 104 with respect to one another, the arrangement of the segments 204 therein, and so forth, may be used.

Figure 7:
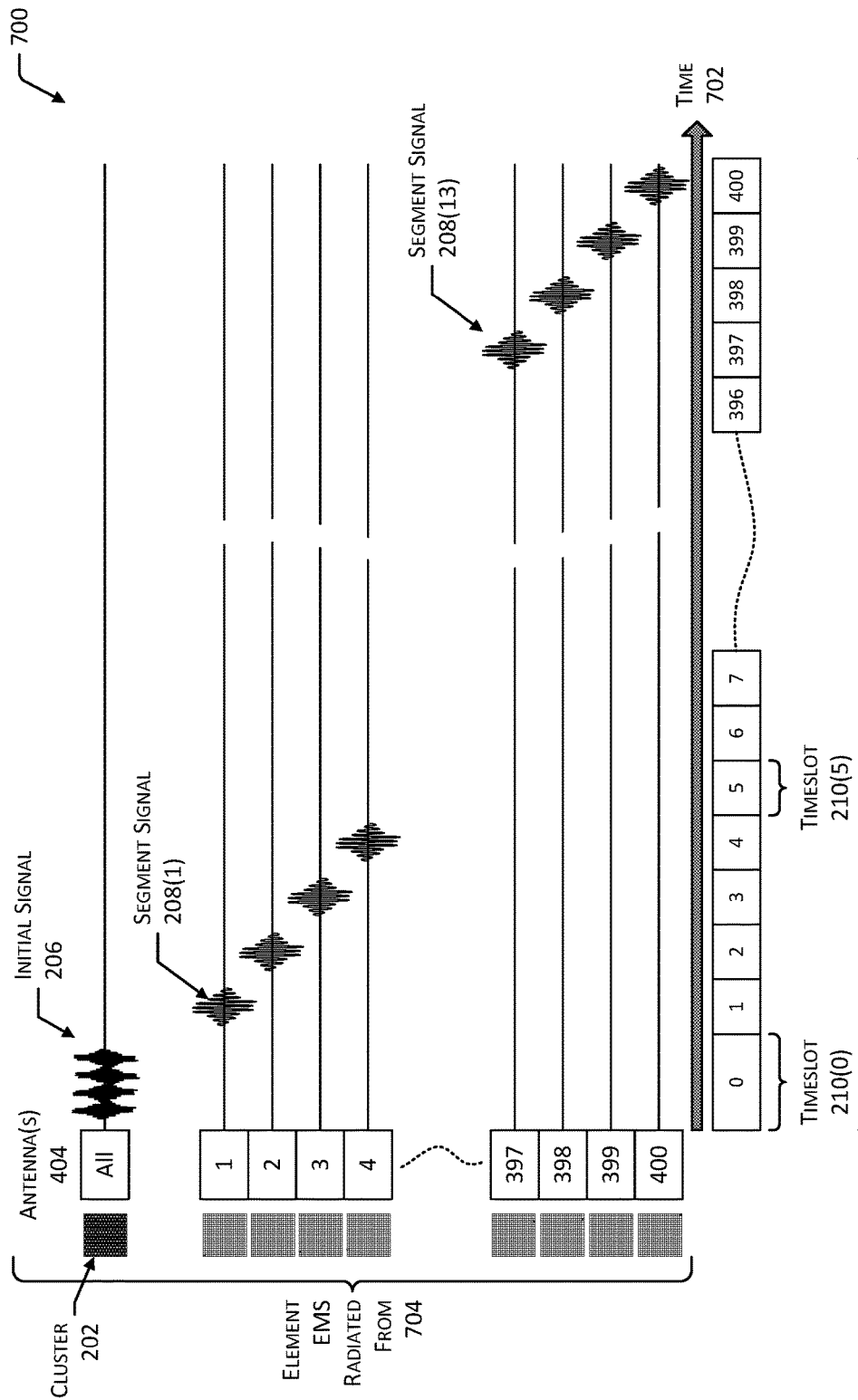
FIG. 7 illustrates the antennas at particular segments within the cluster that are used to emit signals in their respective timeslots, according to some implementations.

FIG. 7 illustrates a chart 700 of the antennas 404 of the SFD 104 that are used to emit EMS 106 in their respective timeslots 210, according to some implementations. As described above, each SFD 104 emits an EMS 106. During specified timeslots 210, the segment signal 208 is radiated from a particular antenna 404 in a particular segment 204.

In this illustration, the horizontal axis indicates time 702 increasing left to right. Various timeslots 210 ranging from timeslot 210(0) to 210(400) are depicted along the horizontal axis as well. The number of timeslots 210 is associated with the number of segments 204 for the cluster 202. For example, the cluster 202(3) with 100 segments may have 100 timeslots 210, while the cluster 202 with 400 segments may have 400 timeslots 210.

In some implementations, an additional or first timeslot 210(0) may be provided for the initial signal 206. During the first timeslot 210(0), the initial signal 206 may be transmitted using one or more of the antennas 404. For example, as depicted here, all of the antennas 404 of the SFD 104 may be used to radiate the initial signal 206. In other implementations, other arrangements of antennas 404 may be used. For example, every other antenna 404 may be used, or a dedicated antenna 404 that extends across the SFD 104 may be used. As described above, the initial signal 206 may be used by a receiver 430 for synchronization.

In some implementations, the initial signal 206 and corresponding timeslot 210(0) may be omitted. For example, instead of the initial signal 206 being transmitted, the clock signal 124 may be used to synchronize the SFDs 104. The synchronization of the SFDs 104 does not have to be stringent. Instead, adjacent SFDs 104 may be synchronized to one another within a threshold limit. For example, SFD 104(1) and SFD 104(2) which are next to one another may be synchronized to within 1 ms, while SFD 104(1) and SFD 104(3,127) at opposite ends of the facility may be out of sync due to propagation delays of the clock signal 124, with the system still operating normally. In one implementation, the clock signal 124 may be received by the SFD 104. A clock 122 onboard the SFD 104 may be set based on the timing signal. Once set, the clock 122 may be used to determine timing for when timeslots 210 begin, end, and so forth. In another implementation, the clock signal 124 may be used directly to provide timing indicative of particular timeslots 210.

The initial signal 206 may also provide other operational benefits. For example, the initial signal 206 may be used to minimize the sampling of noise by the receiver 430 by acting as a signal to break squelch on the receiver.

The vertical axis depicts the various elements that the EMS 106 is being radiated from 704. For example, the initial signal 206 is radiated using all antennas 404. During timeslot 210(1), the segment signal 208(1) is radiated from the one or more antennas 404 associated with the first segment 204(1). Likewise, during timeslot 210(2), the segment signal 208(2) is radiated from the one or more antennas 404 associated with the second segment 204(2), and so forth. During the particular timeslot 210, each segment 204 thus radiates an EMS 106.

A sequence 706 comprises the particular pattern of emission of the EMS 106 from the respective antennas 404 as described. The sequence 706 may be repeated. For example, the sequence 706 may continuously loop, with the SFD 104 transmitting the initial signal 206 and segment signal 208 in the respective timeslots 210 at the designated frequency in use by the floor 102.

In some implementations, the SFD 104 may use different frequencies to transmit the segment signals 208. For example, in addition to transmitting during particular timeslots 210 and using particular antennas 404 for a particular segment 204, each segment signal 208 may be transmitted at a different frequency.

In some implementations, one or more of the initial signal 206, the segment signal 208, or other EMS 106 may be modulated to convey information. For example, the segment signal 208 may be modulated to include a 4 bit value. The information conveyed may be indicative of the SFD 104 identifier, a segment identifier, power output level of the transmitted signal, and so forth. In another example, the initial signal 206 may be modulated to include a predetermined preamble value, such as a predetermined series of all binary 0's, all binary 1's, alternating binary 0's and 1's, and so forth.

In some implementations, each SFD 104 may comprise a single segment 204, with that segment 204 associated with a particular timeslot 210. As a result, each single-segment SFD 104 would transmit within a particular timeslot 210 to identify itself.

Figure 8:
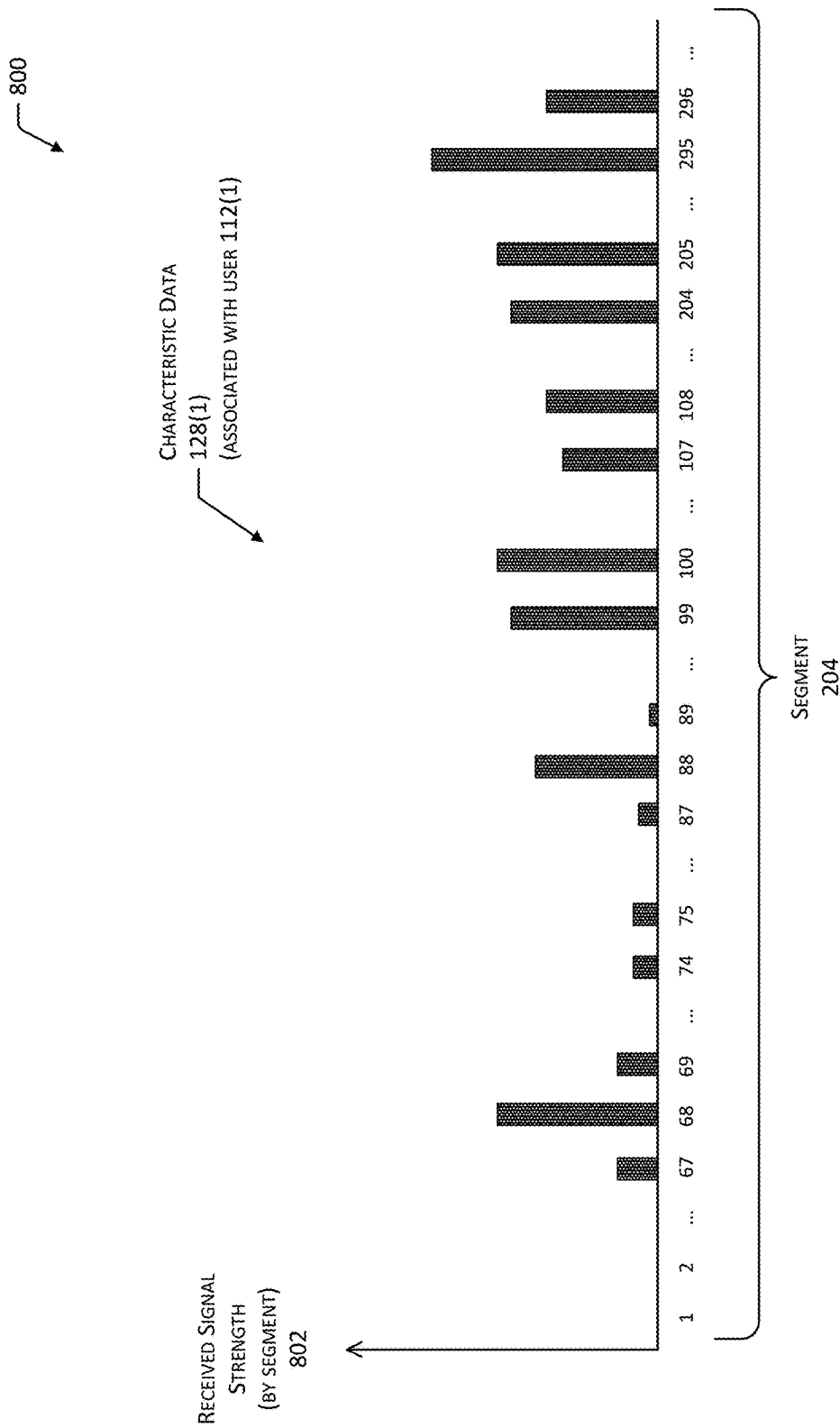
FIG. 8 illustrates a graph of the received signal strength at various segments within a cluster, according to some implementations.

FIG. 8 illustrates a graph 800 of the received signal strength at various segments 204 within a cluster 202, according to some implementations. In particular, part of the characteristic data 128 for the user 112(1) shown in FIG. 2 is depicted. The characteristic data 128 may be generated using data obtained by a receiver 430 in a SFD 104 or a fixture 108, according to some implementations. In this illustration, a portion of the characteristic data 128(2) of the EMS 106 that are propagated through the signal path 602 of the user 112(1) is shown. For example, the graph 800 may result from the combination of characteristic data 128 obtained from the segments 204 indicated.

The graph 800 depicts the received signal strength 802 by segment 204. The received signal strength 802 by segment 204 may be indicative of a maximum value for all signals received during the timeslot 210 for the indicated segment 204, a cumulative signal strength that comprises a sum of the received signal strengths received for that timeslot 210, an average signal strength of the values of received signal strengths for that timeslot 210, and so forth. In some implementations, the received signal strengths 802 by segment 204 may be calculated for the received signal strength of a signal received during one or more sequences 706.

The characteristic data 128 is depicted here in graphical format, but it is understood that the characteristic data 128 may be represented using various data structures including, but not limited to tables, linked lists, delimiter separated values, serialized data, and so forth.

Because the user 112(1) is standing on different segments 204, different amplitudes of received signal strengths at the segments 204 are exhibited. For example, as user 112(1) is standing on segments 204(67-69), the characteristic data 128(1) will show peaks corresponding to these segments 204.

By processing the characteristic data 128, a location for each foot may be obtained. Additionally, because of the bidirectional propagation along the signal path 602, the association between the feet of a single user 112 may be determined. Given the distribution of the received signal strength 802 and the indicated segments 204, the known arrangement of the SFDs 104, and the segments 204 therein with respect to one another, the relative positions of the left and right feet of a user 112 may be reconstructed.

In one implementation, another frequency allocation scheme may be used. For example, all of the segments 204 in a cluster 202 may use the same frequency to transmit, but another adjacent cluster 202 may use a different frequency to transmit.

Figure 9:
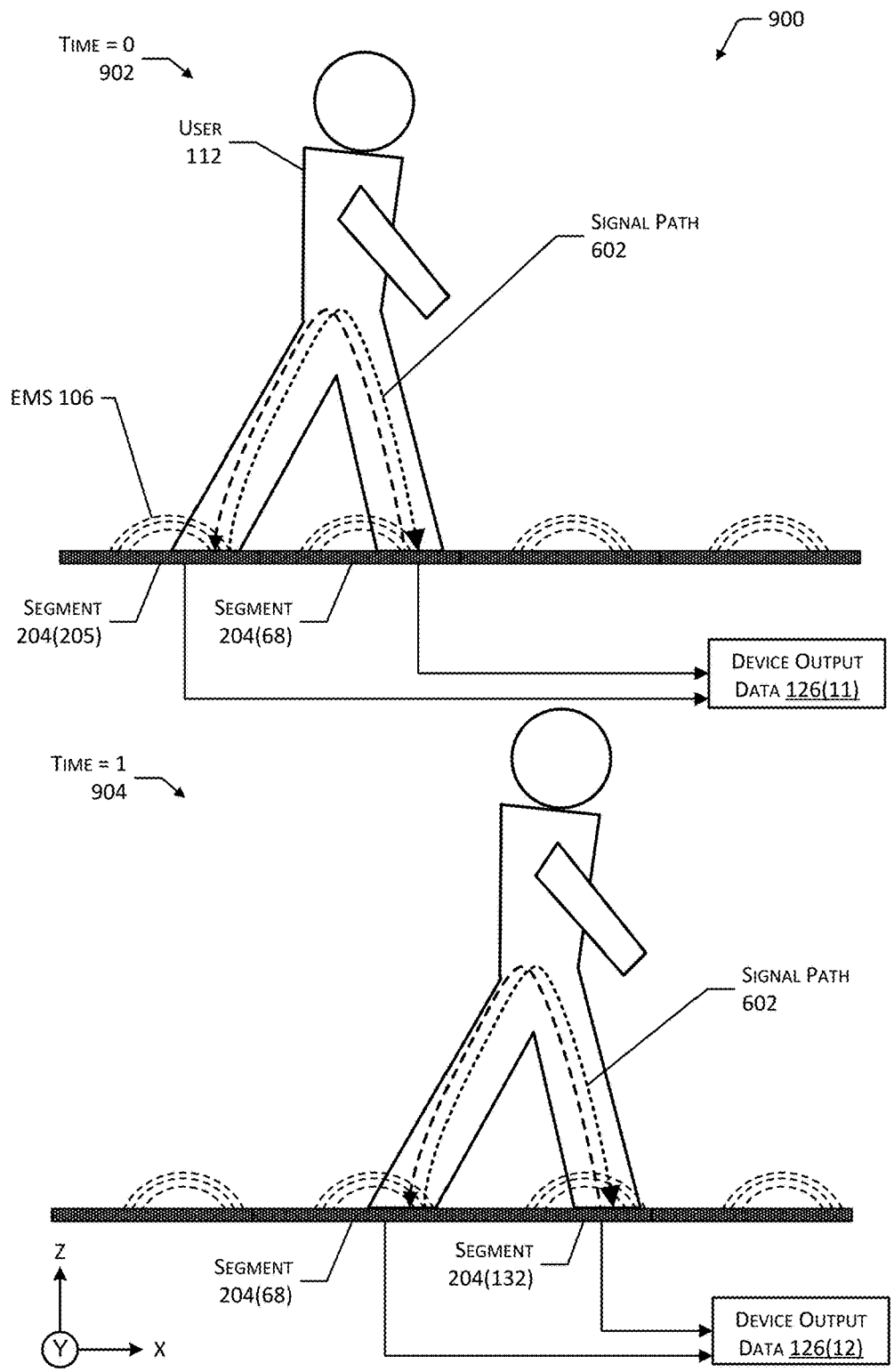
FIG. 9 illustrates tracking of a user as they move across the smart floor devices, according to some implementations.

FIG. 9 illustrates tracking 900 of a user 112 as they move across the SFDs 104, and the corresponding segments 204 of a cluster 202, according to some implementations. At 902, the user 112 is shown at a first time=0. Based on the device output data 126(11), a first location of the user 112 is determined as being between the locations of the left foot at segment 204(205) and the right foot of the user 112 at segment 204(68). At 904, the user 112 is shown at a second time t=1. A second location of the user 112 is determined as being between segments 204(68) and 204(132). A time series of these user locations may be used to describe the user path 114. As described above, if the entry 110 involves identification, authentication, or other functions, this identity may be asserted with the user 112 as they move throughout the facility across the floor 102 along the user path 114.

Figure 10:
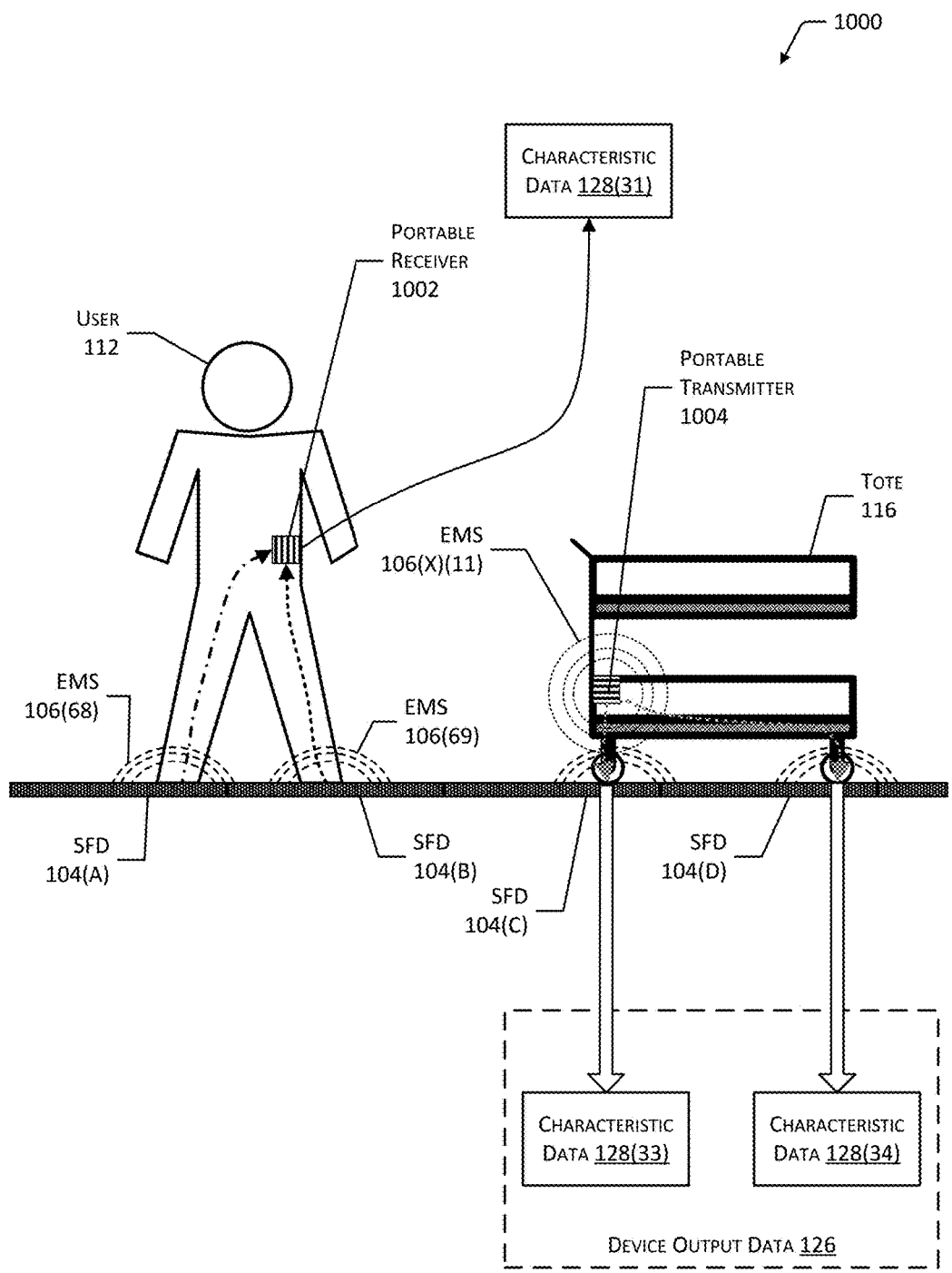
FIG. 10 illustrates the use of a portable receiver and a portable transmitter that interact with the smart floor devices, according to some implementations.

FIG. 10 illustrates the use 1000 of a portable receiver 1002 to detect the signals transmitted by the segments 204 in the SFDs 104, according to some implementations. The user 112, a tote 116, or other object may be equipped with the portable receiver 1002. The portable receiver 1002 may be electromagnetically coupled to the user 112 and is configured to receive the EMS 106 and generate data such as the characteristic data 128, an identifier of the portable receiver 1002, a timestamp, and so forth. For example, the portable receiver 1002 may include a communication interface such as Wi-Fi or Bluetooth compliant network interface that allows for wireless exchange of data with another computing device. The portable receiver 1002 may acquire the characteristic data 128 and send this characteristic data 128 to a server or other computing device. The portable receiver 1002 may be associated with a particular user account, such as that of an associate or affiliate of the facility. The portable receiver 1002 may obtain the characteristic data 128 such as shown in FIG. 8. The characteristic data 128 may be sent via the communication interface to a server that determines the user 112 is located at a position centered on a particular segment 204.

In another implementation, the user 112 or other object may utilize a portable transmitter 1004. The portable transmitter 1004 transmits an EMS 106 at a particular frequency, timeslot 210, or coding that will result in a receiver generating characteristic data 128 associated with that particular object. Similar to that described above, the system may use the characteristic data 128 to specifically identify one or more of a particular category or specific identity of a particular user 112, tote 116, or other object. For example, totes 116 may be issued a portable transmitter 1004 that emits a signal at 76 kHz, each transmitting a tote signal (similar to the segment signal 208) during a particular timeslot 210. For example, the sequence 706 may include an otherwise unused timeslot 210 that is allocated for use in detecting a signal from the portable transmitter 1004.

In some implementations the portable transmitter 1004 may utilize a frequency that is different from that transmitted by the segments 204. In one example, each tote 116 may have a different assigned frequency, such that tote 116(1) has a portable transmitter 1004 that emits at 78 kHz while another tote 116(2) transmits at 81 kHz. As a result, the receivers(s) 430 of the SFDs 104 proximate to the wheels of the tote 116 detect the signal and produce device output data 126 with characteristic data 128 showing the signal(s) emitted by the portable transmitter 1004. In another example, a plurality of the portable transmitters 1004 may utilize the same frequency, but may utilize the similar timeslot technique described herein, such that each portable transmitter 1004 is identified by transmitting during a particular timeslot 210.

The portable transmitter 1004 may be provided in a variety of different form factors. For example, the portable transmitter 1004 may comprise a device that may be mounted on the belt, worn as a wristband, a necklace, or a headband, attached to safety equipment worn by the user 112, and so forth. In some implementations, the portable transmitter 1004 may be incorporated into another device, such as a smartphone, point-of-sale terminal, and so forth. For the determination of the location of an object, use of the portable transmitter 1004 may provide lower overall power consumption resulting in extended battery life compared to operation of the portable receiver 1002. For example, periodic transmission by the transmitter followed by intervals of lower mode operation may utilize less power overall than maintaining a receiver in an operating mode to detect EMS 106. With this implementation, the wearable portable transmitter 1004 may be utilized to facilitate tracking of the user 112 in the facility.

Other information may be gathered with this configuration, or in the earlier configurations, without the portable transmitter 1004. For example, it may be determined which user 112 is in contact with a particular tote 116 based on the characteristic data 128 reported by their portable receiver 1002. In this example, the characteristic data 128 may include the EMS 106 emitted from the SFDs 104 under the tote 116 that are propagated via the tote 116 into the user 112, the EMS 106 emitted by the portable transmitter 1004, and so forth.

In some implementations, the portable receiver 1002, portable transmitter 1004, and so forth, may be in communication with the inventory management system 130. For example, these devices may communicate using Wi-Fi with an access point. In another example, data may be transferred using the SFDs 104. Continuing this example, a signal may be transferred that encodes data which is then received by the receiver 430 in the floor 102. Likewise, the transmitter 432 in the SFD 104 may send data to a receiver onboard the tote 116 or other device.

In some implementations, the functions of the portable receiver 1002 and the portable transmitter 1004 may be combined in a single device. For example, a portable transceiver may be configured to transmit EMS 106 and receive EMS 106. In other implementations, the portable receiver 1002 or the portable transmitter 1004 may incorporate at least a portion of transceiver circuitry, but utilize only particular functionality. For example, the portable receiver 1002 may incorporate a transceiver-on-a-chip but may only utilize the receiver chain.

Fixed installations may also use these devices. For example, the components and functions of the portable receiver 1002 may be incorporated into or associated with a fixed device, such as a door handle. When the user 112 touches the door handle, the EMS 106 propagated through their body from the SFD 104 to the door handle may provide characteristic data 128 that may be used to identify that user 112. In another example, the components and functions of the portable transmitter 1004 may be incorporated into or associated with a fixed device, such as a handrail. The handrail may emit the EMS 106 and a receiver, such as the portable receiver 1002 or a receiver 430 in the SFD 104, may be used to provide characteristic data 128 that may be used to identify that user 112.

Figure 11:
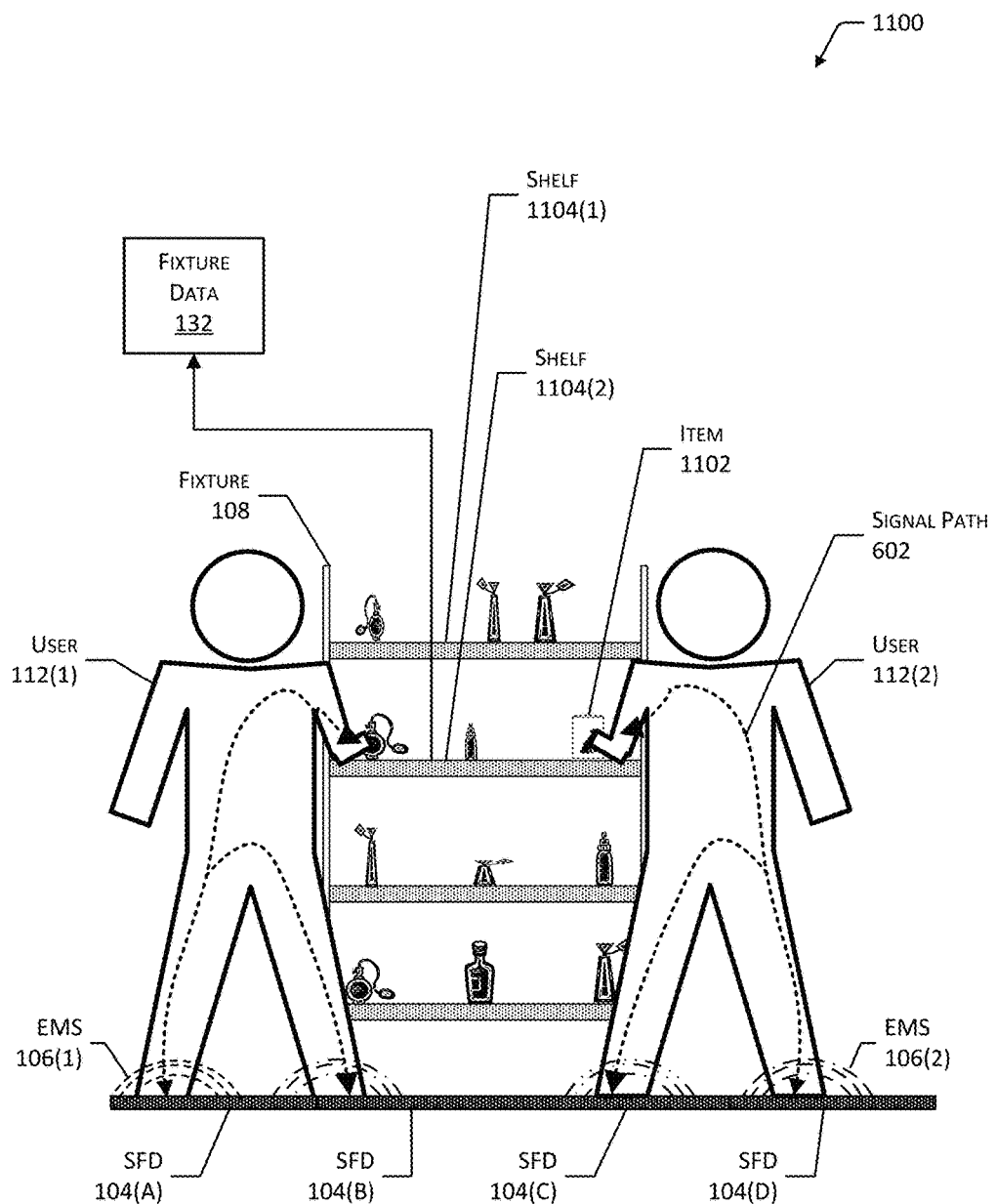
FIG. 11 illustrates the use of signals transmitted by the smart floor devices to determine a particular user is interacting with a particular portion of a fixture, according to some implementations.

FIG. 11 is an illustration 1100 of the use of EMS 106 to determine a particular user 112 is interacting with a particular portion of fixture 108, according to some implementations.

The fixtures 108 may be used to stow one or more items 1102. As illustrated here, the fixture 108 is used to stow items 1102 on four shelves 1104(1), 1104(2), 1104(3), and 1104(4). In other implementations, the fixture 108 may comprise racks, bins, hangers, and so forth.

As depicted here, first SFDs 104(A-B) transmit a first combination of EMS 106(1) along a signal path 602 of the body of the first user 112(1), while second SFDs 104(C-D) transmit a second combination of EMS 106(2) along a signal path 602 of the body of the second user 112(2). The first EMS 106(1) conveys first characteristic data 128(1), while the second EMS 106(2) conveys second characteristic data 128(2). As respective users 112 pick or place items 1102 on the one or more of the shelves 1104, their respective combinations of EMSs 106 are propagated along their respective bodies. The shelves 1104 are equipped with one or more antennas 404 and one or more receivers 430 (not shown). In some implementations, shields or other arrangements of antennas 404 may be present to provide directionality to the patterns of the antennas 404. The electronics of the shelves 1104 generate the fixture data 132. The fixture data 132 may comprise the characteristic data 128 of the EMS 106 that has been received by the shelf 1104. In some implementations, the fixture data 132 may include fixture identifier data indicative of a particular fixture 108 or portion thereof, a timestamp, and so forth.

The shelves 1104 may include an array of antennas 404, allowing for a determination of gesture data indicative of where the hand of the user 112 is relative to the fixture 108, motion of the hand, and so forth. For example, each shelf 1104 may include two antennas 404, one on the left side and one on the right side. By analyzing the relative signal strength of the EMS 106 as conveyed by a signal path 602 from the foot of the user 112 to their hand as it is near or in contact with the shelf 1104, a position of the hand at a particular time may be determined.

By utilizing data from the antennas 404 and receivers 430 on different shelves 1104, information about the position of the hand in three-dimensional space may be determined. For example, antennas 404 on shelf 1104(1) and 1104(2) may be used to determine the position of the hand of the user 112 relative to those shelves 1104.

In some implementations, an antenna 404 may be located beneath the item 1102. As a result of the user 112 coming into contact with the item 1102, an increase in the amplitude of the EMS 106 as measured by the receiver 430 connected to the antenna 404 may be determined. Given predetermined information specifying that a particular type of item 1102 is stowed on the shelf 1104 proximate to the antenna 404(1), based on the fixture data 132, the inventory management system 130 is able to generate interaction data 142. For example, item 1102 of the type "pet food" is assigned for stowage on shelf 1104(1) in a lane that is above antenna 404(16). The fixture data 132 may indicate that the signal strength of one or more frequencies of the second EMS 106(2) that conveyed the second characteristic data 128(2) exceeded a threshold value. The amplitude of the signals as indicated in the second characteristic data 128(2) is thus indicative of the user 112 coming into contact with the item 1102. Based on the particular characteristic data 128, a particular user 112 may thus be associated with a particular user account, and the particular user 112 may be assessed a charge for the pick of the can of pet food.

Other sensors 406, such as weight sensors, capacitive sensors, and so forth, may also be used. Data from these other sensors 406 may then be used in conjunction with the characteristic data 128 and information obtained from the receivers 430 about the EMS 106 to generate the interaction data 142. The characteristic data 128 transferred by way of the EMS 106 to the antenna 404 in the shelf 1104 may be used to determine who is picking what item 1102. A change in weight of the shelf 1104 as measured by one or more weight sensors 406 may be used to determine the quantity of the items 1102 that are either picked or placed. For example, the change in weight may be divided by a known weight of a sample of the item 1102. By using these techniques, the inventory management system 130 is able to quickly and inexpensively determine which user 112 interacted with a particular item 1102, the fixtures 108, or portion thereof.

In some implementations, information about how the EMS 106 is propagated may be used to distinguish between one type of item 1102 and another type of item 1102 that the user 112 may be interacting with. For example, the same antenna 404 may service two lanes on the shelf 1104. In a first lane are stowed boxes of dried pasta, while the second lane stows metal cans of tomato sauce. The metal can provide a better signal path 602 for the EMS 106 compared to the box of dried pasta. By analyzing the received signal strength of the EMS 106, the user 112 coming into contact with the metal can may be distinguished from the user 112 coming into contact with the box of dried pasta. For example, if the received signal strength of the EMS 106 exceeds a threshold value, the contact may be determined to be with the metal can in the second lane. Similarly, if the received signal strength of the EMS 106 is below a threshold value, the contact may be determined to be with the box of dried pasta in the first lane.

As described above with regard to FIG. 10, in some implementations, the EMS 106 may be transmitted by the portable transmitter 1004. In other implementations, the shelf 1104 may emit one or more EMS 106 that are detected using the receiver 430 in the SFD 104 or the portable receiver 1002.

In other implementations, the same techniques may be used to determine if the user 112 is touching other objects in the environment. For example, the placement of a user's 112 hand with respect to a table or countertop may be determined. In another example, the techniques may be used to determine that a user 112 is touching a door handle, sitting in a chair, sitting on a bench, and so forth.

The fixture 108 may include a transmitter in some implementations. For example, the shelf 1104 may include a transmitter to generate EMS 106, that is then propagated via the signal path 602 to the SFD 104, a portable receiver 1002, and so forth.

Figure 12:
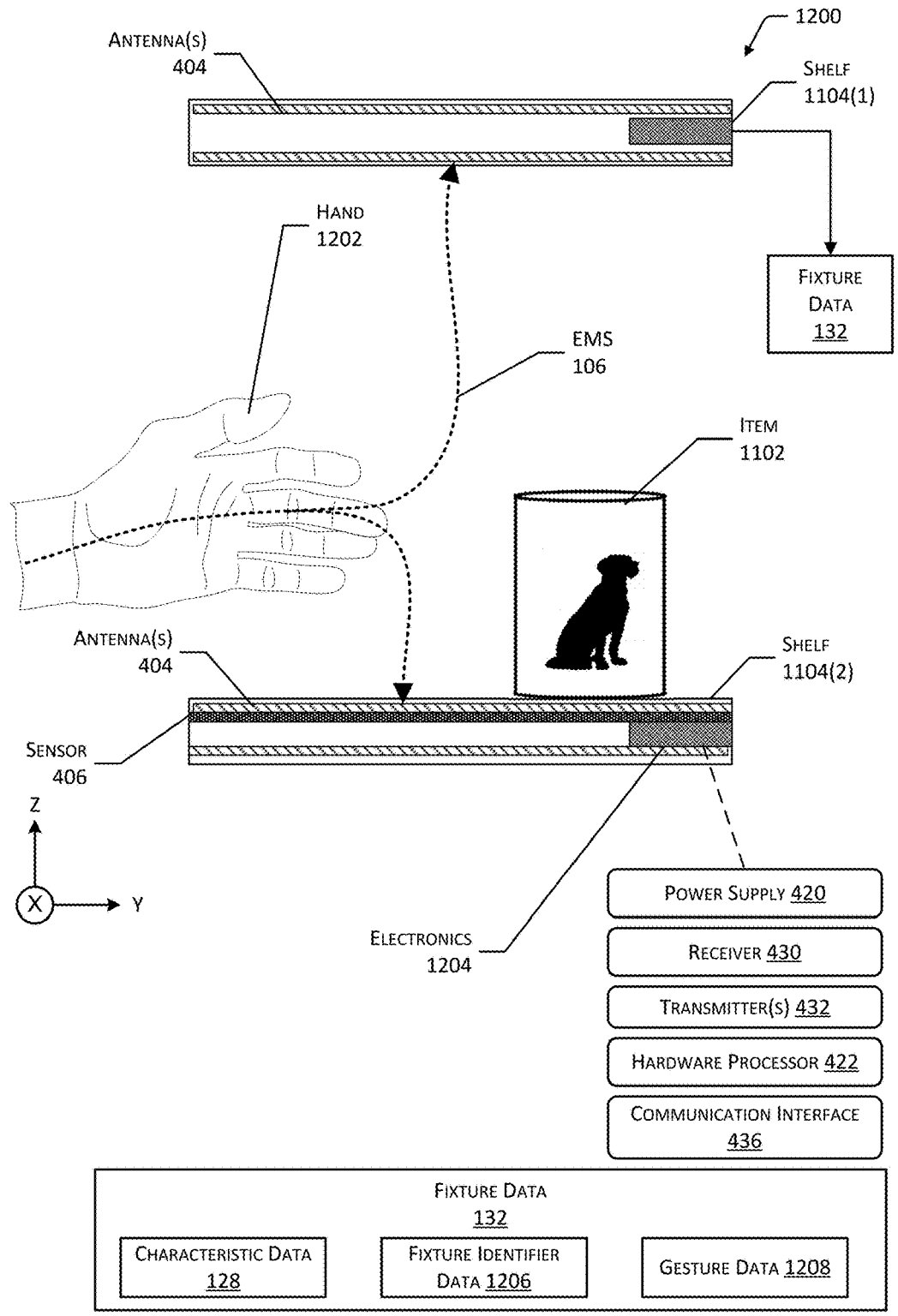
FIG. 12 illustrates an enlarged view of the use of an electromagnetic signal to generate gesture data and other information indicative of which item a user interacted with at the fixture, according to some implementations.

FIG. 12 illustrates an enlarged side view 1200 of the use of an EMS 106 to generate gesture data and other information indicative of which item 1102 a user 112 interacted with at the fixture 108, according to some implementations.

As described above, the shelves 1104 or other fixtures 108 may incorporate one or more antennas 404 that couple to one or more receivers 430. As a hand 1202 of the user 112 approaches the fixture 108, antennas 404 may receive the EMS 106 as transmitted by a SFD 104, portable transmitter 1004, and so forth. In some implementations, the shelves 1104 or other fixtures 108 may incorporate one or more transmitters 432 that are coupled to one or more antennas 404. The transmitters 432 may be used to generate an EMS 106.

Electronics 1204 associated with the shelf 1104 recover the characteristic data 128 conveyed by the EMS 106. The electronics 1204 may be similar to the electronics 412 described above with regard to the SFD 104. For example, the electronics 1204 may include a power supply 420, a receiver 430, the hardware processor 422, a communication interface 436, one or more antennas 404, and so forth. In some implementations, the electronics 1204 may include one or more transmitters 432.

The hardware processor 422 may be configured to generate the fixture data 132. The fixture data 132 may include one or more of characteristic data 128, fixture identifier data 1206, gesture data 1208, and so forth. As described above, the characteristic data 128 comprises information that is conveyed by an EMS 106. Fixture identifier data 1206 is used to identify a particular fixture 108 or portion thereof, such as a shelf 1104, lane upon the shelf 1104, and so forth. The gesture data 1208 may comprise information indicative of a location of the hand 1202 of the user 112 with respect to the fixture 108 or portion thereof, duration of contact by the hand 1202, direction of movement of the hand 1202, and so forth. The gesture data 1208 may be generated based on information about the EMS 106 obtained by one or more antennas 404. For example, based on the changes over time of an amplitude or received signal strength of the EMS 106 at a given antenna 404, a position of the hand 1202 or portion thereof may be determined.

The gesture data 1208 may include information such as a time series of position. In some implementations, the gesture data 1208 may be used to generate trajectory data indicative of a trajectory of the hand 1202. This trajectory may then be used to help determine which lane the user 112 is interacting with, disambiguate the user 112 from among several users 112 if the characteristic data 128 is unavailable, and so forth.

The gesture data 1208 may include information indicative of contact duration between the user 112 and the item 1102. For example, a contact threshold time may indicate a minimum amount of time that the user 112 has to be in contact with the item 1102 before a contact is deemed to occur. The comparison of the contact duration and the contact threshold time may be used to reduce false positives, minimize the impact of noise, and so forth. In some implementations, the contact may also be determined at least in part by the received signal strength of the EMS 106 during contact. For example, contact may be determined when the received signal strength is above a threshold strength value. Contact may be determined when the contact duration exceeds the contact threshold time and the received signal strength is above the threshold strength value.

The gesture data 1208 may comprise a time series of coordinates, each set of coordinates indicating a position of the hand 1202 at successive times. The gesture data 1208 may provide coordinates in one, two, or three-dimensional spaces. For example, coordinates in a one-dimensional space for the gesture data 1208 may indicate where along the shelf 1104 from left to right the hand 1202 is determined to be. In another example, coordinates in three-dimensional space for the gesture data 1208 may indicate where the hand 1202 is in terms of left to right, front to back and height above the shelf 1104.

To generate gesture data 1208, the hand 1202 of the user 112 does not necessarily need to be in contact with the portion of the fixture 108. For example, proximity of the hand 1202 may be sufficient to allow for coupling between the hand 1202 and the antenna 404 that is sufficient to transfer the EMS 106.

As described below in more detail with regard to FIG. 13, the fixture 108 may incorporate other sensors 406 as well.

While FIGS. 11 and 12 depict the EMS 106 as originating in the SFD 104, in other implementations, the signal pathway may be reversed. For example, a transmitter 432 may be located at the shelf 1104 that generates an EMS 106 associated with a particular type of item 1102. As the user 112 approaches and then grasps the item 1102, a signal path 602 may be provided that conveys the EMS 106 from the shelf 1104 to a receiver in the SFD 104. In other implementations, the EMS 106 may be produced by the portable transmitter 1004.

Figure 13:
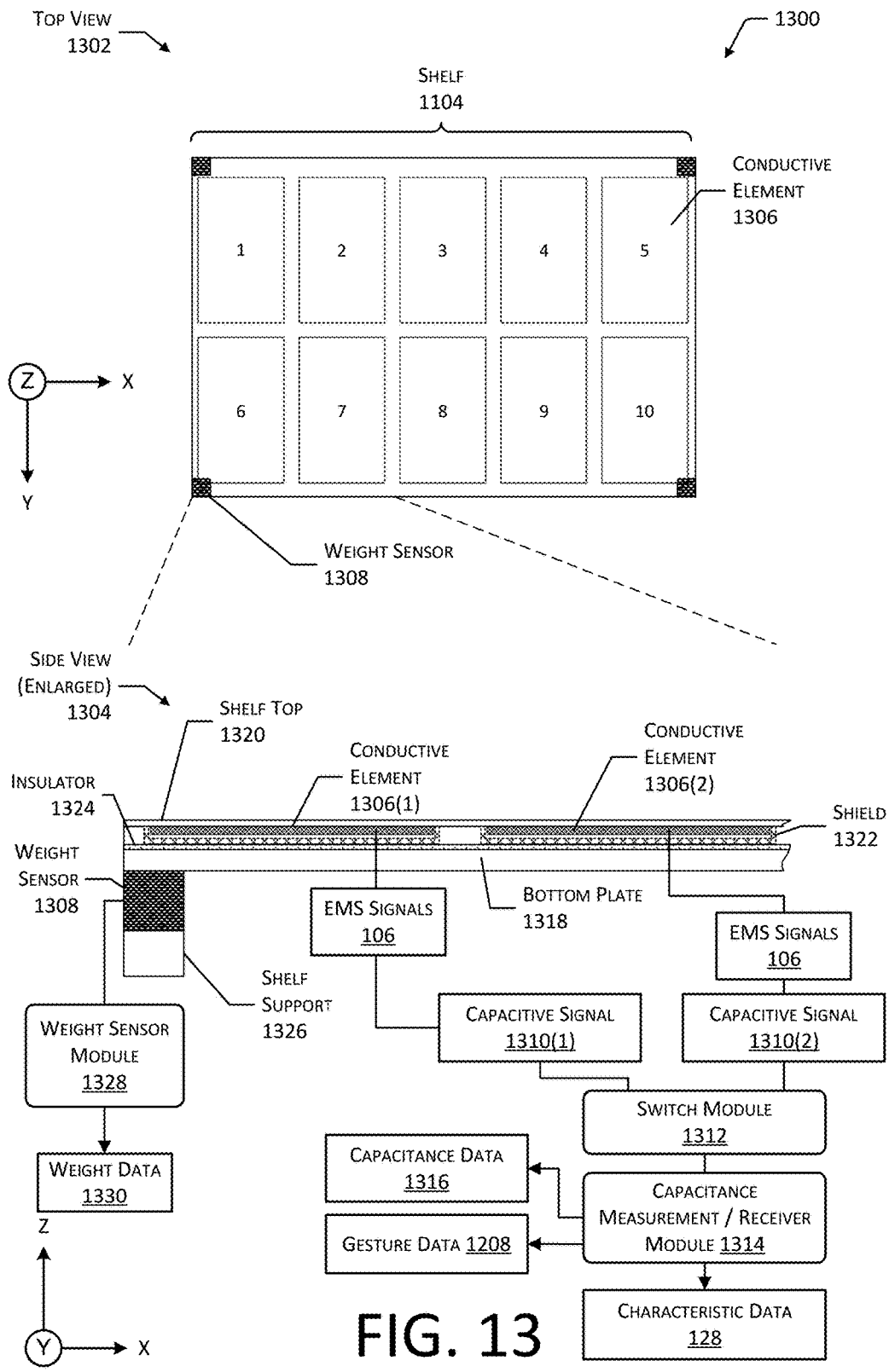
FIG. 13 depicts a block diagram of a fixture such as a shelf that is configured to generate gesture data, characteristic data, and so forth, according to some implementations.

FIG. 13 depicts a block diagram 1300 of a fixture 108 such as a shelf 1104 that is configured to generate gesture data 1208, characteristic data 128, and so forth, according to some implementations. A top view 1302 of a shelf 1104 and side view 1304 of an enlarged portion of the shelf 1104 are depicted.

As shown in the top view 1302, a plurality of conductive elements 1306 are distributed in rows and columns across the shelf 1104 to form an array. The conductive elements 1306 may be planar and formed into shapes such as rectangles (as shown here). Arranged proximate to each of the four corners of the shelf 1104 are weight sensors 1308. The conductive elements 1306 may be configured for dual use as antennas 404 and as elements of a capacitive sensor array. In other implementations, other shapes and arrangements of the conductive elements 1306 may be used.

As shown in the side view 1304, the conductive elements 1306 may be connected by wire or other electrical conductor. The wire transfers a capacitive signal 1310 between the conductive element 1306 and other circuitry, such as a switch module 1312. The switch module 1312 may in turn connect to a capacitance measurement/receiver module 1314. For example, the capacitive signal 1310 may be used to supply a charge to the conductive element 1306. The capacitance measurement/receiver module 1314 determines a change in this charge over time and generates capacitance data 1316. The capacitance measurement/receiver module 1314 may also generate the characteristic data 128 in some implementations.

The gesture data 1208 may also be generated by the capacitance measurement/receiver module 1314. For example, based on the movement of the hand 1202 relative to the antennas 404 or other conductive elements 1306, data indicative of location, movement, orientation, and so forth of the hand may be determined.

The switch module 1312 may comprise switching circuitry that allows for the capacitance measurement/receiver module 1314 to be selectively connected to a particular conductive element 1306. In some implementations, a plurality of switch modules 1312 may be used to allow for different switching configurations. For example, a first switch module 1312(1) may have 4 outputs, each connecting to additional switch modules 1312(2), 1312(3), 1312 (4), 1112 (5). Each of those switch modules 1312(2)-(5) may have 4 outputs in which each output is connected to additional switch modules 1312, and so forth. The switching circuitry may comprise microelectromechanical switches, relays, transistors, diodes, and so forth. Other configurations or networks of switch modules 1312 may be implemented as well.

The capacitance measurement/receiver module 1314 may be used to generate the capacitance data 1316. The capacitance data 1316 may include information such as a capacitance value, information indicative of a particular conductive element 1306, timestamp, and so forth. In some implementations, circuitry or functionality of the switch module 1312 and the capacitance measurement/receiver module 1314 may be combined. The capacitance measurement/receiver module 1314 may also include a receiver 430 to allow for the reception of the EMS 106.

A bottom plate 1318 may provide mechanical support for one or more of the conductive elements 1306. In some implementations, the bottom plate 1318 may comprise an electrical conductor that acts as a shield for an electric field present at the conductive element 1306.

A shelf top 1320 may be arranged atop one or more of the conductive elements 1306 and the bottom plate 1318. One or more items 1102 may rest on or above the shelf top 1320. For example, the shelf top 1320 may comprise a non-conductive material such as a plastic or ceramic.

The conductive element 1306 may comprise one or more electrically conductive materials. The electrically conductive elements 1306 may be formed as one or more of a coating, thin-film, paint, deposited material, foil, mesh, and so forth. For example, the conductive element 1306 may comprise an electrically conductive paint, silver paste, aluminum film, a copper sheet, and so forth. The conductive element 1306 may be deposited upon, embedded within, laminated to, or otherwise supported by the bottom plate 1318, the shelf top 1320, and so forth. These conductive elements 1306 may then be connected to the capacitance measurement circuitry in the capacitance measurement/receiver module 1314.

One or more shields 1322 may be provided. A shield 1322 may be adjacent to one or more of the conductive elements 1306. The shield 1322 comprises an electrically conductive material and is separated by an electrical insulator, such as air, plastic, ceramic, and so forth, from the conductive element 1306. A single shield 1322 may be used to provide shielding for one or more conductive elements 1306. During operation, the shield 1322 may be driven at the same voltage potential of the input of the capacitive signal 1310. In this configuration, there is no difference in electrical potential between the shield 1322 and the conductive element 1306. External interference may then couple to the shield 1322 producing little interaction with the conductive element

1306. The shield 1322 may also be used to direct the electric field produced by the conductive element 1306 during operation. For example, the electric field is directed generally away from the shield 1322. Using this technique, the capacitive sensor may detect objects on the side opposite that of the shield 1322, with the shield 1322 preventing the capacitive sensor from "seeing" or being affected by an object behind the shield 1322.

The shelf 1104 may include other layers or structures. For example, an electrical insulator 1324 such as polyethylene terephthalate may be arranged between the bottom plate 1318 and the shield 1322 (if present) or the conductive element 1306. Wires, circuit traces, or other electrically conductive pathways may conduct the capacitive signal 1310 between the capacitance measurement/receiver module 1314 and the conductive element 1306.

The bottom plate 1318 may be supported by one or more of the weight sensors 1308. In some implementations, the bottom plate 1318 may comprise an electrically conductive material and act as a ground plane, such as if connected to an earth ground. The weight sensor 1308 may in turn be supported by a shelf support 1326.

The one or more of the weight sensors 1308 may be connected to the weight sensor module 1328. The weight sensor module 1328 may comprise circuitry that is used to generate the weight data 1330. The weight data 1330 may include information such as a weight value, information indicative of a particular weight sensor 1308, timestamp, and so forth. In some implementations, circuitry or functionality of the weight sensor module 1328 and the weight sensor 1308 may be combined.

One or more image sensors (not shown) may be used to acquire image data at or near the shelf 1104 or other fixture 108. The image data may comprise one or more still images, video, or combination thereof. The image sensor may have a field of view (FOV) that includes at least a portion of the shelf 1104 or other type of fixture 108. For example, a camera may be mounted within the shelf 1104 to acquire image data of one or more lanes of items 1102 in the shelf 1104.

Figure 14:
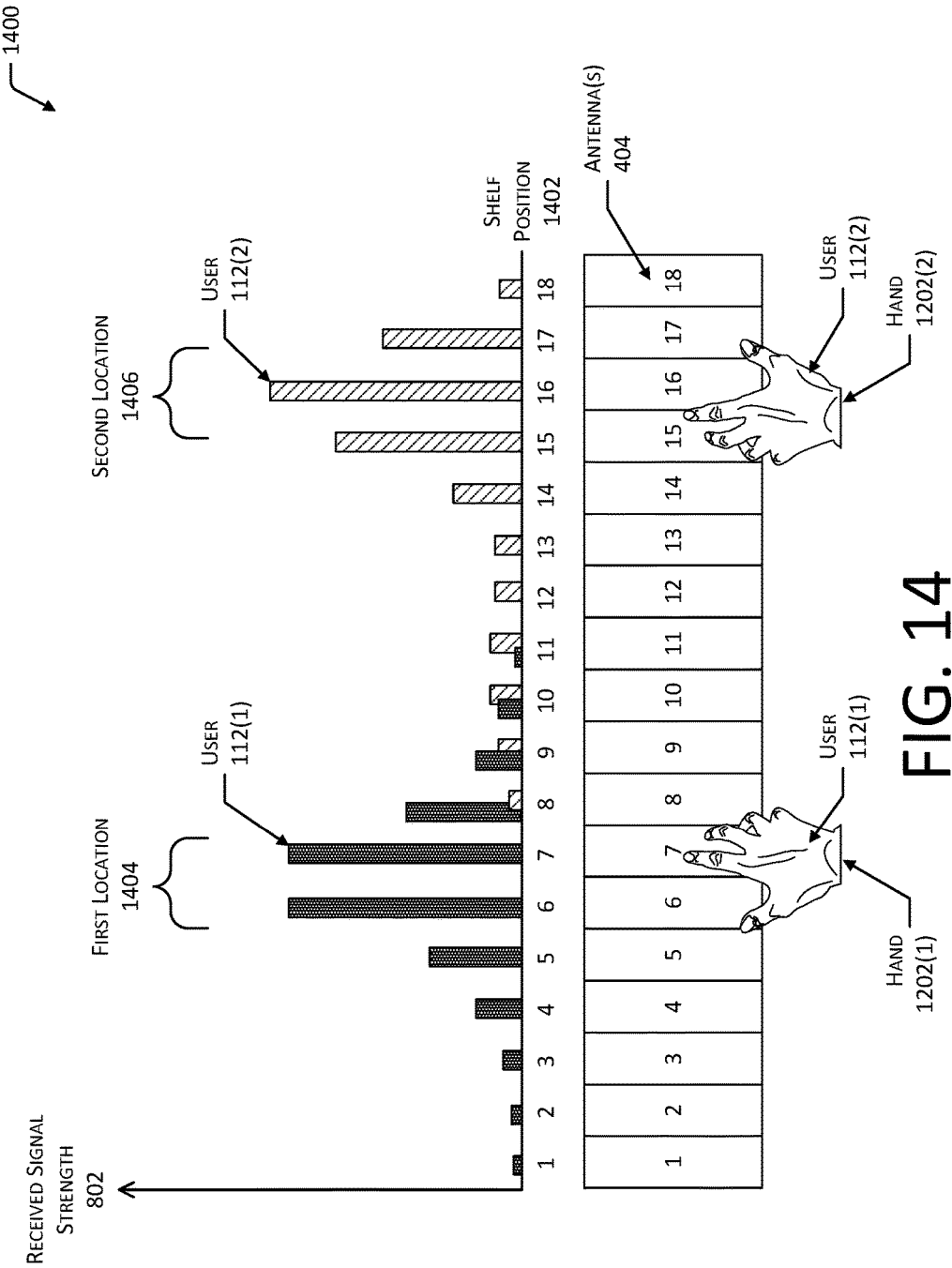
FIG. 14 depicts a scenario showing the signal strengths as received using different antennas at the fixture, according to some implementations.

FIG. 14 depicts a scenario 1400 showing the signal strengths as received using different antennas 404 at the fixture 108, according to some implementations. In this scenario, a graph is depicted along with a corresponding schematic of the antennas 404 laid out on a shelf 1104. With regard to the graph, along a horizontal axis are bins indicative of shelf position 1402. Along the vertical axis of the graph is the received signal strength 802 received at the particular shelf position 1402.

Below the graph are the array of antennas 404 that may be positioned along the shelf 1104. In this scenario, the shelf 1104 includes eighteen antennas 404 arranged side by side. In one implementation, each lane of the shelf 1104 may be associated with a particular antenna 404. A right hand 1202(1) of the first user 112(1) is shown reaching towards the antenna 404(7). A left hand 1202(2) of the second user 112(2) is shown reaching towards the antenna 404(16). As depicted by the graph above, the received signal strength for the respective hands exhibit spikes at a first location 1404 and a second location 1406. As described above, the received signal strength may be for a particular frequency, group of frequencies, and so forth.

To distinguish between the hands 1202 detected at the first location 1404 and the second location 1406, the characteristic data 128 may be assessed. For example, given where the respective users 112 are standing, they will exhibit a particular set of characteristics such as conveying EMS 106 at particular times.

Figure 15:
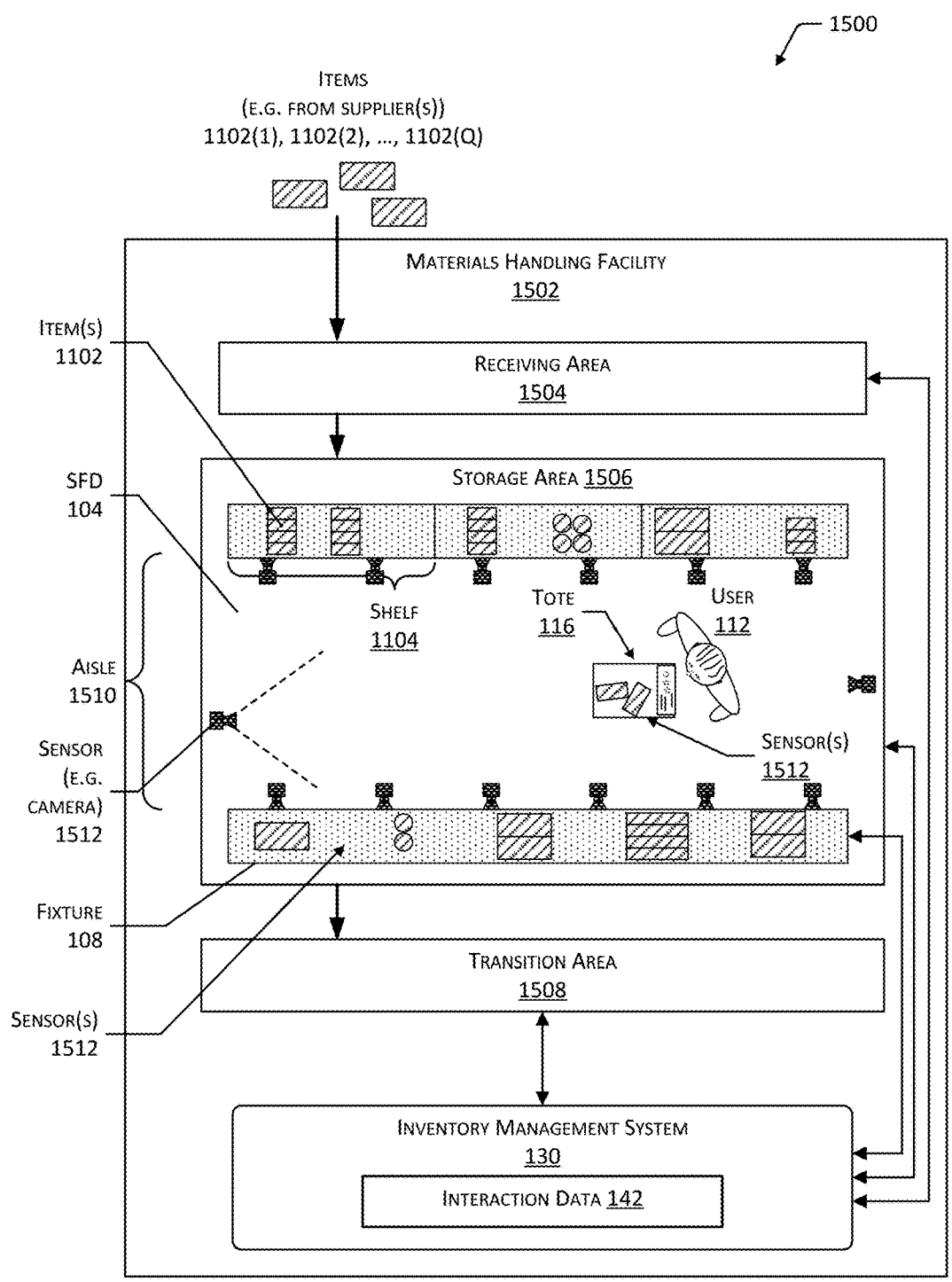
FIG. 15 is a block diagram illustrating a materials handling facility (facility) using the system, according to some implementations.

FIG. 15 is a block diagram 1500 illustrating a materials handling facility (facility) 1502 using the system 100, according to some implementations. A facility 1502 comprises one or more physical structures or areas within which one or more items 1102(1), 1102(2), . . . , 1102(Q) may be held. The items 1102 may comprise physical goods, such as books, pharmaceuticals, repair parts, electronic gear, and so forth.

The facility 1502 may include one or more areas designated for different functions with regard to inventory handling. In this illustration, the facility 1502 includes a receiving area 1504, a storage area 1506, and a transition area 1508. Throughout the facility 1502, the plurality of SFDs 104 may be deployed as described above.

The receiving area 1504 may be configured to accept items 1102, such as from suppliers, for intake into the facility 1502. For example, the receiving area 1504 may include a loading dock at which trucks or other freight conveyances unload the items 1102. In some implementations, the items 1102 may be processed, such as at the receiving area 1504, to generate at least a portion of item data as described below. For example, an item 1102 may be tested at the receiving area 1504 to determine the attenuation of an EMS 106 passing through it, and this information stored as item data.

The storage area 1506 is configured to store the items 1102. The storage area 1506 may be arranged in various physical configurations. In one implementation, the storage area 1506 may include one or more aisles 1510. The aisle 1510 may be configured with, or defined by, the fixtures 108 on one or both sides of the aisle 1510. The fixtures 108 may include one or more of a shelf 1104, a rack, a case, a cabinet, a bin, a floor location, or other suitable storage mechanisms for holding, supporting, or storing the items 1102. For example, the fixtures 108 may comprise shelves 1104 with lanes designated therein. The fixtures 108 may be affixed to the floor 102 or another portion of the structure of the facility 1502. The fixtures 108 may also be movable such that the arrangements of aisles 1510 may be reconfigurable. In some implementations, the fixtures 108 may be configured to move independently of an outside operator. For example, the fixtures 108 may comprise a rack with a power source and a motor, operable by a computing device to allow the rack to move from one location within the facility 1502 to another.

One or more users 112(1), 112(2), . . . , 112(U) and totes 116(1), 116(2), . . . , 116(T) or other material handling apparatus may move within the facility 1502. For example, the user 112 may move about within the facility 1502 to pick or place the items 1102 in various fixtures 108, placing them on the tote 116 for ease of transport. The tote 116 is configured to carry or otherwise transport one or more items 1102. For example, the tote 116 may include a basket, cart, bag, bin, and so forth. In other implementations, other material handling apparatuses such as robots, forklifts, cranes, aerial drones, and so forth, may move about the facility 1502 picking, placing, or otherwise moving the items 1102. For example, a robot may pick an item 1102 from a first fixture 108(1) and move the item 1102 to a second fixture 108(2).

One or more sensors 1512 may be configured to acquire information in the facility 1502. The sensors 1512 may include, but are not limited to, weight sensors 1512(1), capacitive sensors 1512(2), image sensors 1512(3), depth sensors 1512(4), and so forth. The weight sensors 1512(1) may comprise the same or different hardware as the weight sensors 1308 described above. The sensors 1512 may be stationary or mobile, relative to the facility 1502. For example, the fixtures 108 may contain weight sensors 1512(1) to acquire weight sensor data of items 1102 stowed therein, image sensors 1512(3) to acquire images of picking or placement of items 1102 on shelves 1104, optical sensor arrays 1512(14) to detect shadows of the user's 112 hands 1202 at the fixtures 108, and so forth. In another example, the facility 1502 may include image sensors 1512(3) to obtain images of the user 112 or other objects in the facility 1502.

While the storage area 1506 is depicted as having one or more aisles 1510, fixtures 108 storing the items 1102, sensors 1512, and so forth, it is understood that the receiving area 1504, the transition area 1508, or other areas of the facility 1502 may be similarly equipped. Furthermore, the arrangement of the various areas within the facility 1502 is depicted functionally rather than schematically. For example, in some implementations, multiple different receiving areas 1504, storage areas 1506, and transition areas 1508 may be interspersed rather than segregated in the facility 1502.

The facility 1502 may include, or be coupled to, the inventory management system 130. The inventory management system 130 is configured to interact with one or more of the users 112 or devices such as sensors 1512, robots, material handling equipment, computing devices, and so forth, in one or more of the receiving area 1504, the storage area 1506, or the transition area 1508.

During operation of the facility 1502, the sensors 1512 may be configured to provide sensor data, or information based on the sensor data, to the inventory management system 130. The sensor data may include the weight data 1330, the capacitance data 1316, the image data, and so forth. The sensors 1512 are described in more detail below with regard to FIG. 16.

The inventory management system 130 or other systems may use the sensor data to track the location of objects within the facility 1502, movement of the objects, or provide other functionality. Objects may include, but are not limited to, items 1102, users 112, totes 116, and so forth. For example, a series of images acquired by the image sensor 1512(3) may indicate removal by the user 112 of an item 1102 from a particular location on the fixture 108 and placement of the item 1102 on or at least partially within the tote 116.

The facility 1502 may be configured to receive different kinds of items 1102 from various suppliers and to store them until a customer orders or retrieves one or more of the items 1102. A general flow of items 1102 through the facility 1502 is indicated by the arrows of FIG. 15. Specifically, as illustrated in this example, items 1102 may be received from one or more suppliers, such as manufacturers, distributors, wholesalers, and so forth, at the receiving area 1504. In various implementations, the items 1102 may include merchandise, commodities, perishables, or any suitable type of item 1102, depending on the nature of the enterprise that operates the facility 1502.

Upon being received from a supplier at the receiving area 1504, the items 1102 may be prepared for storage in the storage area 1506. For example, in some implementations, items 1102 may be unpacked or otherwise rearranged. The inventory management system 130 may include one or more software applications executing on a computer system to provide inventory management functions. These inventory management functions may include maintaining information indicative of the type, quantity, condition, cost, location, weight, or any other suitable parameters with respect to the items 1102. The items 1102 may be stocked, managed, or dispensed in terms of countable units, individual units, or multiple units, such as packages, cartons, crates, pallets, or other suitable aggregations. Alternatively, some items 1102, such as bulk products, commodities, and so forth, may be stored in continuous or arbitrarily divisible amounts that may not be inherently organized into countable units. Such items 1102 may be managed in terms of a measurable quantity such as units of length, area, volume, weight, time, duration, or other dimensional properties characterized by units of measurement. Generally speaking, a quantity of an item 1102 may refer to either a countable number of individual or aggregate units of an item 1102 or a measurable amount of an item 1102, as appropriate.

After arriving through the receiving area 1504, items 1102 may be stored within the storage area 1506. In some implementations, like items 1102 may be stored or displayed together in the fixtures 108 such as in bins, on shelves 1104, hanging from pegboards, and so forth. For example, all items 1102 of a given kind are stored in one fixture 108. In other implementations, like items 1102 may be stored in different fixtures 108. For example, to optimize retrieval of certain items 1102 having frequent turnover within a large physical facility 1502, those items 1102 may be stored in several different fixtures 108 to reduce congestion that might occur at a single fixture 108.

When a customer order specifying one or more items 1102 is received, or as a user 112 progresses through the facility 1502, the corresponding items 1102 may be selected or "picked" from the fixtures 108 containing those items 1102. In various implementations, item picking may range from manual to completely automated picking. For example, in one implementation, a user 112 may have a list of items 1102 they desire and may progress through the facility 1502 picking items 1102 from the fixtures 108 within the storage area 1506 and placing those items 1102 into a tote 116. In other implementations, employees of the facility 1502 may pick items 1102 using written or electronic pick lists derived from customer orders. These picked items 1102 may be placed into the tote 116 as the employee progresses through the facility 1502.

After items 1102 have been picked, the items 1102 may be processed at a transition area 1508. The transition area 1508 may be any designated area within the facility 1502 where items 1102 are transitioned from one location to another or from one entity to another. For example, the transition area 1508 may be a packing station within the facility 1502. When the item 1102 arrives at the transition area 1508, the item 1102 may be transitioned from the storage area 1506 to the packing station. Information about the transition may be maintained by the inventory management system 130.

In another example, if the items 1102 are departing the facility 1502, a list of the items 1102 may be obtained and used by the inventory management system 130 to transition responsibility for, or custody of, the items 1102 from the facility 1502 to another entity. For example, a carrier may accept the items 1102 for transport with that carrier accepting responsibility for the items 1102 indicated in the list. In another example, a user 112 may purchase or rent the items 1102 and remove the items 1102 from the facility 1502. During use of the facility 1502, the user 112 may move about the facility 1502 to perform various tasks, such as picking or placing the items 1102 in the fixtures 108.

The inventory management system 130 may generate the interaction data 142. The interaction data 142 may be based at least in part on one or more of the device output data 126, the fixture data 132, and so forth. The interaction data 142 may provide information about an interaction, such as a pick of an item 1102 from the fixture 108, a place of an item 1102 to the fixture 108, a touch made to an item 1102 at the fixture 108, a gesture associated with an item 1102 at the fixture 108, and so forth. The interaction data 142 may include one or more of the type of interaction, duration of interaction, interaction location identifier indicative of where from the fixture 108 the interaction took place, item identifier, quantity change to the item 1102, user identifier, and so forth. The interaction data 142 may then be used to further update the item data. For example, the quantity of items 1102 on hand at a particular lane on the shelf 1104 may be changed based on an interaction that picks or places one or more items 1102.

The inventory management system 130 may combine or otherwise utilize data from different sensors 1512 of different types. For example, weight data 1330 obtained from weight sensors 1512(1) at the fixture 108 may be used instead of, or in conjunction with, one or more of the capacitance data 1316 to determine the interaction data 142.

Figure 16:
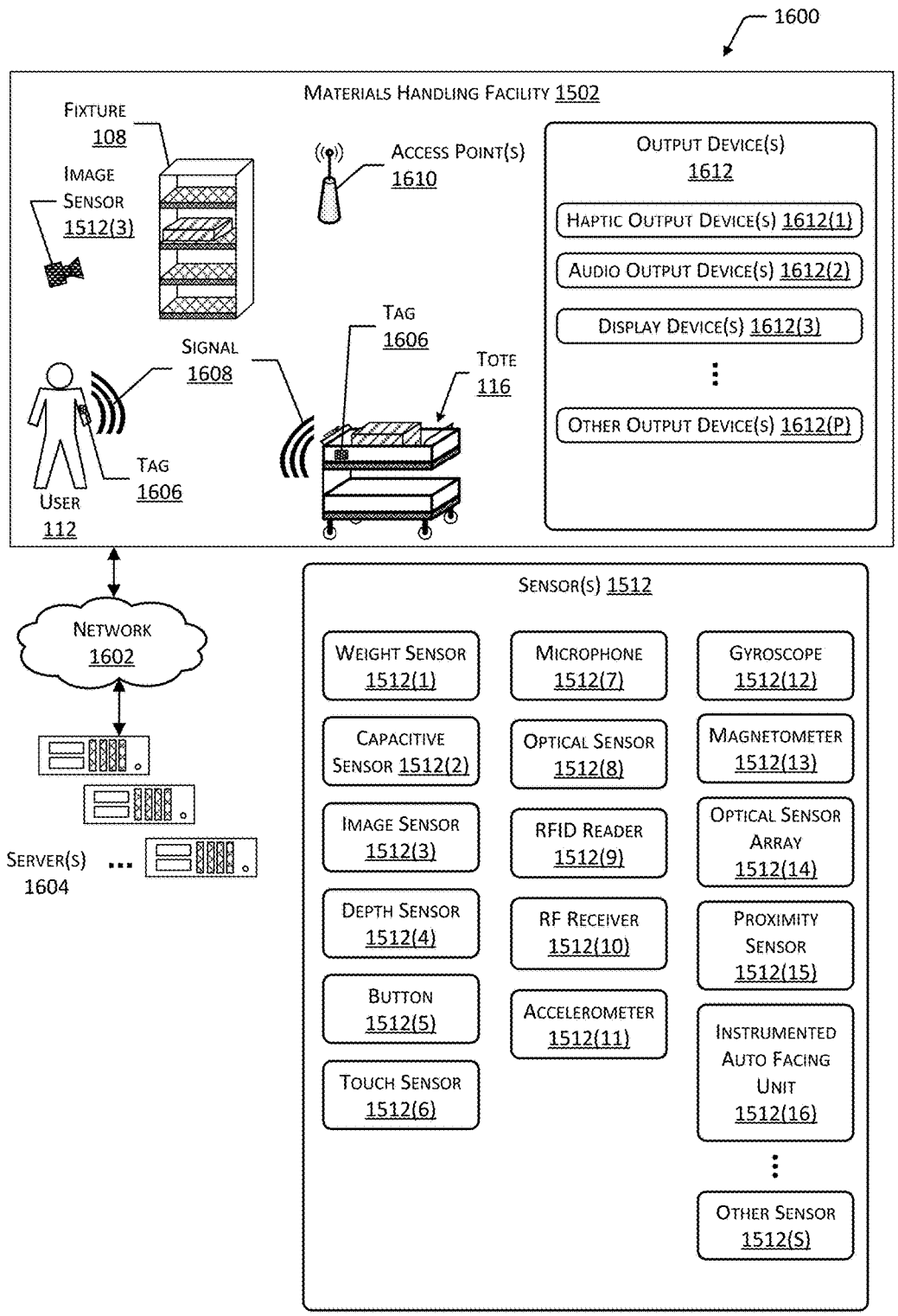
FIG. 16 is a block diagram illustrating additional details of the facility, according to some implementations.

FIG. 16 is a block diagram 1600 illustrating additional details of the facility 1502, according to some implementations. The facility 1502 may be connected to one or more networks 1602, which in turn connect to one or more servers 1604. The network 1602 may include private networks such as an institutional or personal intranet, public networks such as the Internet, or a combination thereof. The network 1602 may utilize wired technologies (e.g., wires, fiber optic cables, and so forth), wireless technologies (e.g., radio frequency, infrared, acoustic, optical, and so forth), or other connection technologies. The network 1602 is representative of any type of communication network, including one or more of data networks or voice networks. The network 1602 may be implemented using wired infrastructure (e.g., copper cable, fiber optic cable, and so forth), a wireless infrastructure (e.g., cellular, microwave, satellite, and so forth), or other connection technologies.

The servers 1604 may be configured to execute one or more modules or software applications associated with the inventory management system 130 or other systems. While the servers 1604 are illustrated as being in a location outside of the facility 1502, in other implementations, at least a portion of the servers 1604 may be located at the facility 1502. The servers 1604 are discussed in more detail below with regard to FIG. 17.

The users 112, the totes 116, or other objects in the facility 1502 may be equipped with one or more tags 1606. The tags 1606 may be configured to emit a signal 1608. In one implementation, the tag 1606 may be a RFID tag 1606 configured to emit a RF signal 1608 upon activation by an external signal. For example, the external signal may comprise a radio frequency signal or a magnetic field configured to energize or activate the RFID tag 1606. In another implementation, the tag 1606 may comprise a transmitter and a power source configured to power the transmitter. For example, the tag 1606 may comprise a Bluetooth Low Energy (BLE) transmitter and battery. In other implementations, the tag 1606 may use other techniques to indicate presence of the tag 1606. For example, an acoustic tag 1606 may be configured to generate an ultrasonic signal 1608, which is detected by corresponding acoustic receivers. In yet another implementation, the tag 1606 may be configured to emit an optical signal 1608.

The inventory management system 130 may be configured to use the tags 1606 for one or more of identification of the object, determining a location of the object, and so forth. For example, the users 112 may wear tags 1606, the totes 116 may have tags 1606 affixed, and so forth, which may be read and, based at least in part on signal strength, used to determine identity and location. In other implementations, such as described above, the users 112 may wear portable transmitters 1004, the totes 116 may be equipped with a portable receiver 1002, portable transmitter 1004, and so forth. In some implementations, the two may be combined, such as tags 1606 and the use of a portable transmitter 1004.

Generally, the inventory management system 130 or other systems associated with the facility 1502 may include any number and combination of input components, output components, and servers 1604.

The one or more sensors 1512 may be arranged at one or more locations within the facility 1502. For example, the sensors 1512 may be mounted on or within a floor 102, wall, at a ceiling, at fixture 108, on a tote 116, may be carried or worn by a user 112, and so forth.

The sensors 1512 may include one or more weight sensors 1512(1) that are configured to measure the weight of a load, such as the item 1102, the tote 116, or other objects. The weight sensors 1512(1) may be configured to measure the weight of the load at one or more of the fixtures 108, the tote 116, on the floor 102 of the facility 1502, and so forth. For example, the shelf 1104 may include a plurality of lanes or platforms, with one or more weight sensors 1512(1) beneath each one to provide weight sensor data about an individual lane or platform. The weight sensors 1512(1) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 1512(1) may operate as transducers that generate one or more signals based on an applied force, such as that of the load due to gravity. For example, the weight sensor 1512(1) may comprise a load cell having a strain gauge and a structural member that deforms slightly when weight is applied. By measuring a change in the electrical characteristic of the strain gauge, such as capacitance or resistance, the weight may be determined. In another example, the weight sensor 1512(1) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 130 may use the data acquired by the weight sensors 1512(1) to identify an object, determine a change in the quantity of objects, determine a location of an object, maintain shipping records, and so forth.

The sensors 1512 may include capacitive sensors 1512(2). As described above with regard to FIG. 13, the capacitive sensor 1512(2) may comprise one or more conductive elements 1306 and the capacitance measurement/receiver module 1314. In some implementations, the capacitive sensor 1512(2) may include or utilize a switch module 1312. The capacitive sensor 1512(2) may be configured to use a far-field capacitance effect that may comprise measuring the self-capacitance of the conductive elements 1306, rather than a mutual capacitance. In one implementation, a fixed charge may be provided to the conductive element 1306, and the resultant voltage may be measured between the conductive element 1306 and the ground.

In other implementations, the capacitive sensor 1512(2) may be configured to operate in a mutual capacitance mode, surface capacitance mode, and so forth. In mutual capacitance mode, at least two conductive layers are arranged in a stack with a dielectric material between the layers. The dielectric may be a solid, such as a plastic, a gas such as air, a vacuum, and so forth. The mutual capacitance at points between these layers is measured. When another object touches the outermost conductive layer, the mutual capacitance between the two layers changes, allowing for detection. In surface capacitance mode, voltages are applied to different points of a conductive element 1306 to produce an electrostatic field. By measuring the changes in current draw (or another electrical characteristic) from the different points at which voltage is applied, a location of an object may be determined.

The sensors 1512 may include one or more image sensors 1512(3). The one or more image sensors 1512(3) may include imaging sensors configured to acquire images of a scene. The image sensors 1512(3) are configured to detect light in one or more wavelengths including, but not limited to, terahertz, infrared, visible, ultraviolet, and so forth. The image sensors 1512(3) may comprise charge coupled devices (CCD), complementary metal oxide semiconductor (CMOS) devices, microbolometers, and so forth. The inventory management system 130 may use image data acquired by the image sensors 1512(3) during operation of the facility 1502. For example, the inventory management system 130 may identify items 1102, users 112, totes 116, and so forth, based at least in part on their appearance within the image data acquired by the image sensors 1512(3). The image sensors 1512(3) may be mounted in various locations within the facility 1502. For example, image sensors 1512(3) may be mounted overhead, on the fixtures 108, may be worn or carried by users 112, may be affixed to totes 116, and so forth.

One or more depth sensors 1512(4) may also be included in the sensors 1512. The depth sensors 1512(4) are configured to acquire spatial or three-dimensional (3D) data, such as depth information, about objects within a FOV. The depth sensors 1512(4) may include range cameras, lidar systems, sonar systems, radar systems, structured light systems, stereo vision systems, optical interferometry systems, and so forth. The inventory management system 130 may use the 3D data acquired by the depth sensors 1512(4) to identify objects, determine a location of an object in 3D real space, and so forth.

One or more buttons 1512(5) may be configured to accept input from the user 112. The buttons 1512(5) may comprise mechanical, capacitive, optical, or other mechanisms. For example, the buttons 1512(5) may comprise mechanical switches configured to accept an applied force from a touch of the user 112 to generate an input signal. The inventory management system 130 may use data from the buttons 1512(5) to receive information from the user 112. For example, the tote 116 may be configured with a button 1512(5) to accept input from the user 112 and send information indicative of the input to the inventory management system 130.

The sensors 1512 may include one or more touch sensors 1512(6). The touch sensors 1512(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 130 may use data from the touch sensors 1512(6) to receive information from the user 112. For example, the touch sensor 1512(6) may be integrated with the tote 116 to provide a touchscreen with which the user 112 may select from a menu one or more particular items 1102 for picking, enter a manual count of items 1102 at fixture 108, and so forth.

One or more microphones 1512(7) may be configured to acquire information indicative of sound present in the environment. In some implementations, arrays of microphones 1512(7) may be used. These arrays may implement beamforming techniques to provide for directionality of gain. The inventory management system 130 may use the one or more microphones 1512(7) to acquire information from acoustic tags 1606, accept voice input from the users 112, determine ambient noise level, and so forth.

The sensors 1512 may include one or more optical sensors 1512(8). The optical sensors 1512(8) may be configured to provide data indicative of one or more of color or intensity of light impinging thereupon. For example, the optical sensor array 1512(14) may comprise a photodiode and associated circuitry configured to generate a signal or data indicative of an incident flux of photons. As described below, the optical sensor array 1512(14) may comprise a plurality of the optical sensors 1512(8). For example, the optical sensor 1512(8) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 1512(8) may be used. The optical sensors 1512(8) may be sensitive to one or more of infrared light, visible light, or ultraviolet light. For example, the optical sensors 1512(8) may be sensitive to infrared light, and infrared light sources such as light emitting diodes (LEDs) may provide illumination.

The optical sensors 1512(8) may include photodiodes, photoresistors, photovoltaic cells, quantum dot photoconductors, bolometers, pyroelectric infrared detectors, and so forth. For example, the optical sensor 1512(8) may use germanium photodiodes to detect infrared light.

One or more radio frequency identification (RFID) readers 1512(9), near field communication (NFC) systems, and so forth, may be included as sensors 1512. For example, the RFID readers 1512(9) may be configured to read the RF tags 1606. Information acquired by the RFID reader 1512(9) may be used by the inventory management system 130 to identify an object associated with the RF tag 1606 such as the item 1102, the user 112, the tote 116, and so forth. For example, based on information from the RFID readers 1512(9) detecting the RF tag 1606 at different times and RFID readers 1512(9) having different locations in the facility 1502, a velocity of the RF tag 1606 may be determined.

One or more RF receivers 1512(10) may also be included as sensors 1512. In some implementations, the RF receivers 1512(10) may be part of transceiver assemblies. The RF receivers 1512(10) may be configured to acquire RF signals 1608 associated with Wi-Fi, Bluetooth®, ZigBee, 4G, 3G, LTE, or other wireless data transmission technologies. The RF receivers 1512(10) may provide information associated with data transmitted via radio frequencies, signal strength of RF signals 1608, and so forth. For example, information from the RF receivers 1512(10) may be used by the inventory management system 130 to determine a location of an RF source, such as a communication interface onboard the tote 116.

The sensors 1512 may include one or more accelerometers 1512(11), which may be worn or carried by the user 112, mounted to the tote 116, and so forth. The accelerometers 1512(11) may provide information such as the direction and magnitude of an imposed acceleration. Data such as rate of acceleration, determination of changes in direction, speed, and so forth, may be determined using the accelerometers 1512(11).

A gyroscope 1512(12) may provide information indicative of rotation of an object affixed thereto. For example, the tote 116 or other objects may be equipped with a gyroscope 1512(12) to provide data indicative of a change in orientation of the object.

A magnetometer 1512(13) may be used to determine an orientation by measuring ambient magnetic fields, such as the terrestrial magnetic field. The magnetometer 1512(13) may be worn or carried by the user 112, mounted to the tote 116, and so forth. For example, the magnetometer 1512(13) mounted to the tote 116 may act as a compass and provide information indicative of which direction the tote 116 is oriented.

An optical sensor array 1512(14) may comprise one or more optical sensors 1512(8). The optical sensors 1512(8) may be arranged in a regular, repeating, or periodic two-dimensional arrangement such as a grid. The optical sensor array 1512(14) may generate image data. For example, the optical sensor array 1512(14) may be arranged within or below fixture 108 and obtain information about shadows of items 1102, hand 1202 of the user 112, and so forth.

The sensors 1512 may include proximity sensors 1512(15) used to determine presence of an object, such as the user 112, the tote 116, and so forth. The proximity sensors 1512(15) may use optical, electrical, ultrasonic, electromagnetic, or other techniques to determine a presence of an object. In some implementations, the proximity sensors 1512(15) may use an optical emitter and an optical detector to determine proximity. For example, an optical emitter may emit light, a portion of which may then be reflected by the object back to the optical detector to provide an indication that the object is proximate to the proximity sensor 1512(15). In other implementations, the proximity sensors 1512(15) may comprise a capacitive proximity sensor 1512(15) configured to provide an electrical field and determine a change in electrical capacitance due to presence or absence of an object within the electrical field.

The proximity sensors 1512(15) may be configured to provide sensor data indicative of one or more of a presence or absence of an object, a distance to the object, or characteristics of the object. An optical proximity sensor 1512(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 1512 such as an image sensor 1512(3). Based on an apparent distance between the features of the structured light pattern, the distance to the object may be calculated. Other techniques may also be used to determine distance to the object. In another example, the color of the reflected light may be used to characterize the object, such as skin, clothing, tote 116, and so forth.

The sensors 1512 may also include an instrumented auto-facing unit (IAFU) 1512(16). The IAFU 1512(16) may comprise a position sensor configured to provide data indicative of displacement of a pusher. As an item 1102 is removed from the IAFU 1512(16), the pusher moves, such as under the influence of a spring, and pushes the remaining items 1102 in the IAFU 1512(16) to the front of the fixture 108. By using data from the position sensor, and given item data such as a depth of an individual item 1102, a count may be determined, based on a change in position data. For example, if each item 1102 is 1 inch deep, and the position data indicates a change of 17 inches, the quantity held by the IAFU 1512(16) may have changed by 17 items 1102. This count information may be used to confirm or provide a cross check for a count obtained by other means, such as analysis of the weight data 1330, the capacitance data 1316, image data, and so forth.

The sensors 1512 may include other sensors 1512(S) as well. For example, the other sensors 1512(S) may include light curtains, ultrasonic rangefinders, thermometers, barometric sensors, air pressure sensors, hygrometers, and so forth. For example, the inventory management system 130 may use information acquired from thermometers and hygrometers in the facility 1502 to direct the user 112 to check on delicate items 1102 stored in a particular fixture 108, which is overheating, too dry, too damp, and so forth.

In one implementation, a light curtain may utilize a linear array of light emitters and a corresponding linear array of light detectors. For example, the light emitters may comprise a line of infrared LEDs or vertical cavity surface emitting lasers (VCSELs) that are arranged in front of the fixture 108, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 112 hand 1202 would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand 1202 of the user 112 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand 1202 of a user 112 may be used to generate interaction data 142.

In some implementations, the image sensor 1512(3) or other sensors 1512(S) may include hardware processors, memory, and other elements configured to perform various functions. For example, the image sensors 1512(3) may be configured to generate image data, send the image data to another device such as the server 1604, and so forth.

The facility 1502 may include one or more access points 1610 configured to establish one or more wireless networks. The access points 1610 may use Wi-Fi, NFC, Bluetooth, or other technologies to establish wireless communications between a device and the network 1602. The wireless networks allow devices to communicate with one or more of the sensors 1512, the inventory management system 130, the optical sensor arrays 1512(14), the tag 1606, a communication device of the tote 116, or other devices.

Output devices 1612 may also be provided in the facility 1502. The output devices 1612 are configured to generate signals, which may be perceived by the user 112 or detected by the sensors 1512. In some implementations, the output devices 1612 may be used to provide illumination of the optical sensor array 1512(14).

Haptic output devices 1612(1) are configured to provide a signal that results in a tactile sensation to the user 112. The haptic output devices 1612(1) may use one or more mechanisms such as electrical stimulation or mechanical displacement to provide the signal. For example, the haptic output devices 1612(1) may be configured to generate a modulated electrical signal, which produces an apparent tactile sensation in one or more fingers of the user 112. In another example, the haptic output devices 1612(1) may comprise piezoelectric or rotary motor devices configured to provide a vibration, which may be felt by the user 112.

One or more audio output devices 1612(2) may be configured to provide acoustic output. The acoustic output includes one or more of infrasonic sound, audible sound, or ultrasonic sound. The audio output devices 1612(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 1612(3) may be configured to provide output, which may be seen by the user 112 or detected by a light-sensitive sensor such as an image sensor 1512(3) or an optical sensor 1512(8). In some implementations, the display devices 1612(3) may be configured to produce output in one or more of infrared, visible, or ultraviolet light. The output may be monochrome or in color. The display devices 1612(3) may be one or more of emissive, reflective, microelectromechanical, and so forth. An emissive display device 1612(3), such as using LEDs, is configured to emit light during operation. In comparison, a reflective display device 1612(3), such as using an electrophoretic element, relies on ambient light to present an image. Backlights or front lights may be used to illuminate non-emissive display devices 1612(3) to provide visibility of the output in conditions where the ambient light levels are low.

The display devices 1612(3) may be located at various points within the facility 1502. For example, the addressable displays may be located on the fixtures 108, totes 116, on the floor of the facility 1502, and so forth.

Other output devices 1612(P) may also be present. For example, the other output devices 1612(P) may include scent/odor dispensers, document printers, 3D printers or fabrication equipment, and so forth.

Figure 17:
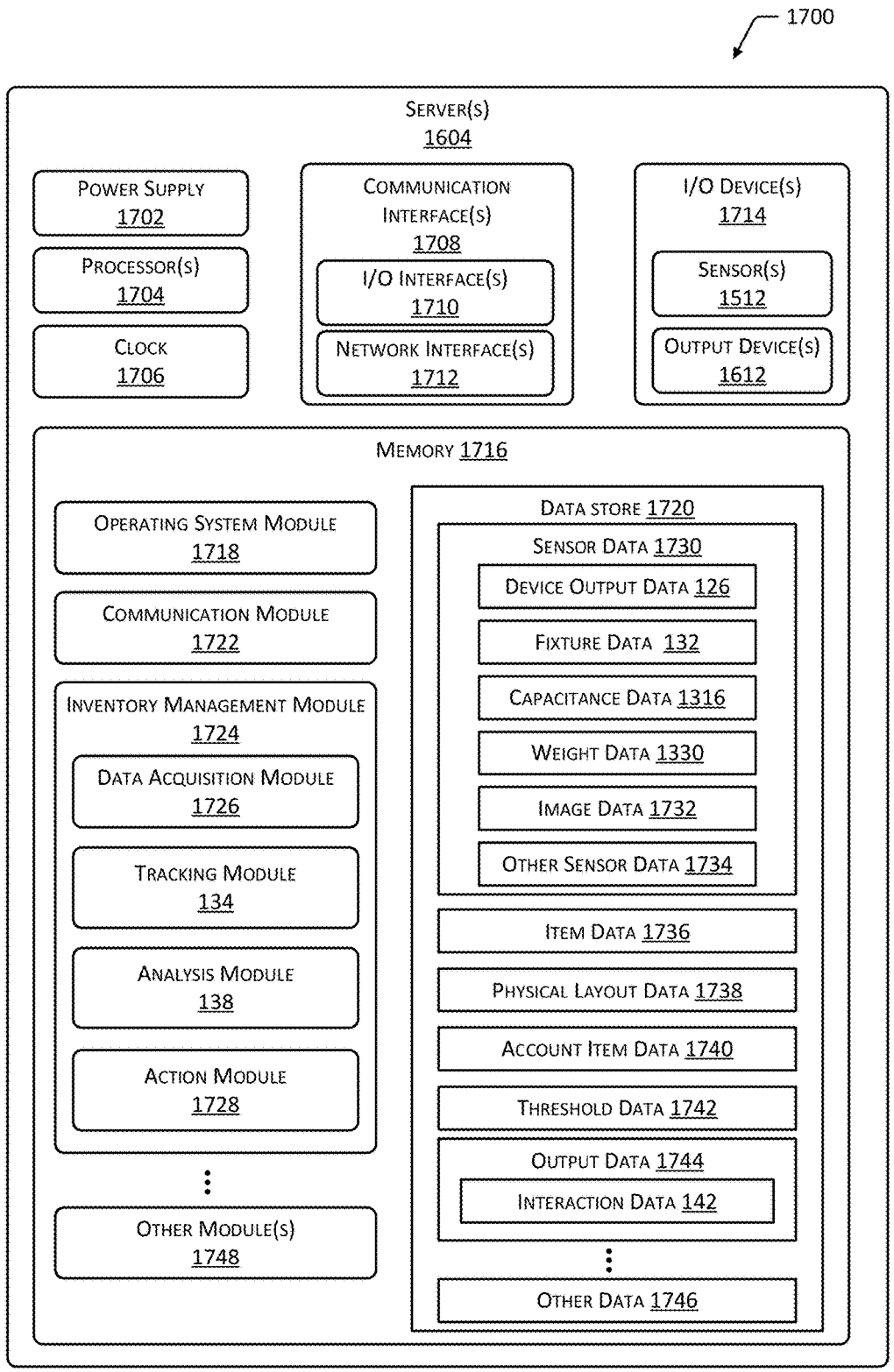
FIG. 17 is a block diagram of a server to support operation of the facility, according to some implementations.

FIG. 17 illustrates a block diagram 1700 of a server 1604 configured to support operation of the facility 1502, according to some implementations. The server 1604 may be physically present at the facility 1502, may be accessible by the network 1602, or a combination of both. The server 1604 does not require end-user knowledge of the physical location and configuration of the system that delivers the services. Common expressions associated with the server 1604 may include "on-demand computing", "software as a service (SaaS)", "platform computing", "network-accessible platform", "cloud services", "data centers", and so forth. Services provided by the server 1604 may be distributed across one or more physical or virtual devices.

One or more power supplies 1702 may be configured to provide electrical power suitable for operating the components in the server 1604. The one or more power supplies 1702 may comprise batteries, capacitors, fuel cells, photovoltaic cells, wireless power receivers, conductive couplings suitable for attachment to an external power source such as provided by an electric utility, and so forth. The server 1604 may include one or more hardware processors 1704 (processors) configured to execute one or more stored instructions. The processors 1704 may comprise one or more cores. One or more clocks 1706 may provide information indicative of date, time, ticks, and so forth. For example, the processor 1704 may use data from the clock 1706 to associate a particular interaction with a particular point in time.

The server 1604 may include one or more communication interfaces 1708 such as input/output (I/O) interfaces 1710, network interfaces 1712, and so forth. The communication interfaces 1708 enable the server 1604, or components thereof, to communicate with other devices or components. The communication interfaces 1708 may include one or more I/O interfaces 1710. The I/O interfaces 1710 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1710 may couple to one or more I/O devices 1714. The I/O devices 1714 may include input devices such as one or more of a sensor 1512, keyboard, mouse, scanner, and so forth. The I/O devices 1714 may also include output devices 1612 such as one or more of a display device 1612(3), printer, audio speakers, and so forth. In some embodiments, the I/O devices 1714 may be physically incorporated with the server 1604 or may be externally placed.

The network interfaces 1712 may be configured to provide communications between the server 1604 and other devices, such as the SFDs 104, totes 116, routers, access points 1610, and so forth. The network interfaces 1712 may include devices configured to couple to personal area networks (PANS), local area networks (LANs), wireless local area networks (WLANS), wide area networks (WANs), and so forth. For example, the network interfaces 1712 may include devices compatible with Ethernet, Wi-Fi, Bluetooth, ZigBee, and so forth.

The server 1604 may also include one or more busses or other internal communications hardware or software that allow for the transfer of data between the various modules and components of the server 1604.

As shown in FIG. 17, the server 1604 includes one or more memories 1716. The memory 1716 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1716 provides storage of computer-readable instructions, data structures, program modules, and other data for the operation of the server 1604. A few example functional modules are shown stored in the memory 1716, although the same functionality may alternatively be implemented in hardware, firmware, or as a system on a chip (SoC).

The memory 1716 may include at least one operating system (OS) module 1718. The OS module 1718 is configured to manage hardware resource devices such as the I/O interfaces 1710, the I/O devices 1714, the communication interfaces 1708, and provide various services to applications or modules executing on the processors 1704. The OS module 1718 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1716 may be a data store 1720 and one or more of the following modules. These modules may be executed as foreground applications, background tasks, daemons, and so forth. The data store 1720 may use a flat file, database, linked list, tree, executable code, script, or other data structure to store information. In some implementations, the data store 1720 or a portion of the data store 1720 may be distributed across one or more other devices including the servers 1604, network attached storage devices, and so forth.

A communication module 1722 may be configured to establish communications with one or more of the totes 116, sensors 1512, display devices 1612(3), other servers 1604, or other devices. The communications may be authenticated, encrypted, and so forth.

The memory 1716 may store an inventory management module 1724. The inventory management module 1724 is configured to provide the inventory functions as described herein with regard to the inventory management system 130. For example, the inventory management module 1724 may track items 1102 between different fixtures 108, to and from the totes 116, and so forth.

The inventory management module 1724 may include one or more of a data acquisition module 1726, the tracking module 134, the analysis module 138, an action module 1728, and so forth. The data acquisition module 1726 may be configured to acquire and access information associated with operation of the facility 1502. For example, the data acquisition module 1726 may be configured to acquire device output data 126 from the SFDs 104, fixture data 132, sensor data 1730 such as the weight data 1330, capacitance data 1316, image data 1732, other sensor data 1734, and so forth. The sensor data 1730 may be accessed by the other modules for use.

The data store 1720 may also store item data 1736. The item data 1736 provides information about a particular type of item 1102, including characteristics of that type of item 1102 such as physical dimensions, where that type of item 1102 is located in the facility 1502, characteristics about how the item 1102 appears, capacitance values associated with the type of item 1102, attenuation characteristics of an EMS 106, and so forth. For example, the item data 1736 may indicate that the type of item 1102 is "Bob's Low Fat Baked Beans, 10 oz. can" with a stock keeping unit number of "24076513". The item data 1736 may indicate the types and quantities of items 1102 that are expected to be stored at that particular fixture 108 such as in a particular lane on a shelf 1104, width and depth of that type of item 1102, weight of the item 1102 individually or in aggregate, sample images of the type of item 1102, and so forth.

The item data 1736 may include an item identifier. The item identifier may be used to distinguish one type of item 1102 from another. For example, the item identifier may include a stock keeping unit (SKU) string, Universal Product Code (UPC) number, radio frequency identification (RFID) tag data, and so forth. The items 1102 that are of the same type may be referred to by the same item identifier. For example, cans of beef flavor brand X dog food may be represented by the item identifier value of "9811901181". In other implementations, non-fungible items 1102 may each be provided with a unique item identifier, allowing each to be distinguished from one another.

The item data 1736 may include one or more of geometry data, item weight data, sample image data, sample capacitance data, or other data. The geometry data may include information indicative of size and shape of the item 1102 in one-, two-, or three-dimensions. For example, the geometry data may include the overall shape of an item 1102, such as a cuboid, sphere, cylinder, and so forth. The geometry data may also include information such as length, width, depth, and so forth, of the item 1102. Dimensional information in the geometry data may be measured in pixels, centimeters, inches, arbitrary units, and so forth. The geometry data may be for a single item 1102, or a package, kit, or other grouping considered to be a single item 1102.

The item 1102 weight data 1330 comprises information indicative of a weight of a single item 1102, or a package, kit, or other grouping considered to be a single item 1102. The item data 1736 may include other data. For example, the other data may comprise weight distribution of the item 1102, point cloud data for the item 1102, and so forth.

The sample capacitance data 1316 may comprise data indicative of a previously measured or calculated change in capacitance obtained by a representative capacitive sensor 1512(2) based on the presence or absence of a sample of the type of item 1102. For example, during processing or intake of the item 1102 at the facility 1502, a sample of the type of item 1102 may be placed on a capacitive sensor 1512(2) to generate the sample capacitance data 1316. Similar data may be obtained for the attenuation or propagation of the EMS 106 across the item 1102.

The sample image data 1732 may comprise one or more images of one or more of that type of item 1102. For example, sample image data 1732 may be obtained during processing or intake of the item 1102 to be used by the facility 1502.

The item data 1736 may include one or more fixture identifiers (IDs). The fixture ID is indicative of a particular area or volume of fixture 108 such as a shelf 1104 that is designated for stowage of the type of item 1102. For example, a single shelf 1104 may have several lanes, each with a different fixture ID. Each of the different fixture IDs may be associated with a lane having a particular area on the shelf 1104 designated for stowage of a particular type of item 1102. A single type of item 1102 may be associated with a particular fixture ID, a plurality of fixture IDs may be associated with the single type of item 1102, more than one type of item 1102 may be associated with the particular fixture ID, and so forth.

The item data 1736 may also include quantity data. The quantity data may comprise a count or value indicative of a number of items 1102. The count may be a measured or an estimated value. The quantity data may be associated with a particular fixture ID, for an entire facility 1502, and so forth. For example, the same type of item 1102 may be stored at different shelves 1104 within the facility 1502. The quantity data may indicate the quantity on hand for each of the different fixtures 108.

The tracking module 134 may access physical layout data 1738 and generate account item data 1740. The tracking module 134 may be configured to determine a location within the facility 1502 of the user 112, a user account associated with the user 112, and so forth. For example, the tracking module 134 may determine that an item 1102 has been removed from a lane and placed into the tote 116 based on the fixture data 132 indicative of the user's 112 characteristic data 128 having been received at the lane. The tracking module 134 may then determine that the tote 116 is associated with the user 112 or the user account that represents the user 112. Based on this information, the analysis module 138 may generate the interaction data 142.

The tracking module 134 may also use physical layout data 1738 that is indicative of the arrangement of SFDs 104 with respect to one another, with respect to a reference datum, and so forth. The physical layout data 1738 may also include information such as the physical arrangement of segments 204 within the respective SFDs 104. In some implementations the tracking module 134 may maintain cluster layout data that associates a particular segment 204 within a cluster 202 with a particular portion of the SFD 104. For example, with regard to the cluster 202 depicted in FIG. 2, the first segment 204 in SFD 104(B) may be designated in the cluster layout data as segment 5. Likewise, the first segment 204 in SFD 104(C) may be designated in the cluster layout data as segment 9. The cluster layout data may be changed to provide for dynamic readjustment of clusters 202 as described above.

The analysis module 138 may utilize the device output data 126, fixture data 132, weight data 1330, capacitance data 1316, item data 1736, and other information to generate interaction data 142. The interaction data 142 is indicative of action such as picking or placing an item 1102 for a particular fixture 108, presence of the user 112 at the fixture 108, and so forth.

In some implementations, the analysis module 138 may generate output data 1744 about the user 112. The analysis module 138 may determine if the user 112 is standing, moving, lying on the floor 102, and so forth. For example, the analysis module 138 may determine an area of contact with the floor 102 based on the device output data 126. If the area of contact exceeds a threshold value, the user 112 may be determined to be lying on the floor 102. Based on this determination, other actions may be taken. For example, alarm data may be generated to summon assistance if a user 112 is deemed to be lying on the floor 102.

The analysis module 138, or other modules, may be configured to determine portions of the SFDs 104 which are to be deactivated or from which information is to be disregarded. In one implementation, during setup of the system, the antennas 404 of a SFD 104 that are located underneath a fixture 108 may be deactivated. In another implementation, the analysis module 138 may determine SFDs 104 or portions thereof that report presence of an object that is unchanging over long periods of time, such as hours or days. These objects, such as a fixture 108 above the SFD 104, may then be subsequently disregarded and information about these positions may be removed from further processing. If a change is detected, such as when the fixture 108 above the SFD 104 is moved, information about that change may be used to re-enable consideration of data from that SFD 104 or portion thereof.

The inventory management module 1724 may utilize the physical layout data 1738. The physical layout data 1738 may provide information indicative of location of the SFDs 104, where sensors 1512 and the fixtures 108 are in the facility 1502 with respect to one another, FOV of sensors 1512 relative to the fixture 108, and so forth. For example, the physical layout data 1738 may comprise information representative of a map or floor plan of the facility 1502 with relative positions of the fixtures 108, location of individual SFDs 104 therein, arrangements of the segments 204, planogram data indicative of how items 1102 are to be arranged at the fixtures 108, and so forth. Continuing the example, the physical layout data 1738 may be based on using the relative arrangement of the SFDs 104 in conjunction with their physical dimensions to specify where the SFDs 104 are placed within the facility 1502.

The physical layout data 1738 may associate a particular fixture ID with other information such as physical location data, sensor position data, sensor direction data, sensor identifiers, and so forth. The physical layout data 1738 provides information about where in the facility 1502 objects are, such as the fixture 108, the sensors 1512, and so forth. In some implementations, the physical location data may be relative to another object. For example, the physical location data may indicate that a particular weight sensor 1512(1), capacitive sensor 1512(2), or image sensor 1512(3) is associated with the shelf 1104 or portion thereof.

The inventory management module 1724 may utilize the physical layout data 1738 and other information during operation. For example, the tracking module 134 may utilize physical layout data 1738 to determine what capacitance data 1316 acquired from particular capacitive sensors 1512(2) corresponds to a particular shelf 1104, lane, or other fixture 108.

The tracking module 134 may access information from sensors 1512 within the facility 1502, such as those at the shelf 1104 or other fixture 108, onboard the tote 116, carried by or worn by the user 112, and so forth. For example, the tracking module 134 may receive the fixture data 132 and use the characteristic data 128 to associate a particular user 112 with a pick or place of an item 1102 at the associated fixture 108.

The account item data 1740 may also be included in the data store 1720 and comprises information indicative of one or more items 1102 that are within the custody of a particular user 112, within a particular tote 116, and so forth. For example, the account item data 1740 may comprise a list of the contents of the tote 116. Continuing the example, the list may be further associated with the user account representative of the user 112. In another example, the account item data 1740 may comprise a list of items 1102 that the user 112 is carrying. The tracking module 134 may use the account item data 1740 to determine subsets of possible items 1102 with which the user 112 may have interacted.

The inventory management module 1724, and modules associated therewith, may access sensor data 1730, threshold data 1742, and so forth. The threshold data 1742 may comprise one or more thresholds, ranges, percentages, and so forth, that may be used by the various modules in operation.

The inventory management module 1724 may generate output data 1744. For example, the output data 1744 may include the interaction data 142, inventory levels for individual types of items 1102, overall inventory, and so forth.

The action module 1728 may be configured to initiate or coordinate one or more actions responsive to output data 1744. For example, the action module 1728 may access output data 1744 that indicates a particular fixture 108 is empty and in need of restocking. An action such as a dispatch of a work order or transmitting instructions to a robot may be performed to facilitate restocking of the fixture 108.

Processing sensor data 1730, such as the image data 1732, may be performed by a module implementing, at least in part, one or more of the following tools or techniques. In one implementation, processing of the image data 1732 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 1730. In still another implementation, functions such as those in the Machine Vision Toolbox for Matlab (MVTB) available using MATLAB as developed by MathWorks, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 1730 or other data. For example, the ANN may be a trained using a supervised learning algorithm such that object identifiers are associated with images of particular objects within training images provided to the ANN. Once trained, the ANN may be provided with the sensor data 1730 and the item data 1736 to allow for a determination of similarity between two or more images.

The sensor data 1730 obtained from different sensors 1512 may be used to compare or validate output data 1744. For example, the image data 1732 may indicate the presence of a person based on a coat or jacket that is arranged across the back of a chair. However, the device output data 126 provides information that no user 112 is currently present at that location in the facility 1502. This difference may be used to generate an alarm, notify an associate in the facility 1502, and so forth.

Other data 1746 may be stored in the data store 1720 as well as other modules 1748 in the memory 1716. For example, the other modules 1748 may include a billing module while the other data 1746 may include billing data.

Figure 18:
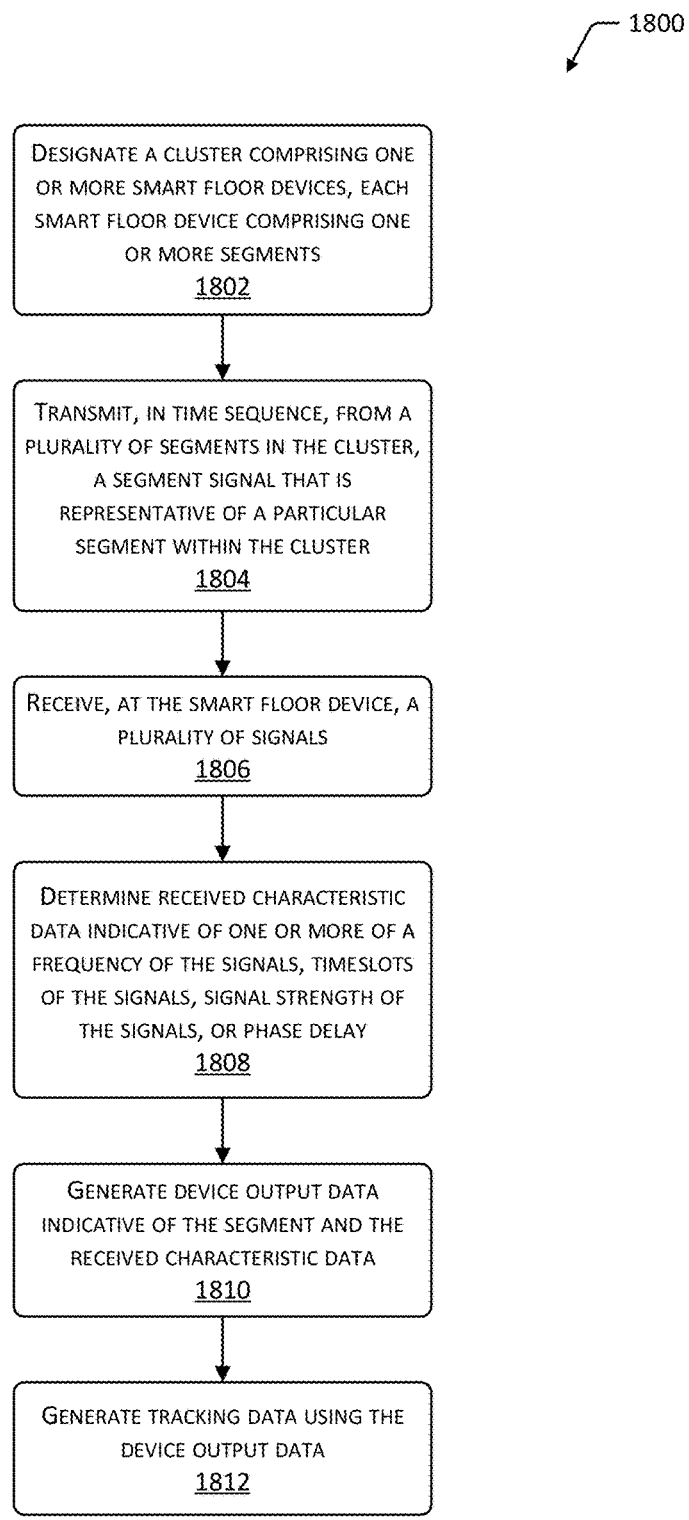
FIG. 18 depicts a flow diagram of a process that utilizes a cluster of segments of smart floor devices to generate tracking data, according to some implementations.

FIG. 18 depicts a flow diagram 1800 of a process that utilizes a cluster of segments of smart floor devices to generate tracking data, according to some implementations.

At 1802, a cluster 202 is designated that comprises one or more SFDs 104. Each SFD 104 may comprise one or more segments 204.

At 1804, segment signals 208 are transmitted, in time sequence, from respective ones of a plurality of segments 204 in the cluster 202. For example, a particular timeslot 210 is associated with a particular segment 204, and during that timeslot 210 the particular segment 204 transmits the segment signal 208. The time sequence and associated timeslots 210 for the segments 204 may be synchronized across the cluster 202 using the clock signal 124. In one implementation, the clock signal 124 may be used to synchronize or set a clock that is local to the SFD 104. In another implementation, the clock signal 124 may be used instead of a local clock of the SFD 104. For example, a rising edge of the clock signal 124 may be used to designate the start of the next timeslot 210.

At 1806, a plurality of signals are received at the SFD 104. For example, the receiver 430 associated with an antenna 404 at a particular segment 204 may be used to receive an EMS 106.

At 1808, received characteristic data 128 is determined for at least a portion of the received plurality of EMS 106. The characteristic data 128 may be indicative of one or more of: a frequency of the received EMS 106, timeslot 210 within which the EMS 106 was received, signal strength of the EMS 106, phase delay, and so forth. In one implementation, the determination of the timeslot 210 may include one or more of the following steps. A reception time elapsed between the reception time of the initial signal 206 and the particular segment signal 208 may be determined.

Time differences between signals may be measured from a leading edge of the signals. Time may be measured based on a start time of the respective signals, end time of the respective signals, and so forth. For example, the reception time elapsed may be measured from the time at which the initial signal 206 first exceeds a threshold amplitude and the time at which the segment signal 208 exceeds a threshold amplitude. In other implementations, differences in timing may be measured using different portions of the signals.

The timeslot 210 value associated with the reception time may be determined. For example, the reception time elapsed between the initial signal 206 and the segment signal 208(3) is 10 milliseconds (ms). A lookup table or other data structure may be used to associate the reception time elapsed value with a particular timeslot 210 value. In this example, the 10 ms is associated with the third timeslot 210(3). As a result, receiving a segment signal 208(3) starting at 10 ms results in determination of a timeslot value of "3" that indicates an EMS 106 that was transmitted in the third timeslot. Given the timeslot value of "3", the segment signal 208(3) is associated with the third segment 204(3).

As described, the characteristic data 128 may indicate the received signal strength of the EMS 106. By using data about the received signal strength, the distance to a particular antenna 404 that is radiating the EMS 106 may be estimated.

The initial signal 206 may be used to synchronize a local clock or start a timer. The local clock or timer may then be used to determine the reception time elapsed between the initial signal 206 and the segment signal 208.

At 1810, device output data 126 is generated. The device output data 126 is indicative of the segment 204 used to receive the EMS 106 and the received characteristic data 128. For example, the device output data 126 may include segment identifier data 438. In some implementations, the device output data 126 may be sent using a CAN bus interface or other communication interface to another computing device.

At 1812, tracking data 136 is generated using the device output data 126. For example, device output data 126 from a plurality of segments 204 may be analyzed to determine which segments 204 thereon the user 112 is in contact with or bridging.

Figure 19:
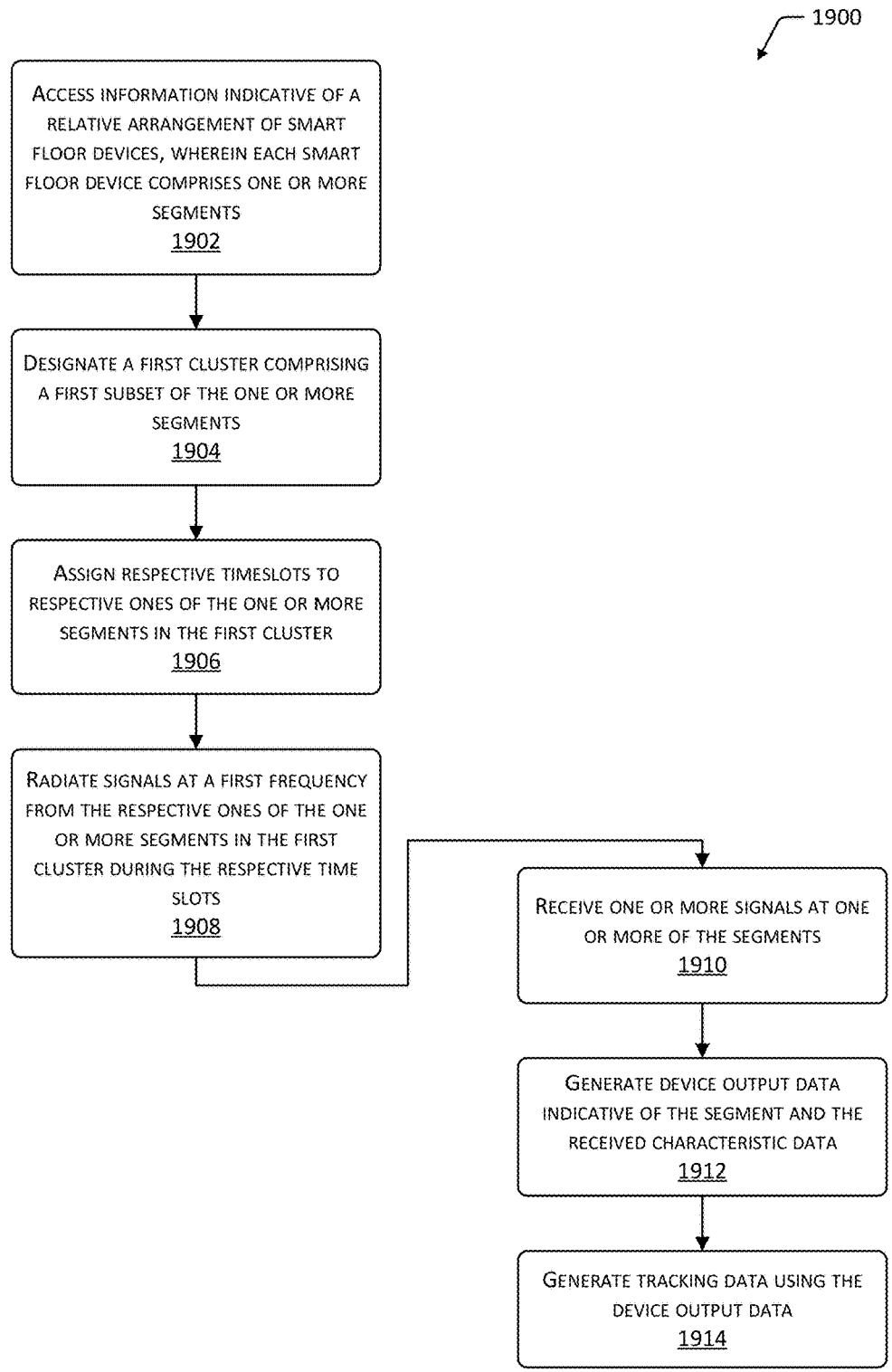
FIG. 19 depicts a flow diagram of another process that utilizes a cluster of segments of smart floor devices to generate tracking data, according to some implementations.

FIG. 19 depicts a flow diagram 1900 of another process that utilizes a cluster of segments of smart floor devices to generate tracking data, according to some implementations.

At 1902, information indicative of a relative arrangement of SFDs 104 is accessed. For example, the relative arrangement may indicate that SFD 104(B) is to the right of SFD 104(A). In other implementations, the relative arrangement may be indicative of particular coordinates with respect to a datum, such as 3.85 meters east and 4.71 meters north of a particular reference point in the facility 1502. In some implementations, the one or more segments 204 of the cluster 202 may be adjacent to one another. Each SFT 104 may include one or more segments 204, each segment comprising an antenna that covers at least a portion of an area of the segment 204.

At 1904, a first cluster 202 comprising a first subset of the one or more segments 204 is designated. For example, the size, shape, and position of the first cluster 202 may be specified by an operator, automated system, and so forth.

At 1906, respective timeslots 210 are associated to the one or more segments 204 in the first cluster 202. In one implementation, each segment 204 in the cluster 202 may be associated with a single timeslot 210.

At 1908, EMS 106 are radiated at a first frequency from the respective ones of the one or more segments 204 in the first cluster 202 during the respective timeslots 210. In some implementations, timing for the timeslots 210 may be based at least in part on the clock signal 124.

At 1910, one or more EMS 106 are received at one or more of the segments 204.

At 1912, device output data 126 is generated. The device output data 126 is indicative of the segment 204 used to receive the EMS 106 and the received characteristic data 128. For example, the device output data 126 may include segment identifier data 438.

At 1914, tracking data 136 is generated using the device output data 126. For example, device output data 126 from a plurality of segments 204 may be analyzed to determine which segments 204 the user 112 is in contact with or bridging.

The system described above may be utilized in a variety of different settings including, but not limited to, commercial, non-commercial, medical, and so forth. For example, the SFDs 104 may be deployed in a home, hospital, care facility, correctional facility, transportation facility, office, and so forth. The tracking module 134 may provide tracking data 136, such as the location of users 112 within a facility. In some implementations, the tracking module 134 may provide tracking data 136 that is indicative of the identity of a particular user 112. The analysis module 138 may be used to generate output data 1744 that is indicative of a status of the user 112, such as whether the user 112 is standing, sitting, lying on the floor, and so forth. This status may then be used to take other actions, such as issuing a notification, triggering an alarm, dispatching an attendant or robot, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a plurality of floor devices, each floor device comprising:
        a plurality of segments;
        a flooring material;
        a support structure configured to support the flooring material;
        an interface to receive a clock signal;
        a clock;
        a first transmitter;
        a plurality of antennas underneath the flooring material;
        a first switch configured to selectively connect the first transmitter to one of the plurality of antennas;
        a first memory, storing first computer-executable instructions; and
        a first hardware processor to execute the first computer-executable instructions to:
            synchronize the clock to the clock signal;
            use the first transmitter during a first timeslot as indicated by the clock to transmit an initial signal at a first frequency, wherein the initial signal is radiated by the plurality of antennas;
            determine a second timeslot, after the first timeslot, that is associated with transmission of a first segment signal corresponding to a first segment of the plurality of segments;
            during the second timeslot as indicated by the clock:
                activate the first switch to connect a particular one of the plurality of antennas to the first transmitter and disconnect other of the plurality of antennas from the first transmitter; and
                transmit the first segment signal that is radiated by the particular one of the plurality of antennas, such that the first segment signal is transmitted within the second timeslot.

2. The system of claim 1, one or more of the floor devices further comprising:
    a controller area network bus interface;
    a receiver comprising a synchronous detector;
    a second switch further configured to selectively connect the receiver to one or more of the plurality of antennas;
    the first memory storing second computer-executable instructions; and
    the first hardware processor to execute the second computer-executable instructions to:
        receive a received initial signal;

receive a received segment signal;
determine a first amount of time has elapsed between the reception of the received initial signal and the received segment signal;
access previously stored data that associates elapsed time with a particular timeslot;
compare the first amount of time to the elapsed time in the previously stored data to determine a timeslot associated with the first amount of time;
generate output data indicative of:
 amplitude of one or more of the received initial signal or the received segment signal; and
 the timeslot associated with the first amount of time; and
send the output data using the controller area network bus interface.

3. A system comprising:
a device comprising:
 a first segment and a second segment;
 a flooring material;
 a load bearing support structure beneath the flooring material;
 a first interface to receive a clock signal;
 a first clock;
 one or more transmitters configured to generate a first segment signal corresponding to the first segment at a first frequency and a second segment signal corresponding to the second segment at the first frequency;
 a first segment antenna located beneath the flooring material, wherein the first segment antenna is connected to the one or more transmitters;
 a second segment antenna located beneath the flooring material, wherein the second segment antenna is connected to the one or more transmitters;
 a first memory storing first computer-executable instructions; and
 a first hardware processor to execute the first computer-executable instructions to:
  synchronize the first clock to the clock signal;
  determine a first timeslot associated with transmission of the first segment signal;
  transmit, using the one or more transmitters and the first segment antenna, the first segment signal during the first timeslot as indicated by the first clock;
  determine a second timeslot associated with transmission of the second segment signal; and
  transmit, using the one or more transmitters and the second segment antenna, the second segment signal during the second timeslot as indicated by the first clock.

4. The system of claim 3, the device further comprising:
a communication interface;
a receiver connected to one or more of the first segment antenna, the second segment antenna, or a third antenna;
the first memory storing second computer-executable instructions; and
the first hardware processor to execute the second computer-executable instructions to:
 determine a timeslot associated with one or more received segment signals;
 generate output data indicative of:
  a frequency of a received segment signal; and
  the timeslot associated with the received segment signal; and
 send the output data using the communication interface.

5. The system of claim 4, the second computer-executable instructions to determine the timeslot associated with the one or more received segment signals further comprising instructions to:
 access a data structure that associates particular time intervals with particular timeslots;
 determine, based on output from the first clock, a reception time at which the received segment signal was received;
 determine the particular time interval within which the reception time occurred; and
 associate the received segment signal with the timeslot as indicated in the data structure that is associated with the particular time interval.

6. The system of claim 3, further comprising:
a fixture comprising:
 a second interface to receive the clock signal;
 one or more fixture antennas;
 at least one receiver connected to the one or more fixture antennas;
 a communication interface;
 a second memory storing second computer-executable instructions; and
 a second hardware processor to execute the second computer-executable instructions to:
 synchronize a second clock to the clock signal;
 receive a received segment signal using the at least one receiver;
 determine, with respect to the second clock, a timeslot within which the received segment signal was received;
 generate fixture output data indicative of:
  a frequency of the received segment signal; and
  the timeslot; and
 send the fixture output data using the communication interface.

7. The system of claim 6, the second computer-executable instructions to determine, with respect to the second clock, the timeslot within which the received segment signal was received further comprising computer-executable instructions to:
 access a data structure that associates particular time intervals with particular timeslots;
 determine, based on output from the second clock, a reception time at which the received segment signal was received;
 determine the particular time interval within which the reception time occurred; and
 associate the received segment signal with the timeslot as indicated in the data structure that is associated with the particular time interval.

8. The system of claim 6, wherein the fixture comprises a first lane for stowage of items and a second lane for stowage of items and further wherein the first lane is associated with a first one of the one or more fixture antennas and the second lane is associated with a second one of the one or more fixture antennas.

9. The system of claim 3, wherein the first timeslot and the second timeslot are less than one milliseconds in duration.

10. The system of claim 3, further comprising:
a second device comprising:
 a second flooring material;
 a second load bearing support structure beneath the second flooring material;
 a second interface to receive the clock signal;

a second clock;
a second transmitter configured to generate a third segment signal at the first frequency;
a third segment antenna located beneath the second flooring material, wherein the third segment antenna is connected to the second transmitter;
a second memory storing second computer-executable instructions; and
a second hardware processor to execute the second computer-executable instructions to:
synchronize the second clock to the clock signal; and
transmit, using the second transmitter and the third segment antenna, a third segment signal during a third timeslot as indicated by the second clock.

11. The system of claim 3, wherein the one or more transmitters are configured to modulate one or more of the first segment signal or the second segment signal using one or more of amplitude modulation, phase modulation or frequency modulation, and using a carrier frequency of between 20 kilohertz and 30 megahertz.

12. The system of claim 3, further comprising:
a portable device comprising:
one or more portable device transmitters configured to generate a first device signal at a second frequency;
one or more portable device antennas connected to the one or more portable device transmitters;
a second memory, storing second computer-executable instructions; and
a second hardware processor to execute the second computer-executable instructions to:
transmit a second device signal using the one or more portable device transmitters and the one or more portable device antennas.

13. The system of claim 12, wherein the one or more portable device transmitters are configured to generate an initial signal;
the first memory storing third computer-executable instructions; and
the first hardware processor configured to execute the third computer-executable instructions to:
transmit the initial signal using the one or more transmitters, wherein the initial signal conveys a predetermined preamble value.

14. The system of claim 3, further comprising:
a portable device comprising:
a communication interface;
one or more portable device antennas configured to be proximate to a body of a user while in use;
one or more portable device receivers connected to the one or more portable device antennas;
a second memory, storing second computer-executable instructions; and
a second hardware processor to execute the second computer-executable instructions to:
determine a timeslot associated with a received segment signal;
generate output data indicative of the timeslot associated with the received segment signal; and
send the output data using the communication interface.

15. A method comprising:
accessing information indicative of a relative arrangement of floor tiles, wherein each floor tile comprises a plurality of antennas and a plurality of segments, each antenna corresponding to a respective segment of the plurality of segments of the floor tile;
designating a first cluster comprising a first subset of the plurality of antennas corresponding to a respective first subset of the plurality of segments;
determining respective timeslots for respective ones of the plurality of antennas in the first cluster;
assigning the respective timeslots to the respective ones of the plurality of antennas in the first cluster; and
radiating signals at a first frequency from the respective ones of the plurality of antennas in the first cluster during the respective timeslots.

16. The method of claim 15, further comprising:
designating a second cluster comprising a second subset of the plurality of antennas that are adjacent to one another, wherein the first cluster and the second cluster are mutually exclusive to one another;
assigning the respective timeslots to the respective ones of the plurality of antennas in the second cluster that are in a same relative position as the first cluster; and
radiating signals at a single frequency from the respective ones of the plurality of antennas in the second cluster during the respective timeslots.

17. The method of claim 16, wherein the first cluster contains a first number of antennas in a first configuration and the second cluster contains a second number of antennas in a second configuration.

18. The method of claim 16, wherein the respective timeslots of the first cluster have a first duration and the respective timeslots of the second cluster have a second duration that is shorter than the first duration.

19. The method of claim 15, further comprising:
receiving one or more signals at a particular antenna;
generating output data indicative of:
the particular antenna,
a timeslot associated with the one or more signals; and
one or more of:
frequency of the one or more signals,
amplitude of the one or more signals, or
phase of the one or more signals.

20. The method of claim 15, further comprising:
generating a clock signal;
synchronizing the respective timeslots with respect to the clock signal;
designating a second cluster comprising a second subset of the plurality of segments, wherein the first cluster and the second cluster are mutually exclusive to one another; and
synchronizing operation of the first cluster and the second cluster to the clock signal.

\* \* \* \* \*